(12) United States Patent
Maheshwari et al.

(10) Patent No.: US 9,886,267 B2
(45) Date of Patent: *Feb. 6, 2018

(54) INTERCONNECTION PLATFORM FOR REAL-TIME CONFIGURATION AND MANAGEMENT OF A CLOUD-BASED SERVICES EXCHANGE

(71) Applicant: Equinix, Inc., Redwood City, CA (US)

(72) Inventors: Gagan Maheshwari, Sunnyvale, CA (US); Parveen Kumar, Fremont, CA (US); Jaganathan Jeyapaul, San Jose, CA (US); Brian J. Lillie, Los Altos, CA (US)

(73) Assignee: Equinix, Inc., Redwood City, CA (US)

( * ) Notice: Subject to any disclaimer, the term of this patent is extended or adjusted under 35 U.S.C. 154(b) by 160 days.

This patent is subject to a terminal disclaimer.

(21) Appl. No.: 14/927,451

(22) Filed: Oct. 29, 2015

(65) Prior Publication Data
US 2016/0127454 A1 May 5, 2016

Related U.S. Application Data

(60) Provisional application No. 62/233,933, filed on Sep. 28, 2015, provisional application No. 62/072,976, filed on Oct. 30, 2014.

(51) Int. Cl.
| | |
|---|---|
| G06F 15/173 | (2006.01) |
| G06F 9/44 | (2006.01) |
| H04L 12/911 | (2013.01) |
| H04L 29/08 | (2006.01) |
| H04L 12/24 | (2006.01) |
| G06F 9/50 | (2006.01) |

(52) U.S. Cl.
CPC .............. *G06F 8/70* (2013.01); *G06F 9/5072* (2013.01); *H04L 41/00* (2013.01); *H04L 41/0803* (2013.01); *H04L 41/20* (2013.01); *H04L 47/70* (2013.01); *H04L 67/10* (2013.01); *H04L 67/1097* (2013.01); *H04L 67/2838* (2013.01)

(58) Field of Classification Search
CPC . H04L 41/0803; H04L 41/20; H04L 67/1097; H04L 67/2838
See application file for complete search history.

(56) References Cited

U.S. PATENT DOCUMENTS

| | | |
|---|---|---|
| 7,697,558 B2 | 4/2010 | Pilon et al. |
| 7,904,882 B2 | 3/2011 | Hinks |
| 8,307,368 B2 | 11/2012 | Wolf et al. |

(Continued)

FOREIGN PATENT DOCUMENTS

WO 2012075448 A1 6/2012

OTHER PUBLICATIONS

U.S. Appl. No. 61/323,066, by Sukwan Youn, filed Apr. 12, 2010.
(Continued)

*Primary Examiner* — Krisna Lim
(74) *Attorney, Agent, or Firm* — Shumaker & Sieffert, P.A.

(57) ABSTRACT

In one example, a cloud-based services exchange comprises a plurality of interconnection assets configured to connect a customer of the cloud-based services exchange to one or more cloud service providers, the plurality of interconnection assets including a virtual circuit by which the customer accesses a cloud service from the one or more cloud service providers; and an orchestration engine configured to modify the plurality of interconnection assets.

23 Claims, 24 Drawing Sheets

(56) References Cited

U.S. PATENT DOCUMENTS

| | | | |
|---|---|---|---|
| 8,379,656 | B2 | 2/2013 | Waldrop et al. |
| 8,537,845 | B2 | 9/2013 | Waldrop et al. |
| 9,239,740 | B2 | 1/2016 | Zhao et al. |
| 2006/0041641 | A1 | 2/2006 | Breiter et al. |
| 2006/0069777 | A1 | 3/2006 | Kato et al. |
| 2010/0332454 | A1 | 12/2010 | Prahlad et al. |
| 2011/0058547 | A1 | 3/2011 | Waldrop et al. |
| 2011/0119088 | A1 | 5/2011 | Gunn |
| 2011/0246627 | A1 | 10/2011 | Kern |
| 2011/0246992 | A1 | 10/2011 | Kern |
| 2012/0096525 | A1 | 4/2012 | Bolgert et al. |
| 2012/0331149 | A1 | 12/2012 | Rao |
| 2013/0283364 | A1 | 10/2013 | Chang et al. |
| 2014/0189692 | A1 | 7/2014 | Wang et al. |
| 2014/0244851 | A1 | 8/2014 | Lee |
| 2014/0289791 | A1 | 9/2014 | Acharya et al. |

OTHER PUBLICATIONS

U.S. Appl. No. 61/239,997, by Sukwan Youn, filed Sep. 4, 2009.
U.S. Appl. No. 61/285,371, by Sukwan Youn, filed Dec. 10, 2009.
Rosen et al., "BGP/MPLS IP Virtual Private Networks (VPNs)," RFC 4364, Feb. 2006, Internet Engineering Task Force (IETF) Network Working Group, 47 pp.
U.S. Appl. No. 14/927,306, by Parveen Kumar, filed Oct. 29, 2015.
U.S. Appl. No. 14/927,315, by Venkatachalam Rangasamy, filed Oct. 29, 2015.
International Search Report and Written Opinion from International Application No. PCT/US2015/058500, dated Feb. 11, 2016, 20 pp.
Second Written Opinion of International Application No. PCT/US2015/058500, dated Oct. 10, 2016, 6 pp.
International Preliminary Report on Patentability from International Application No. PCT/US2015/058500, dated Feb. 8, 2017, 7 pp.
Office Action from U.S. Appl. No. 15/395,101, dated Mar. 27, 2017, 13 pp.
Reply to Written Opinion dated Feb. 11, 2016, filed Aug. 30, 2016 from counterpart International Application No. PCT/US2015/058500, 21 pgs.
Office Action from U.S. Appl. No. 14/927,306, dated Sep. 6, 2017, 25 pp.
Notice of Allowance from U.S. Appl. No. 15/395,101, dated Aug. 8, 2017, 7 pp.
Amendment in Response to Office Action dated Mar. 27, 2017, from U.S. Appl. No. 15/395,101, filed Jun. 22, 2017, 14 pp.
Notice of Allowance from U.S. Appl. No. 15/395,101, dated Sep. 21, 2017, 7 pp.
Examination Report from counterpart Australian Application No. 2015338902, dated Nov. 1, 2017, 2 pp.
Office Action from counterpart Canadian Application No. 2,951,939 dated Oct. 23, 2017, 4 pp.
Amendment in Response to Office Action dated Sep. 6, 2017, from U.S. Appl. No. 14/927,306, filed Dec. 6, 2017, 15 pp.

INTERCONNECTION PLATFORM FOR REAL-TIME CONFIGURATION AND MANAGEMENT OF A CLOUD-BASED SERVICES EXCHANGE

This application claims the benefits of U.S. Provisional Appl. No. 62/072,976, filed Oct. 30, 2014; and U.S. Provisional Appl. No. 62/233,933, filed Sep. 28, 2015; the entire contents of each of which being incorporated herein by reference.

TECHNICAL FIELD

The invention relates to computer networks and, more specifically, to a platform facilitating interconnectivity among cloud service customers and cloud service providers.

BACKGROUND

Cloud computing refers to the use of dynamically scalable computing resources accessible via a network, such as the Internet. The computing resources, often referred to as a "cloud," provide one or more services to users. These services may be categorized according to service types, which may include for examples, applications/software, platforms, infrastructure, virtualization, and servers and data storage. The names of service types are often prepended to the phrase "as-a-Service" such that the delivery of applications/software and infrastructure, as examples, may be referred to as Software-as-a-Service (SaaS) and Infrastructure-as-a-Service (IaaS), respectively.

The term "cloud-based services" or, more simply, "cloud services" refers not only to services provided by a cloud, but also to a form of service provisioning in which cloud customers contract with cloud service providers for the online delivery of services provided by the cloud. Cloud service providers manage a public, private, or hybrid cloud to facilitate the online delivery of cloud services to one or more cloud customers.

SUMMARY

In general, this disclosure describes an interconnection platform for dynamically configuring and managing a cloud-based services exchange, or "cloud exchange," to facilitate virtual connections for cloud services delivery from multiple cloud service providers to one or more cloud customers. The cloud exchange may enable cloud customers to bypass the public Internet to directly connect to cloud services providers so as to improve performance, reduce costs, increase the security and privacy of the connections, and leverage cloud computing for additional applications. In this way, enterprises, network carriers, and SaaS customers, for instance, can integrate cloud services with their internal applications as if such services are part of or otherwise directly coupled to their own data center network.

In some examples, an interconnection platform for a cloud exchange exposes a collection of software interfaces, also referred to herein and described according to application programming interfaces (APIs), that allow access to capabilities and assets of the interconnection platform in a programmable fashion. As such, the software interfaces provide an extensible framework that allows software developers associated with customers and partners of the exchange to build software applications that access the interconnection platform that automatically manage interconnection with multiple cloud service providers participating in the interconnection platform. In other words, developers from network services providers, cloud service providers, managed service providers and other enterprises may use the software interfaces exposed by the interconnection platform and defined by the APIs to build custom applications and frameworks for seamless interaction with the interconnection platform to facilitate the delivery of cloud services from cloud service providers to cloud service customers.

These software interfaces defined by the APIs enable machine-to-machine communication for near real-time setup and modifications of interconnections, and may also eliminate or reduce the need for human interaction for the entire interconnection setup and management process. In this way, the software interfaces provide an automated and seamless way to establish, un-install, and manage interconnection with multiple cloud providers participating in an interconnection platform.

In one example, the interconnection platform includes an internal orchestration engine that organizes, directs and integrates underlying software and network sub-systems for managing various aspects of interconnection for the cloud exchange. The orchestration engine may, for example, provide a rule-driven workflow engine that operates between the APIs and the underlying interconnect platform of the exchange. In this way, the orchestration engine can be used by customer-proprietary applications and the APIs for direct participation within the interconnection platform of the cloud exchange.

As described herein, the orchestration engine synthesizes the information and actions to formulate intelligent next steps and responses to dynamic requests made by the customer applications. As such, the orchestration engine abstracts the complexity of the underlying software and network sub-systems of the cloud exchange by providing a uniform, simplified, and secured means to access the interconnection platform.

In some examples, a cloud-based services exchange comprises a network data center that includes respective ports by which a plurality of networks connect to the network data center, each of the networks having a different network address space and associated with a different one of a plurality of customers or cloud service providers; a plurality of interconnection assets within the network data center and configured to connect, through a switching fabric of the network data center, each of the networks associated with the plurality of customers of the cloud-based services exchange to one or more of the networks associated with the cloud service providers, the plurality of interconnection assets including a respective set of one or more virtual circuits for each of the networks associated with the plurality of customers and providing network connectivity within the network data center between the networks associated with the plurality of customers and cloud services executing from within the networks associated with the plurality of cloud service providers; and an interconnection platform executing on one or more management devices within the network data center and presenting a software interface reachable by the networks associated with the plurality of customers and configured to, in response to receiving a request issued by an application executing within any of the networks associated with the customer, access the plurality of interconnection assets to satisfy the request.

In some examples, cloud-based services exchange comprises a plurality of interconnection assets configured to connect a customer of the cloud-based services exchange to one or more cloud service providers, the plurality of interconnection assets including a virtual circuit by which the customer accesses a cloud service from the one or more cloud service providers; and an orchestration engine configured to modify the plurality of interconnection assets.

In some examples, a method comprises executing, by a cloud-based services exchange on one or more management devices within a network data center, an interconnection platform to present a software interface reachable by networks associated with a plurality of customers; and in response to receiving a request issued by an application executing within any of the networks associated with the customer, access a plurality of interconnection assets of the network data center to satisfy the request, wherein the network data center includes respective ports by which a plurality of networks connect to the network data center, each of the networks having a different network address space and associated with a different one of a plurality of customers or cloud service providers, and wherein a plurality of interconnection assets within the network data center connect, through a switching fabric of the network data center, each of the networks associated with the plurality of customers of the cloud-based services exchange to one or more of the networks associated with the cloud service providers, the plurality of interconnection assets including a respective set of one or more virtual circuits for each of the networks associated with the plurality of customers and providing network connectivity within the network data center between the networks associated with the plurality of customers and cloud services executing from within the networks associated with the plurality of cloud service providers.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

In general, this disclosure describes an interconnection platform for real-time configuration and management of a cloud-based services exchange ("cloud exchange"). As described herein, the interconnection platform provides customers of the exchange, e.g., enterprises, network carriers, and SaaS customers, with secure, private, virtual connections to multiple cloud service providers (CSPs) globally. The multiple CSPs participate in the cloud exchange by virtue of their having at least one accessible port in the cloud exchange by which a customer can connect to the one or more cloud services offered by the CSPs, respectively.

According to various examples described herein, a cloud exchange is described that allows private networks of any customer to be directly cross-connected to any other customer at a common point, thereby allowing direct exchange of network traffic between the networks of the customers. Customers may include network carriers (or network service providers), enterprises, and other users of cloud services offered by one or more cloud service providers.

Figure 1A:
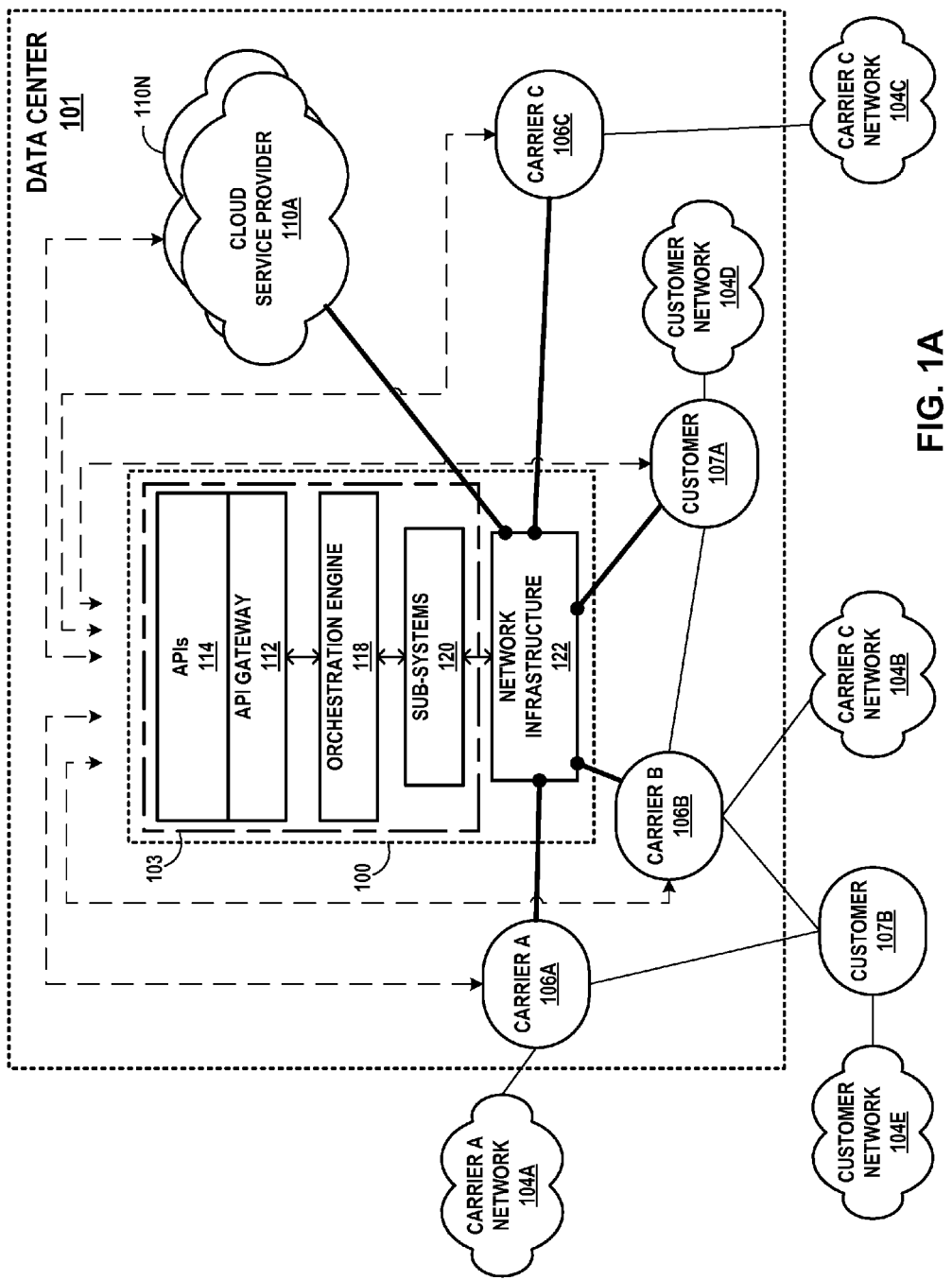
FIG. 1A is a block diagram that illustrates a high-level view of a data center that provides an operating environment for a cloud-based services exchange.

FIG. 1A is a block diagram that illustrates a high-level view of a data center 101 that provides an operating environment for a cloud-based services exchange 100. Cloud-based services exchange 100 ("cloud exchange 100") allows a corresponding one of customer networks 104D, 104E and carrier networks 104A-104C (collectively, "private networks 104") of any carriers 106A-106C (collectively, "carriers 106") or other cloud customers including customers 107A, 107B to be directly cross-connected, via a virtual layer 2 (L2) or layer 3 (L3) connection to any other customer network and/or to any of cloud service providers 110A-110N (collectively, "CSPs 110"), thereby allowing direct exchange of network traffic among the customer networks and CSPs 110.

Carriers 106 may each represent a network service provider that is associated with a transit network by which network subscribers of the carrier 106 may access cloud services offered by CSPs 110 via the cloud exchange 100. In general, customers of CSPs 110 may include network carriers, large enterprises, managed service providers (MSPS), as well as Software-as-a-Service (SaaS), Platform-aaS (Paas), Infrastructure-aaS (IaaS), Virtualization-aaS (VaaS), and data Storage-aaS (dSaaS) customers for such cloud-based services as are offered by the CSPs 110 via the cloud exchange 100.

In this way, cloud exchange 100 streamlines and simplifies the process of partnering CSPs 110 and customers (via carriers 106 or directly) in a transparent and neutral manner. One example application of cloud exchange 100 is a co-location and interconnecting data center in which CSPs 110 and carriers 106 and/or customers 107 may already have network presence, such as by having one or more accessible ports available for interconnection within the data center. This allows the participating carriers, customers, and CSPs to have a wide range of interconnectivity options in the same facility. Cloud exchange 100 of data center 101 includes network infrastructure 122 that provides a L2/L3 switching fabric by which CSPs 110 and customers/carriers interconnect. This enables a carrier/customer to have options to create many-to-many interconnections with only a one-time hook up to the switch fabric and underlying interconnection platform 103 of cloud exchange 100. In other words, instead of having to establish separate connections across transit networks to access different cloud service providers or different cloud services of one or more cloud service providers, cloud exchange 100 allows customers to interconnect to multiple CSPs and cloud services using network infrastructure 122 within data center 101.

By being connected to and utilizing cloud exchange 100, customers can purchase services and reach out to many end users in many different geographical areas without incurring the same expenses typically associated with installing and maintaining multiple virtual connections with multiple CSPs 110. For example, carrier 106A can expand its services using network 104D of carrier 106D. By connecting to cloud exchange 100, a carrier 106 may be able to generate additional revenue by offering to sell its network services to the other carriers. For example, carrier 106D can offer the opportunity to use carrier network 104D to the other carriers.

In some example implementations described herein, cloud exchange 100 includes an interconnection platform 103 that exposes a collection of software interfaces, also referred to herein as application programming interfaces (APIs) 114 in that the APIs 114 define the methods, fields, and/or other software primitives by which applications may invoke the interconnection platform 103. The software interfaces allow carriers 106 and customers 107 programmable access to capabilities and assets of the cloud exchange 100.

On the buyer side, the software interfaces presented by the underlying interconnect platform provide an extensible framework that allows software developers associated with the customers of cloud exchange 100 to create software applications that allow and leverage access to the interconnect platform by which the applications may request that the cloud exchange establish connectivity to cloud services offered by any of the CSPs 110. For example, these buyer-side software interfaces (or "buyer APIs" of APIs 114) may allow customer applications for NSPs and enterprise customers, e.g., to obtain authorization to access the cloud exchange, obtain information regarding available cloud services, obtain active ports and metro area details for the customer, create virtual circuits of varying bandwidth to access cloud services (including dynamic selection of bandwidth based on a purchased cloud service to create on-demand and need based virtual circuits to cloud service providers), delete virtual circuits, obtain active virtual circuit information, obtain details surrounding CSPs partnered with the cloud exchange provider, obtain customized analytics data, and validate partner access to interconnection assets.

On the cloud provider (seller) side, the software interfaces may allow software developers associated with cloud providers to manage their cloud services and to enable customers to connect to their cloud services. For example, these seller-side software interfaces (or "seller APIs" of APIs 114) may allow cloud provider applications to obtain authorization to access the cloud exchange, obtain information regarding available cloud services, obtain active ports and metro area details for the provider, obtain active port details in a given data center for the provider, approve or reject virtual circuits of varying bandwidth to access cloud services created by customers, obtain virtual circuits pending addition and confirm addition of virtual circuits, obtain virtual circuits pending deletion and confirm deletion of virtual circuits, obtain customized analytics data, and validate partner access to interconnection assets.

As further described herein, the APIs 114 facilitate machine-to-machine communication to enable dynamic provisioning of virtual circuits in the cloud exchange for interconnecting customer and provider networks. In this way, the interconnection platform 103 enables the automation of aspects of cloud services provisioning. For example, the software interfaces may provide an automated and seamless way for customers to establish, de-install and manage interconnection with multiple, different cloud providers participating in the cloud exchange.

In some examples, cloud exchange 100 includes an API gateway 112 having one or more processors that executes one or more applications that expose software interfaces defined according to APIs 114. The applications may invoke services that correspond to endpoints of the APIs 114, and the services may themselves invoke the cloud exchange platform service of orchestration engine 118. API gateway 112 may execute on a management device such as one or virtual machines and/or real servers of data center 101. Although shown as a single element in FIG. 1A, API gateway 112 may comprise a cluster of one or more physical and/or virtual computing machines executing on one or more physical processors.

In some examples, cloud exchange includes an orchestration engine 118 that organizes, directs and integrates underlying software sub-systems 120 for managing various aspects of interconnection within the network infrastructure 122 as well as cloud services management. The orchestration engine 118 may, for example, provide a rule-drive workflow engine that operates between the APIs 114 and the underlying interconnect platform of cloud exchange 100 that includes sub-systems 120 and network infrastructure 122. In this way, the orchestration engine 118 can be used by customer-proprietary applications and the APIs 114 for direct participation with the interconnection platform 103 of the cloud exchange 100. In other words, the orchestration engine 118 offers a "cloud exchange platform service" having various application engines or workflows to handle the API gateway 112 service requests.

Sub-systems 120 and orchestration engine 118 may each be centralized or distributed applications and may execute on a management device such as one or virtual machines and/or real servers of data center 101.

Network infrastructure 122 represents the cloud exchange switching fabric and includes multiple ports that may be dynamically interconnected with virtual circuits using by invoking APIs 114 according to techniques described herein. Each of the ports is associated with one of carriers 106, customers 107, and CSPs 110. A virtual circuit may refer to, e.g., an Ethernet connection such as a Layer 2 VPN or virtual private LAN (e.g., E-LINE, E-LAN, E-TREE, or E-Access), an Internet exchange-based interconnection in which respective routers of interconnected customers directly peer and exchange layer 3 routes for service traffic exchanged via the exchange 100, and a cloud exchange in which customer routers peer with exchange 100 (or "provider") routers rather than directly with other customers. Example details of a cloud exchange are provided below with respect to FIGS. 18A, 18B, and 19.

For interconnections at layer-3 or above, customers 107 and carriers 106 may receive services directly via a layer 3 peering and physical connection to exchange 100 or indirectly via one of carriers 106. Carriers 106 provide "transit" by maintaining a physical presence within one or more of exchanges and aggregating layer 3 access from one or customers 107. Carriers 106 may peer, at layer 3, directly with one or more exchanges and in so doing offer indirect layer 3 connectivity and peering to one or more customers 107 by which customers 107 may obtain services from the exchange 100.

Figure 1B:
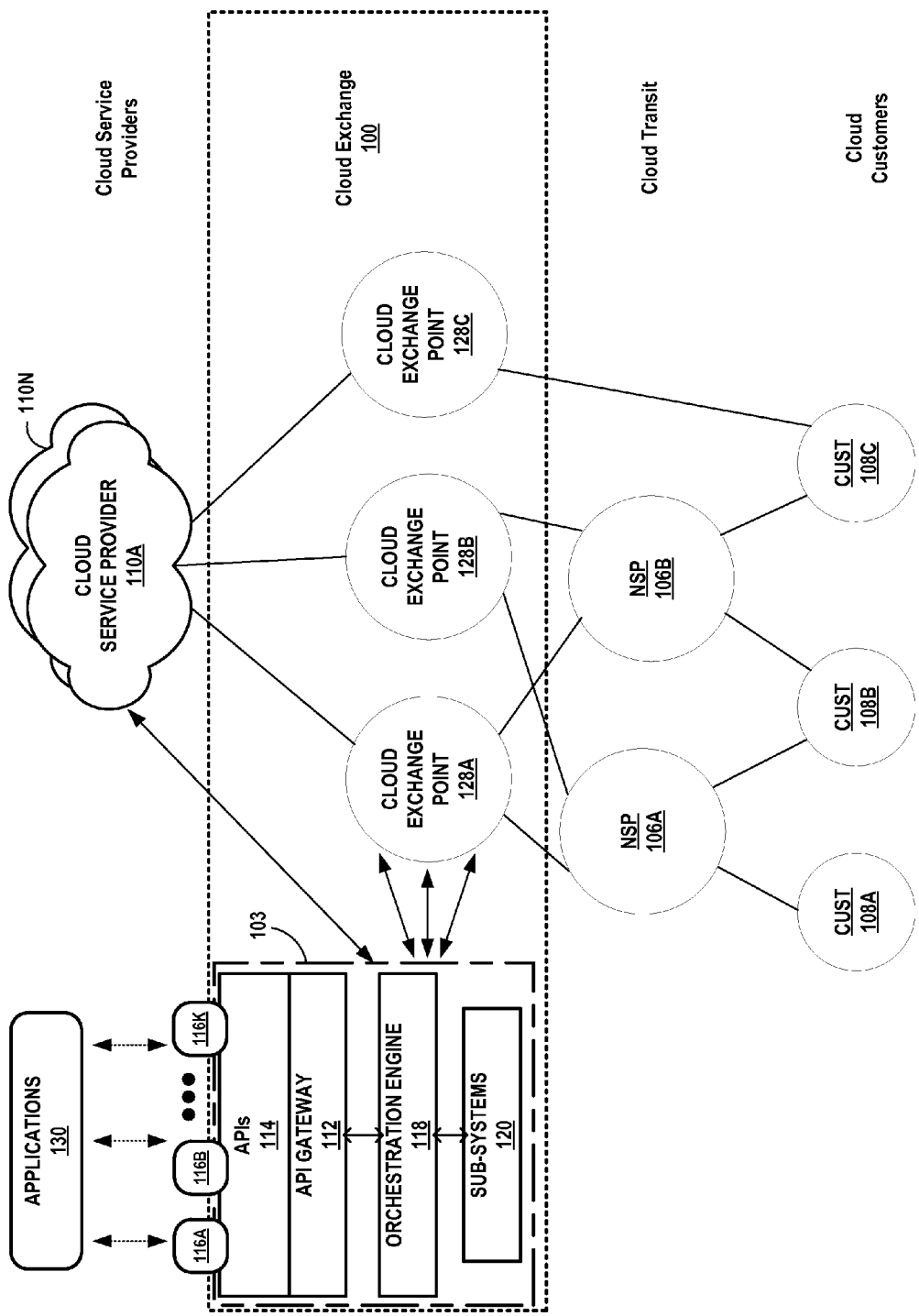
FIG. 1B is a block diagram that illustrates cloud-based services exchange, in accordance with some example implementations described here.

FIG. 1B is a block diagram that illustrates cloud-based services exchange 100, in accordance with some example implementations described here. In this example architecture, cloud exchange 100 includes multiple cloud exchange points 128A-128C (also described as "cloud exchange points" and collectively referred to as "cloud exchange points 128"), which may represent geographically distributed data centers within a metropolitan area and in which cloud exchange 100 may directly or indirectly (via NSPs 106) interconnect cloud services providers 110 with cloud customers 108 accessing cloud services.

Applications 130 developed and deployed by CSPs 110, NSPs 106, and customers 108 invoke APIs 114 of interconnection platform 103 to, for example, automatically control provisioning and manage aspects of cloud exchange 100 for aspects of interconnection with one or more cloud providers/customers, including: (1) provisioning of interconnects, (2) identification and authorization of carriers, (3) management and fulfillment of orders, (4) delivery of network services, (5) managing inventory and capacity, (6) managing and reporting/alerting incidents, and (7) content management.

In this example, APIs 114 includes endpoints 116A-116K (collectively, "endpoints 116") that each represents a resource exposed by interconnection platform 103. Examples of endpoints are described below in further detail with respect to FIG. 3A. Applications 130 may interact with API gateway 112 according to client/server model. Applications 130 may send a request directed to any of endpoints 116 of APIs 114. API gateway 112, in response to requests, invokes the cloud exchange platform service of orchestration engine 118, which may orchestrate a workflow of service tasks for the underlying sub-systems 120 to satisfy the request. In response to the request, e.g., upon completion of the workflow, API gateway 112 may send a response to the requesting application 130 from the endpoint 116 invoked.

In some examples, APIs 114 may conform to a Representational State Transfer model, i.e., be a RESTful interface, with endpoints 116 representing different methods of the RESTful interface. Applications 130 may invoke any of endpoints 116 using a communication protocol for transferring application data (e.g. HTTP) that specifies the method, a resource Uniform Resource Identifier (URI), and optionally parameters for the method. API gateway 112 translates the resource URI and the optional parameters to cloud exchange platform-related constructs and invokes the cloud exchange platform of orchestration engine 118 according to one of a create, read, update, and delete (CRUD) or confirmation action corresponding to the endpoint 116 specified by the application data. In HTTP parlance, the create action corresponds to the POST method, read to the GET method, and confirmation to the PATCH method, for example.

Sub-systems 120 may apply the service tasks orchestrated by orchestration engine 118, which may include modifying any of cloud exchange points 128 to perform the on-demand setup of virtual circuits between CSPs 110 and customers 108, for example, or otherwise manage cloud exchange points 128 interconnection assets such as ports, metros, data centers, virtual circuits and virtual circuit bandwidth, profiles, and configuration.

Cloud exchange 100 of FIG. 1B illustrates a metro-based cloud exchange that provides multiple cloud exchange points according to techniques described herein. Each of cloud-based services exchange points 128A-128C of cloud-based services exchange 100 may represent a different data center geographically located within the same metropolitan area ("metro-based," e.g., in New York City, N.Y.; Silicon Valley, Calif.; Seattle-Tacoma, Wash.; Minneapolis-St. Paul, Minn.; London, UK; etc.) to provide resilient and independent cloud-based services exchange by which cloud-based services customers ("cloud customers") and cloud-based service providers ("cloud providers") connect to receive and provide, respectively, cloud services. In various examples, cloud exchange 100 may include more or fewer cloud exchange points 128. In some instances, a cloud exchange 100 includes just one cloud exchange point 128. As used herein, reference to a "cloud exchange" or "cloud-based services exchange" may refer to a cloud exchange point. A cloud exchange provider may deploy instances of cloud exchanges 100 in multiple different metropolitan areas, each instance of cloud exchange 100 having one or more cloud exchange points 128.

Each of cloud exchange points 128 includes network infrastructure and an operating environment by which cloud customers 108A-108D (collectively, "cloud customers 108") receive cloud services from multiple cloud service providers 110A-110N (collectively, "cloud service providers 110"). Cloud customers 108 may receive cloud services directly via a layer 3 peering and physical connection to one of cloud exchange points 128 or indirectly via one of network service providers 106A-106B (collectively, "NSPs 106," or alternatively, "carriers 106"). NSPs 106 provide "cloud transit" by maintaining a physical presence within one or more of cloud exchange points 128 and aggregating layer 3 access from one or customers 108. NSPs 106 may peer, at layer 3, directly with one or more cloud exchange points 128 and in so doing offer indirect layer 3 connectivity and peering to one or more customers 108 by which customers 108 may obtain cloud services from the cloud exchange 100. Each of cloud exchange points 128, in the example of FIG. 1B, may be assigned a different autonomous system number (ASN). For example, cloud exchange point 128A may be assigned ASN 1, cloud exchange point 128B may be assigned ASN 2, and so forth. Each cloud exchange point 128 is thus a next hop in a path vector routing protocol (e.g., BGP) path from cloud service providers 110 to customers 108. As a result, each cloud exchange point 128 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more cloud service providers 110 to customers. In other words, cloud exchange points 128 may internalize the eBGP peering relationships that cloud service providers 110 and customers 108 would maintain on a pair-wise basis. Instead, a customer 108 may configure a single eBGP peering relationship with a cloud exchange point 128 and receive, via the cloud exchange, multiple cloud services from one or more cloud service providers 110. While described herein primarily with respect to eBGP or other layer 3 routing protocol peering between cloud exchange points and customer, NSP, or cloud service provider networks, the cloud exchange points may learn routes from these networks in other way, such as by static configuration, or via Routing Information Protocol (RIP), Open Shortest Path First (OSPF), Intermediate System-to-Intermediate System (IS-IS), or other route distribution protocol.

As examples of the above, customer 108D is illustrated as having contracted with a cloud exchange provider for cloud exchange 100 to directly access layer 3 cloud services via cloud exchange points 128C, 128D. In this way, customer 108D receives redundant layer 3 connectivity to cloud service provider 110A, for instance. Customer 108C, in contrast, is illustrated as having contracted with the cloud exchange provider for cloud exchange 100 to directly access layer 3 cloud services via cloud exchange point 128C and also to have contracted with NSP 106B to access layer 3 cloud services via a transit network of the NSP 106B. Customer 108B is illustrated as having contracted with multiple NSPs 106A, 106B to have redundant cloud access to cloud exchange points 128A, 128B via respective transit networks of the NSPs 106A, 106B. The contracts described above are instantiated in network infrastructure of the cloud exchange points 128 by L3 peering configurations within switching devices of NSPs 106 and cloud exchange points 128 and L3 connections, e.g., layer 3 virtual circuits, established within cloud exchange points 128 to interconnect cloud service provider 110 networks to NSPs 106 networks and customer 108 networks, all having at least one port offering connectivity within one or more of the cloud exchange points 128.

For layer 3 cloud services, a virtual circuit may represent a layer 3 path through an IP/MPLS fabric of one or more of cloud exchange points 128, between an attachment circuit connecting a customer network to the cloud exchange point and an attachment circuit connecting a cloud service provider network to the cloud exchange point. Each virtual circuit may include at least one tunnel (e.g., an LSP and/or Generic Route Encapsulation (GRE) tunnel) having endpoints at the provider edge/autonomous system boundary of the cloud exchange point.

Cloud exchange points 128 may be configured to implement multiple layer 3 virtual circuits to interconnect customer/NSP networks and cloud service provider networks with end-to-end IP paths. Each of cloud service providers and customers/NSPs may be an endpoint for multiple virtual circuits, with multiple virtual circuits traversing one or more cloud exchange points 128 to connect the endpoints. An example implementation of a cloud exchange point is described in further detail below with respect to FIGS. 18A-18B and 19.

Figure 1C:
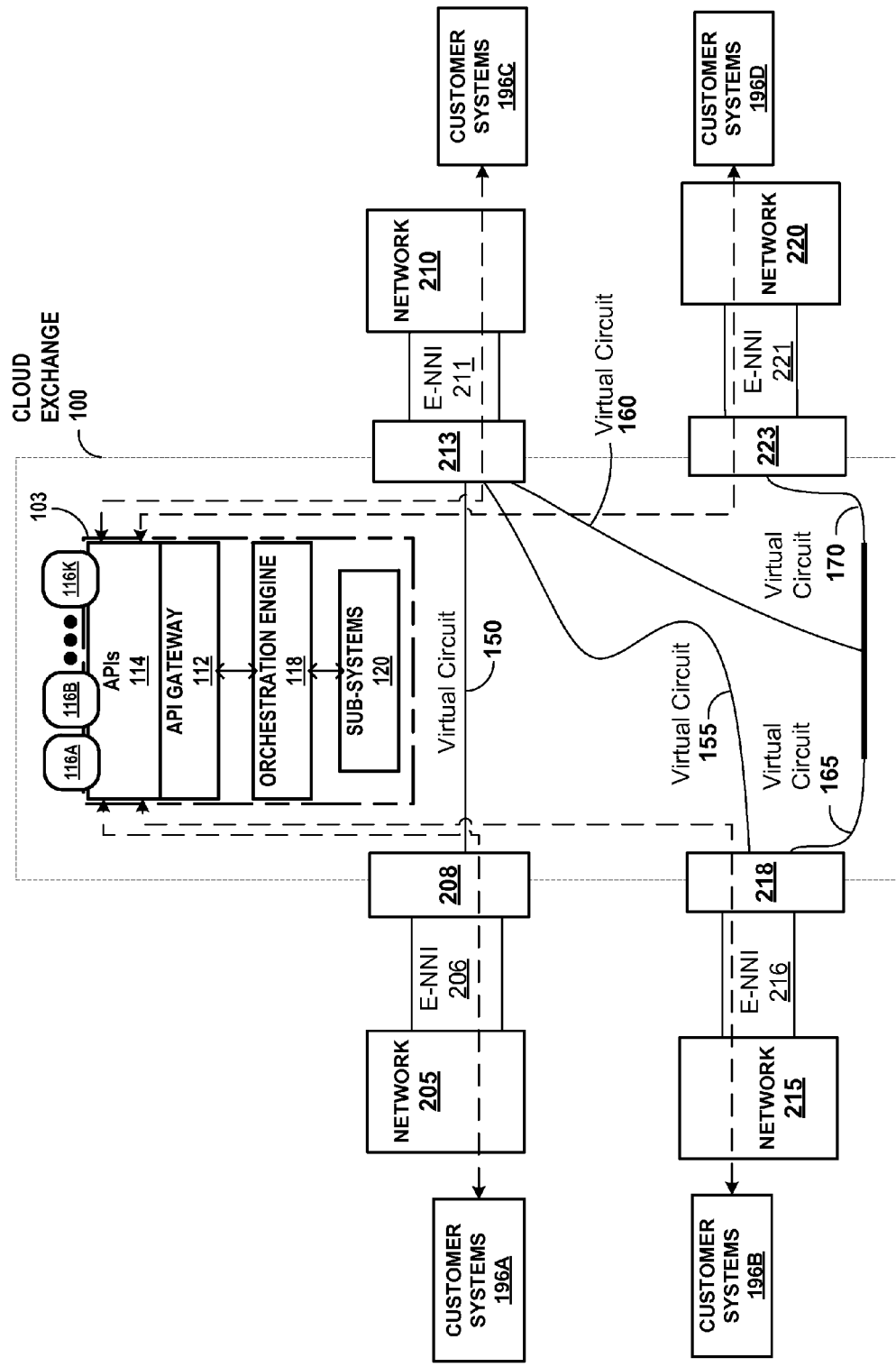
FIG. 1C illustrates another example implementation of a cloud-based services exchange.

FIG. 1C illustrates another example implementation of a cloud-based services exchange. In this example, cloud exchange 100 provides high-speed attachment circuits 208, 213, 218 and 223 and routing and switching infrastructure for provisioning direct, virtual circuits 150, 155, 160, 165, 170, collectively referred to as an interconnect-platform, for cross-connecting carrier networks 205, 210, 215 and 220.

As shown in the example of FIG. 1B, cloud exchange 100 exposes a collection of software interfaces 114, also referred to herein as application programming interfaces (APIs), that allow customer systems 196 programmatic access to capabilities and assets of the interconnection platform 103 of cloud exchange 100. That is, software interfaces 114 provide an extensible framework that allows software developers associated with the customers of cloud exchange 100 to create software applications executable on customer systems 196 that allow and leverage access subsystems 120 of exchange 100. Underlying subsystems 120 of exchange 100 may, for example, control provisioning and managing of all aspects of exchange 100, including: (1) provisioning interconnects between customer system 196, (2) identification and authorization of carriers, (3) management and fulfillment of orders, (4) delivery of network services, (5) managing inventory and capacity, (6) managing and reporting/alerting incidence and (7) content management.

As such, carriers 106 and other customers of cloud exchange 100, such as network services providers, cloud services providers, managed service providers and other enterprises may make use the software interfaces exposed by the interconnect platform to manage their direct cross-connects with other carriers. That is, software interfaces 114 enable machine-to-machine communication, shown as dotted arrows in FIG. 1C, between network infrastructure and provisioning/billing/accounting/AAA systems positioned within different carrier networks 205, 210, 215 and 220 for carriers 106 establishing and managing direct cross-connects. As such, software interfaces 114 enable near real-time setup and modifications of interconnections, e.g., virtual circuits of FIG. 1C, and may also eliminate or reduce the need for human interaction for the entire interconnection set-up and management process. In this way, the software interfaces provide an automated and seamless way for carriers 106 to establish, de-install and manage interconnection with multiple, different customers participating in an interconnection platform 103.

Moreover, as further shown in the example of FIG. 1B, cloud exchange 100 includes an internal orchestration engine 118 that organizes, directs and integrates underlying software and network sub-systems 120 for managing various aspects of the interconnection services provided by cloud exchange 100. Orchestration engine 118 may, for example, provide a rule-drive workflow engine that operates between APIs 114 and the underlying interconnect platform provided by subsystems 120 of cloud exchange 100. In this way, orchestration engine 118 can be invoked by customer-proprietary applications executing on customer systems 196 by way of APIs 190 for direct participation within the interconnection platform of the cloud exchange.

As described herein, orchestration engine 118 synthesizes the information and actions from underlying sub-systems 120 of the interconnect platform to formulate intelligent next steps and responses to the customer applications. As such, orchestration engine 118 abstracts the complexity of the underlying software and network sub-systems 120 of the cloud exchange 100 by providing a uniform, simplified and secured means to access the interconnection platform.

Figure 1D:
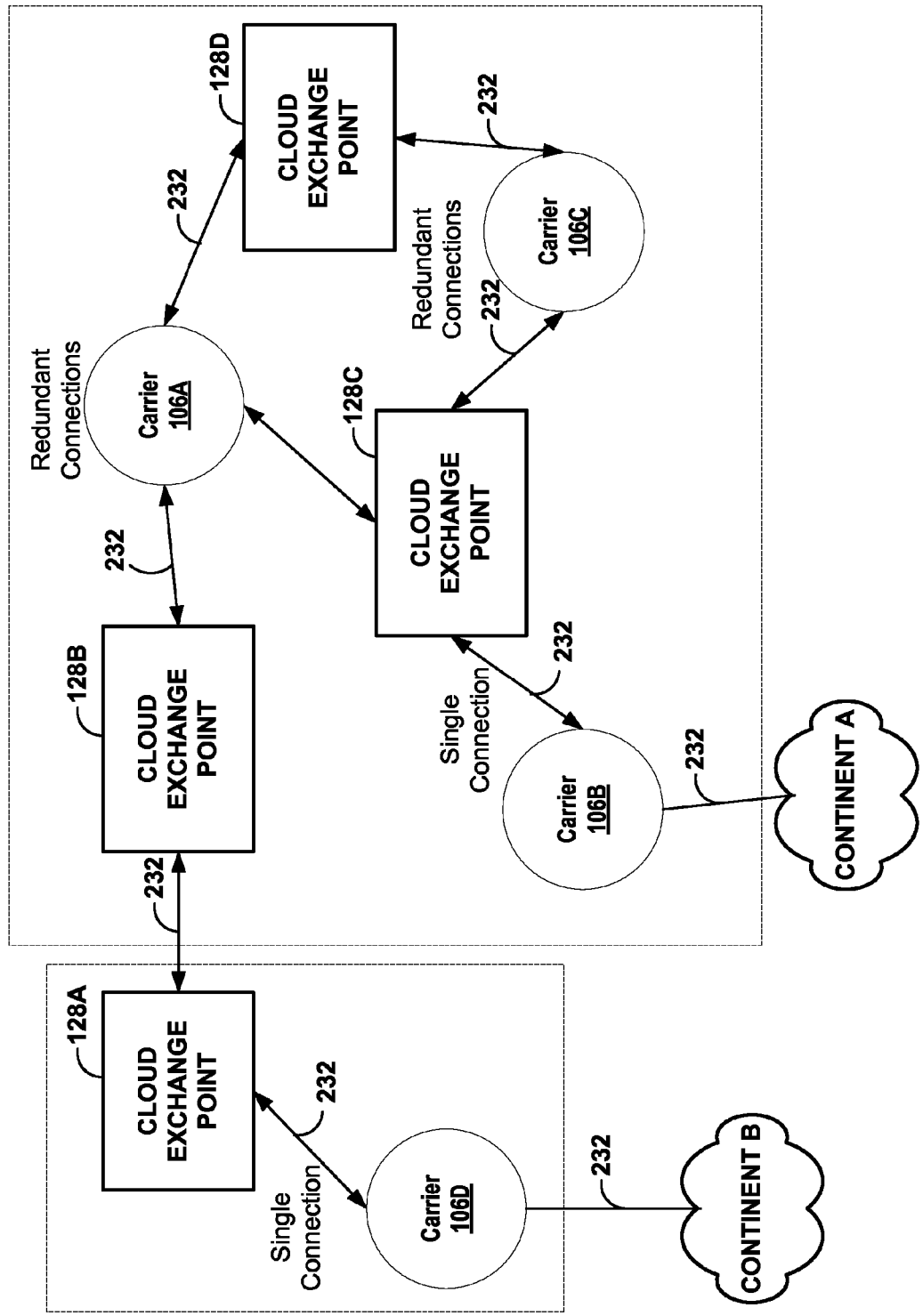
FIG. 1D is a block diagram illustrating an example in which a plurality of cloud exchanges points of a cloud exchange managed by an interconnection platform, accordingly to techniques of this disclosure, provide cross-connect availability between geographically distributed carriers.

FIG. 1D is a block diagram illustrating an example in which a plurality of cloud exchanges points of a cloud exchange 100 managed by an interconnection platform, accordingly to techniques of this disclosure, provide cross-connect availability between geographically distributed carriers. Although not shown, each of cloud exchange points may implement the example techniques described with respect to the cloud exchanges 100 of FIGS. 1A-1C including cloud exchange points 128 of FIG. 1B.

Figure 2:
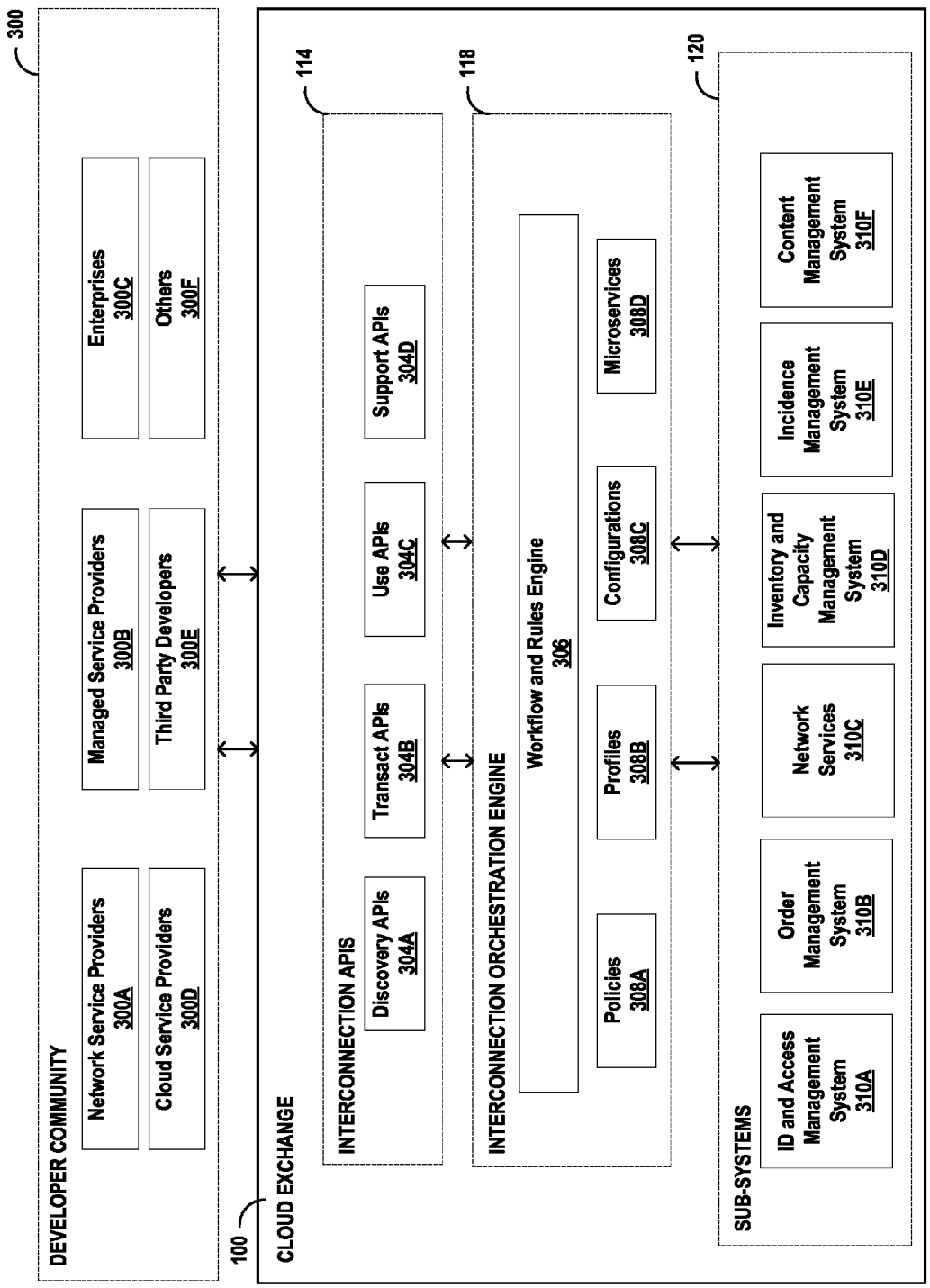
FIG. 2 is a block diagram that illustrates details of an example architecture for a cloud exchange according to techniques described herein.

FIG. 2 is a block diagram that illustrates details of an example architecture for a cloud exchange according to techniques described herein. As shown in this example, example cloud exchange 100 illustrates APIs 114, internal orchestration engine 118, and sub-systems 120 in further detail.

Developer community 300 illustrates entities that may develop applications that use APIs 114 to access the interconnection platform of the cloud exchange 100. These entities include network service providers 300A, managed service providers 300B, enterprises 300C, cloud service providers 300D, third-party developers 300E, and others 300F. Applications developed by these entities utilize cloud exchange 100 as an interconnection platform for interconnecting customers to cloud services offered by cloud services providers according to the policies and profiles of the various entities.

In this example, APIs 114 includes bundles of the various API methods or endpoints according to function. Discovery APIs 304A may be usable to perform availability of location discovery, asset discovery, and cloud service discovery. Discoverable information may include available metropolitan areas, data centers, ports, services, virtual circuits, and other interconnection assets by which a customer may obtain or manage cloud services. Transact APIs 304B may be usable to dynamically provision end-to-end virtual circuits of varying bandwidths through machine-to-machine interaction, validate virtual circuits requested by a customer, and confirm deletion of virtual circuits, for example. Use APIs 304C may be usable to allow providers and customers to dynamically obtain recommendation information as performed by a recommendation engine of cloud exchange 100, obtain customized analytics regarding competitor presence, cloud service presence/availability, and customer presence/availability, obtain usage statistics, and to manage content, for example. Support APIs 304D may be usable by customers or providers to manage accounts, perform automated billing/invoicing, validate credit, and configure profile and configuration information for the entity, for example.

In this example, orchestration engine 118 (illustrated as "interconnection orchestration engine 118") organizes, directs, and integrates underlying software and network sub-systems 120 for managing various aspects of interconnection. For example, orchestration engine 118 may handle the entire quote-to-cash cycle for provisioning of interconnection assets by communicating with myriad interconnection enablement sub-systems 120, such as Customer Account and Profile Management Systems, Customer Asset Management Systems, Inventory Management Systems, Capacity Management Systems, Network Systems, Credit Management Systems, Content Management Systems, and Trouble Ticket Management System (not all shown in FIG. 2). To that end, orchestration engine 118 includes a workflow and rules engine 306 that responsively operates according to configured exchange policies 308A, profiles 308B, and configurations 308C to synthesize information and actions from sub-systems 120 to formulate intelligent next steps and responses to requests received via APIs 114. Microservices component 308D componentizes many, and in some cases all, of the interconnection services to improve horizontal scalability, performance efficiency, and low-to-zero down-time feature upgrades and enhancements. In this way, orchestration engine 118 may abstract the complexity of underlying software and sub-systems 120 by providing a uniform, simplified and secured means to access the interconnection platform for accessing and managing interconnection assets.

Sub-systems 120 orchestrated by orchestration engine 118 in the example of FIG. 2 include identification (ID) and access management system 310A. In some examples, ID and access management system 310A includes a Permission Data Store (PDS) to house the customer, asset and permission hierarchy. ID and access management system 310A may accomplish federation using a third party system which generates Security Assertion Markup Language (SAML) assertions and is also capable of providing Single Sign-On (SSO) capability.

Orchestration engine 118 may orchestrate multiple order management systems 310B (e.g., for different regions such as Asia Pacific, Europe, Middle East and Africa and North America). Orchestration engine 118 passes relevant virtual circuit order creation information to these order management systems 310B so that the partners can be billed. Orchestration engine 118 may abstract the complexity of the underlying network systems by seamlessly integrating with the network services system 310C to interact with the underlying network systems. Orchestration engine 118 may leverage an asset inventory and capacity management system 310D in conjunction with the Permission Data Store to obtain information about customer ports inventory. Orchestration engine 118 may leverage this information to place virtual circuit requests against the appropriate ports. Asset inventory and capacity management system 310D may be used to evaluate the available bandwidth on each port before provisioning of the virtual circuits.

Orchestration engine 118 accepts incident requests from partners and customers and communicates with the underlying incident management system 310E to raise service tickets. Orchestration engine 118 communicates with the content management system 310F to, e.g., render internationalized and localized content for a customer based on the language preference of the customer. Content management system 310F aids in transparent translation of all labels, error messages, success messages and responses displayed on the web portal, mobile devices or in machine-to-machine communication via APIs 114.

Figure 3A:
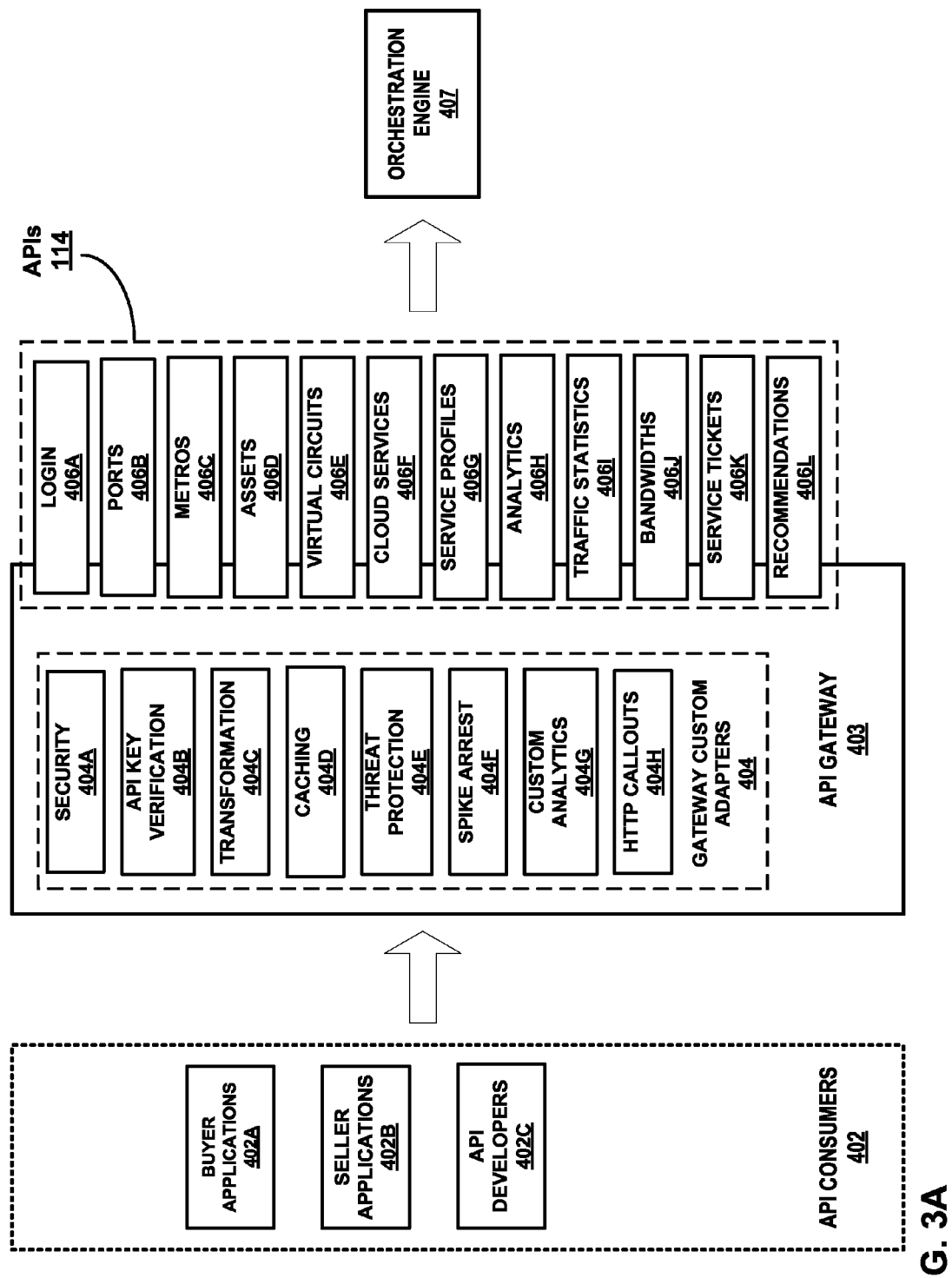
FIGS. 3A-3B depict a flow diagram for interconnection software interfaces according to techniques described herein.
Figure 3B:
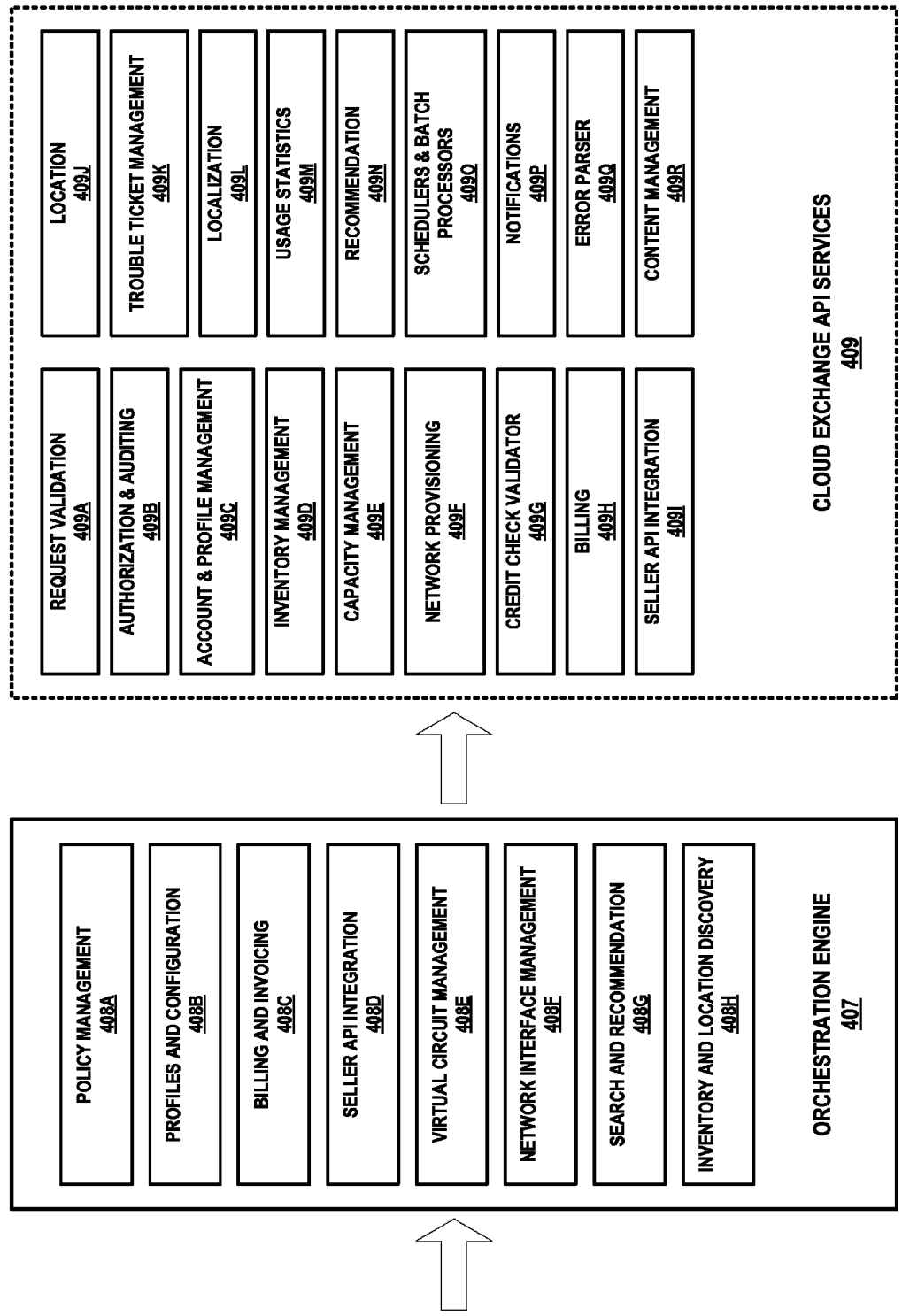

FIGS. 3A-3B depict a flow diagram for interconnection software interfaces according to techniques described herein. In this example, API gateway 403 exposes an API 114 having multiple endpoints 406A-406L (collectively, "endpoints 406") by which API consumers 402 may manage cloud exchange interconnections. API gateway 403, in turn, invokes the cloud service platform of orchestration engine 407, which orchestrates a workflow of service tasks represented in FIGS. 3A-3B by cloud exchange API services 409. API gateway 403 may represent an example instance of API gateway 112 of FIGS. 1A-1D, orchestration engine 407 may represent an example instance of orchestration gateway 118 of FIGS. 1A-1D, and sub-systems 120 of FIGS. 1-2 may offer cloud exchange API services 409.

API consumers 402 may include buyer applications 402A and seller applications 402B, as well as API developers 402C that may develop such applications. API gateway 403 includes a number of customer adaptors 404 that facilitate the operations of API gateway 403. Custom adaptors 404 include security 404A, API key verification 404B, transformation 404C, caching 404D, threat protection 404E, spike arrest 404F, custom analytics 404G, and HTTP callouts 404H.

Endpoints 406 represent available logical and/or physical resources accessible to API consumers 402. That is, API consumers 406 may access endpoints 406 to access the interconnection platform of a cloud exchange to get information regarding, create, modify, delete, and/or confirm requests for corresponding resources of the cloud exchange. Endpoints 406 may represent example instances of endpoints 116 of FIGS. 1B-1C.

In this example, endpoints 406 include login 406A, ports 406B, metros 406C, assets 406D, virtual circuits 406E, cloud services 406F, service profiles 406G, analytics 406H, traffic statistics 406I, bandwidths 406J, service tickets 406K, and recommendations 406L. In general, API consumers 406 may invoke any of endpoints 406 using a corresponding method and, in some cases, parameters that determine how the interconnection platform executes the method.

Endpoints 406 may represent different methods of a RESTful interface. API consumers 402 may invoke any of endpoints 406 using a communication protocol for transferring application data (e.g. HTTP) that specifies the method, a resource URI, and optionally parameters for the method. API gateway 403 translates the resource URI and the optional parameters for the endpoint 406 to cloud exchange platform-related constructs and invokes the cloud exchange platform of orchestration engine 407 according to one of a create, read, update, delete, or confirmation action corresponding to the endpoint 406 specified by the application data.

APIs-Examples

The following sections contain example details for selected endpoints 406 of APIs 114 for a cloud exchange 100. The API 114 provides functionality for allowing developers to access the interconnect platform for ordering and viewing virtual circuits. This API functionality includes getting information about and performing operations on Login 406A, Ports 406B, Virtual Circuits 406E, Metros 406C, and Cloud Services 406F.

In one example, endpoints 406 of APIs 114 may be categorized into three major categories:
  Foundational APIs—these APIs are common to both the buyer and the seller.
  Buyer APIs—These are the APIs that are used by the Enterprises, Network Service Providers (NSP) and Managed Service Providers (MSP) to establish connectivity to cloud services offered by the different Cloud Service Providers (CSPs).
  Seller APIs—These APIs are used by the CSPs to manage their cloud services at cloud exchange 100 and to enable buyers to connect to their services.

The APIs are broadly categorized into operations that can be performed on different resources. This section also details the common request headers that are required to be included as part of every request and also the response headers that are returned back with each API response. In addition, this section describes the HTTP status and custom error codes used as part of the API response in the event of any error condition.

The tables below show an overview of the API resources, their respective URIs, and supported operations on each resource. The APIs are divides in three major sections: Buyer, Seller, and Foundational APIs. Reference herein to XML refers to eXtensible Markup Language, while JSON refers to JavaScript Object Notation.

Foundational API Overview

| Resource | HTTP Operations | URI |
|---|---|---|
| Access Token | POST | POST /oauth2/v1/token |
| Metros | GET | GET /ecx/v1/metros |
| Cloud Services | GET | GET /ecx/v1/cloudservices |
|  |  | GET /ecx/v1/cloudservices/{cloud_service_name} |
| Refresh token | POST | POST / oauth2/v1/ refreshaccesstoken |

Buyer API Overview

| Resource | HTTP Operations | URI |
|---|---|---|
| Ports | GET | GET /ecx/v1/ports |
|  |  | GET /ecx/v1/ports/{port_name} |
| Virtual Circuits | GET, POST, DELETE, PATCH | GET /ecx/v1/virtualcircuits |
|  |  | POST /ecx/v1/virtualcircuits |
|  |  | GET /ecx/v1/virtualcircuits/{ virtual_circuit_id } |
|  |  | DELETE /ecx/v1/virtualcircuits/{ virtual_circuit_id } |
|  |  | PATCH/ecx/v1/virtualcircuits/{ virtual_circuit_id } |
| User Assets | GET | GET//ecx/v1/assets |
| Seller Services | GET | GET ecx/v1/sellerservices, |
|  |  | GET ecx/v1/sellerservices/{seller_service_name} |
| Seller Service Profiles | GET | GET /ecx/v1/sellerserviceprofiles/{profile_name}/metadata |

Seller API Overview

| Resource | HTTP Operations | URI |
|---|---|---|
| Ports | GET | GET /ecx/v1/ports |
|  |  | GET /ecx/v1/ports/{port_name} |
| Virtual Circuits | GET, PATCH | GET /ecx/v1/virtualcircuits |
|  |  | PATCH /ecx/v1/virtualcircuits/{ virtual_circuit_id } |
|  |  | GET /ecx/v1/virtualcircuits/{ virtual_circuit_id} |
| User Assets | GET | GET /ecx/v1/virtualcircuits |
|  |  | PATCH /ecx/v1/virtualcircuits/{ virtual_circuit_id } |
|  |  | GET /ecx/v1/virtualcircuits/{ virtual_circuit_id } |
| Seller Service Profile | POST, PUT, DELETE | POST /ecx/v1/sellerserviceprofiles |
|  |  | POST |
|  |  | /ecx/v1/sellerserviceprofiles/{profile_name}/ports |
|  |  | PUT/ecx/v1/sellerserviceprofiles/{profile_name} |
|  |  | DELETE/ecx/v1/sellerserviceprofiles/{profile_name} |

HTTP Status Codes

The table below lists example HTTP status codes that can be utilized by APIs 114. There are specific error codes and messages which are returned back in error scenarios which are defined along with the appropriate API specification.

| HTTP Code | Description |
|---|---|
| 200 | OK |
| 201 | Created |
| 204 | No Content |

| HTTP Code | Description |
|---|---|
| 400 | Bad Request |
| 403 | Forbidden |
| 401 | Unauthorized |
| 404 | Not Found |
| 405 | Method not Allowed |
| 406 | Not Acceptable |
| 409 | Conflict |
| 415 | Unsupported Media Type |
| 500 | Internal Server Error |
| 503 | Service Unavailable |
| 504 | Gateway Timeout |

Common Request Headers
The following headers are required in requests to all APIs.

| Header Attribute | Allowed Values | Required | Description |
|---|---|---|---|
| Content-Type | application/json application/xml | Yes | The media type of the request body |
| Accept | application/json application/xml | Yes | The media types acceptable for the response |

Common Response Headers
The following header is included as part of all API responses

| Header Attribute | Allowed Values | Required | Description |
|---|---|---|---|
| Content-Type | application/json application/xml | Yes | The content type passed in the response body |

Error Response Syntax
The error responses from all APIs follow the common syntax shown below.

```
{
 "errors": [
  {
   "status": "string",
   "code": "string",
   "property": "string",
   "message": "string",
   "more_info": "string"
  } ] }
```

Error Response Message Fields

| errors | |
|---|---|
| Description | A list of errors |
| Type | List |
| Required | Yes |
| Default | None |
| Example | None |

| status | |
|---|---|
| Description | HTTP Status Code |
| Type | String |
| Required | Yes |
| Default | None |
| Example | 409 |

| code | |
|---|---|
| Description | Internal ECX Error Code |
| Type | string |
| Required | Yes |
| Default | None |
| Example | 40902 |

| property | |
|---|---|
| Description | Attribute Name that has errors |
| Type | string |
| Required | No |
| Default | None |
| Example | vlan_id |

| message | |
|---|---|
| Description | Description of the error |
| Type | string |
| Default | None |
| Example | Duplicate VLAN id: A VLAN with the same value already exists for this port |
| Required | No |

| more_info | |
|---|---|
| Description | More information about the error on the developer portal. |
| Type | string |
| Default | None |
| Example | https://api.developer.cloudexchange.com/docs/api/errors/40902 |
| Required | No |

Sample Error Response:

```
Content-Type: application/json
{
"errors": [
{
"code": 40007,
"message": "Invalid Field Value",
"more_info": "The field value port_name already exists for the specified profile name",
"property": "port_name",
"status": 400
}
]
}
```

In some examples, developers may be expected to generate API consumer Key and Consumer Secret using a developer platform before invoking the APIs.

Authentication

Developer acquires an access token through a valid login before invoking any APIs 114. Refer to the section describing login 406A for details.

Foundational APIs

Resource: Access Token or Login 406A.

Description: OAuth2.0 token for accessing APIs 114.

| HTTP Method | Request URI |
|---|---|
| POST | /oauth2/v1/token |

POST Access Token

Description: This API handles authentication and authorization of the API developer. Upon successful authentication an access_token is returned as part of the response. An error message is returned on unsuccessful attempts.

Request

Request URI: POST http://<HostName>/ecx/v1/oauth/token

Filter Parameters:
None

Request Headers:
None
Request Fields:

| grant_type | |
|---|---|
| Description | OAuth grant operation. Acceptable value: password |
| Type | String |
| Required | Yes |
| Default | None |
| Example | client_credentials |

| user_name | |
|---|---|
| Description | User name for login |
| Type | string |
| Required | Yes |
| Default | None |
| Example | tempuser1 |

| user_password | |
|---|---|
| Description | Password for login |
| Type | string |
| Required | Yes |
| Default | None |
| Example | xxxxxxx |

| client_id | |
|---|---|
| Description | API Consumer Key |
| Type | string |
| Required | Yes |
| Default | None |
| Example | QWERTY1234567afgaaaa |

| password_encoding | |
|---|---|
| Description | Password encoding used. If this field is not present the password is considered to be in plain text format. Password Encryption: Following encryption modes are supported: None Password sent as plaintext. md5-b64 The password is encoded using MD5/Base64 encoding. MD5 digest has to be generated in byte format (not MD5 hex digest) and then encoded into base64 (Recommended) b64 The password is encoded using Base64 |
| Type | string |
| Default | None |
| Required | No |
| Example | md5-b64 |

Sample Requests
POST http://<HostName>/ecx/v2/oauth/token
Password as plain text:

```
{
    "grant_type":"client_credentials",
    "user_name": "tempuser1",
    "user_password": "xxxxxxx",
    "client_id": "QWERTY1234567abcdefg",
    "client_secret": "tstCLNT123scrt"
}
```

Password encoded with md5 and then b64:

```
{
    "grant_type":"password",
    "user_name": "tempuser1",
    "user_password": "xxxxxxxxxxx",
    "client_id": "QWERTY1234567abcdefg",
    "client_secret": "tstCLNT123scrt",
    "password_encoding": "md5-b64"
}
```

Response:
Response Fields:

| access_token | |
|---|---|
| Description | The access token that must be passed in the HTTP header to access all API's |
| Type | string |
| Required | Yes |
| Default | None |
| Example | HihiOtaY2JAT0QaTFaYYyzHOqqmb |

| token_timeout | |
|---|---|
| Description | Timeout for the access token in seconds |
| Type | string |
| Required | Yes |
| Default | None |
| Example | 3599 |

| user_name | |
|---|---|
| Description | User Name |
| Type | string |
| Required | Yes |
| Default | None |
| Example | username |

| token_type | |
|---|---|
| Description | Type of access token |
| Type | string |
| Required | Yes |
| Default | Bearer |
| Example | Bearer |

| refresh_token | |
|---|---|
| Description | Refresh token that can be used for obtaining a new access token |
| Type | string |
| Required | No |
| Default | None |
| Example | QvJdZg7nMSTNYBfeDLgECpe5b9FvgWgdpZRwv4u0nZ |

| refresh_token_timeout | |
|---|---|
| Description | Timeout for the refresh token in seconds |
| Type | string |
| Required | No |
| Default | None |
| Example | 86376 |

Sample Response:

HTTP/1.1 200 OK
API-Version: v1
Content-Type: application/json
Accept: application/json
{
"access_token": "HihiOtaY2JAT0QaTFaYYyzHOqqmb",
"token_timeout": "3599",
"user_name": "tempuser1",
"token_type": "Bearer", -continued

```
"refresh_token": "QvJdZg7nMSTNYBfeDLgECpe5b9FvgWgdpZRwy4u0nZ",
"refresh_token_timeout": "86376"
}
```

Error Code in Response:

| HTTP Code | Error Code | Error Description |
|---|---|---|
| 400 | 40010 | Invalid value for grant_type. The acceptable value is "password" |
| 401 | 40101 | Authentication failed. Invalid username or password |
| 401 | 40103 | Invalid API Key |
| 406 | | Not Acceptable |
| 415 | | Unsupported Media Type |
| 500 | | Internal Server Error |

POST Refresh Token: Description: This API allows developer to refresh existing OAuth Token issued which will expire otherwise within 60 minutes. A valid refresh token is needed to retrieve a new successful authentication access_token that will be returned as part of the response.

Request

Request URI: POST http://<HostName>/oauth2/v1/refreshaccesstoken

Filter Parameters:
  None

Request Headers:
  None

Request Fields:

| grant_type | |
|---|---|
| Description | OAuth grant operation. Acceptable values: refresh_token. |
| Type | String |
| Required | Yes |
| Default | None |
| Example | Password |

| client_id | |
|---|---|
| Description | API Consumer Key |
| Type | String |
| Required | Yes |
| Default | None |
| Example | QWERTY1234567afgaaaa |

| refresh_token | |
|---|---|
| Description | Refresh token that can be used for obtaining a new access token |
| Type | string |
| Required | YES |
| Default | None |
| Example | 5f752714hsdf07a3e41c2a3311f514e1 |

Sample Requests

```
POST http://<HostName>/oauth2/v1/refreshaccesstoken
Refresh Token
{
  "grant_type":"refresh_token",
  "client_id": "QWERTY1234567abcdefg",
  "client_secret": "tstCLNT123scrt",
  "refresh_token": "51752714hsdf07a3e41c2a3311f514e1"
}
```

Response:
Response Fields:

| access_token | |
|---|---|
| Description | The access token that must be passed in the HTTP header to access all API's |
| Type | string |
| Required | Yes |
| Default | None |
| Example | HihiOtaY2JAT0QaTFaYYyzHOqqmb |

| token_timeout | |
|---|---|
| Description | Timeout for the access token in seconds |
| Type | string |
| Required | Yes |
| Default | None |
| Example | 3599 (1 hr) |

| user_name | |
|---|---|
| Description | User Name |
| Type | string |
| Required | Yes |
| Default | None |
| Example | Username "adrew" |

| token_type | |
|---|---|
| Description | Type of access token |
| Type | string |
| Required | Yes |
| Default | Bearer |
| Example | Bearer |

| refresh_token | |
|---|---|
| Description | Refresh token that can be used for obtaining a new access token |
| Type | string |
| Required | No |
| Default | None |
| Example | QvJdZg7nMSTNYBfeDLgECpe5b9FvgWgdpZRwv4u0nZ |

| refresh_token_timeout | |
|---|---|
| Description | Timeout for the refresh token in seconds |
| Type | string |
| Required | No |
| Default | None |
| Example | 86376 |

Resource: Metros
Description: Metros in which Cloud Exchange services are offered.

| HTTP Method | Request URI |
|---|---|
| GET | /ecx/v1/metros |

GET Metros:
Description: This implementation of the GET operation returns a list of all metros where either the user has ports or cloud exchange is enabled.

Request

Request URI: GET http://<HostName>/ecx/v1/metros

Filter Parameters:

| cloud_exchange_enabled | |
|---|---|
| Description | Filter the results to get metros where Cloud Exchange is enabled. If this parameter is not included the result |

-continued

| cloud_exchange_enabled | |
|---|---|
| | contains all the metros where user has port or Cloud Exchange is enabled |
| | Acceptable value: true |
| Type | Boolean |
| Required | No |
| Default | None |
| Example | True |

Request Headers:

| Header Attribute | Description |
|---|---|
| Authorization | Required. Specify the Oauth Bearer token |

Sample Request
GET http://<HostName>/ecx/v1/metros?cloud_exchange_enable=true
Response:
Response Fields:

| metros | |
|---|---|
| Description | List of metros |
| Type | List |
| Required | Yes |
| Default | None |
| Example | None |
| name | |
| Description | Metro Name |
| Type | string |
| Required | Yes |
| Default | None |
| Example | Singapore |
| code | |
| Description | Metro Code |
| Type | string |
| Required | Yes |
| Default | None |
| Example | SG |

Sample Response:

```
Content-Type: application/json
{
  "metros": [
    {
      "code": "SV",
      "name": "Silicon Valley",
    },
    {
      "code": "SG",
      "name": "Singapore"
    } ] }
```

Error Code in Response:

| HTTP Status Code | Error Code | Error Description |
|---|---|---|
| 400 | 40001 | Invalid Parameter Value |
| 401 | 40102 | Token Expired. Login again |
| 401 | 40104 | Invalid Access Token |
| 401 | 40105 | User doesn't have sufficient privilege to perform the operation |
| 406 | | Not Acceptable |
| 415 | | Unsupported Media Type |
| 500 | | Internal Server Error |

Resource: Cloud Services
Description: Cloud Services at cloud exchange 100

| HTTP Method | Request URI |
|---|---|
| GET | /ecx/v1/cloudservices |
| | /ecx/v1/cloudservices/{cloud_service_name} |

GET Cloud Services
Description: This implementation of the GET operation returns a list of all Cloud Services at cloud service exchange 100.
Request
Request URI: GET http://<HostName>/ecx/v1/cloudservices,
GET http://<HostName>/ecx/v1/cloudservices/{cloud_service_name}
Filter Parameters:
None
Request Headers:

| Header Attribute | Description |
|---|---|
| Authorization | Required. Specify the Oauth Bearer token |

Sample Request
GET http://<HostName>/ecx/v1/cloudservices
Response:
Response Fields:

| cloud_services | |
|---|---|
| Description | A list of a Cloud Services |
| Type | List |
| Required | Yes |
| Default | None |
| Example | None |
| name | |
| Description | Cloud Service Name |
| Type | string |
| Required | Yes |
| Default | None |
| Example | None |
| metros | |
| Description | A list of Metros served by the cloud service |
| Type | List |
| Required | Yes |
| Default | None |
| Example | None |
| name | |
| Description | Metro Name |
| Type | string |
| Required | Yes |
| Default | None |
| Example | Singapore |
| code | |
| Description | Metro Code |
| Type | string |

-continued

| | |
|---|---|
| Required | Yes |
| Default | None |
| Example | SG | ibxs

| | |
|---|---|
| Description | A list of IBX names in the metro. In Internet Business Exchange or "IBX" is a network-neutral data center and may represent an example of a cloud exchange or cloud exchange point, as described herein. |
| Type | List |
| Required | Yes |
| Default | None |
| Example | None |

Sample Response:

```
HTTP/1.1 200 OK
Content-Type: application/json
{
  "cloud_services": [
    {
      "name": "CSP1",
      "metros": [
        {
          "code": "SG",
          "name": "Singapore",
          "ibxs": [
            "SV1",
            "SV2"
          ]
        }
      ]
    }
  ]
}
```

Error Code in Response:

| HTTP Status Code | Error Code | Error Description |
|---|---|---|
| 401 | 40102 | Token Expired. Login again |
| 401 | 40104 | Invalid Access Token |
| 401 | 40105 | User doesn't have sufficient privilege to perform the operation |
| 406 | | Not Acceptable |
| 415 | | Unsupported Media Type |
| 500 | | Internal Server Error |

Buyer APIs

In this section, we describe the APIs that are relevant to a buyer.

Resource: Ports

Description: Ports on the Cloud Exchange Switch Fabric

| HTTP Method | Request URI |
|---|---|
| GET | /ecx/v1/ports |
| | /ecx/v1/ports/{port_name} |

GET Ports:

Description: This implementation of the GET operation returns a list of all ports owned by the authenticated sender of the request. The ports can be filtered by metro and IBX Name. If no ports matching the criteria are found then a 204 HTTP code response is returned without a payload.

Request

Request URI:

GET http://<HostName>/ecx/v1/ports?metro_code=SV&ibx_name=SV1

Filter Parameters:

metro_code

| | |
|---|---|
| Description | The code of a Metro. If no Metro Code is provided ports in all metros are returned as part of the response |
| Type | String |
| Default | None |
| Example | SV |
| Required | No | ibx_name

| | |
|---|---|
| Description | Equinix IBX location name. If no IBX name is provided then ports in all IBXs are returned |
| Type | String |
| Default | None |
| Example | SV1 |
| Required | No | bandwidth

| | |
|---|---|
| Description | The bandwidth of the port. If no bandwidth is provided then ports with any bandwidth capacity are returned. |
| Type | String |
| Default | None |
| Example | 1 G |
| Required | No | encapsulation

| | |
|---|---|
| Description | The encapsulation of the port. |
| Type | String |
| Default | None |
| Example | Dot1Q or Qinq (case insensitive) |
| Required | No | is_buyout

| | |
|---|---|
| Description | The type of port, standard or buyout. |
| Type | String |
| Default | None |
| Example | Y or N (case insensitive) |
| Required | No |

Request Headers:

| Header Attribute | Description |
|---|---|
| Authorization | Required. Specify the Oauth Bearer token |

Sample Request

GET http://<HostName>/ecx/v1/ports?metro_code=SV&ibx=SV1
GET http://<HostName>/ecx/v1/ports?bandwidth=100
GET http://<HostName>/ecx/v1/ports?encapsulation=Dot1Q
GET http://<HostName>/ecx/v1/ports?is_buyout=Y Response Response Fields:

ports

| | |
|---|---|
| Description | List of Ports |
| Type | List |
| Required | Yes |
| Default | None |
| Example | None | name

| | |
|---|---|
| Description | Name of Port |
| Type | String |
| Required | Yes |
| Default | None |
| Example | GSE_QA-R-EE-02 | metro_code

| | |
|---|---|
| Description | Code of the metro in which the port is located |
| Type | String |
| Required | yes |

-continued

| | |
|---|---|
| Default | None |
| Example | SV | metro_name

| | |
|---|---|
| Description | Name of the metro in which the port is located |
| Type | String |
| Required | yes |
| Default | None |
| Example | Silicon Valley | ibx_name

| | |
|---|---|
| Description | Name of the IBX in which the port is located |
| Type | String |
| Required | yes |
| Default | None |
| Example | SV1 | bandwidths

| | |
|---|---|
| Description | The bandwidths of the port (Array of values for Lagged Ports) |
| Type | Array |
| Default | None |
| Example | 10 G, 10 G |
| Required | No | encapsulation

| | |
|---|---|
| Description | Port encapsulation |
| Type | string |
| Default | None |
| Example | dot1q or qinq |
| Required | Yes | is_buyout

| | |
|---|---|
| Description | Buyout Port or Standard Port |
| Type | string |
| Required | yes |
| Default | None |
| Example | Y or N | cross_connect_ids

| | |
|---|---|
| Description | Cross connect Serial numbers |
| Type | Array |
| Required | Yes |
| Default | None |
| Example | 11111111, 23222 |

Sample Response 1:

```
HTTP/1.1 200 OK
Content-Type: application/json
{
  "ports": [
    {
      "name": "GSE_QA-R-EE-02",
      "metro_code" : "SV",
      "metro_name" : "Silicon Valley",
      "ibx_name" : "SV1"
    },
    {
      "name": "GSE_QA-R-EE-01",
      "metro_code" : "SG",
      "metro_name" : "Singapore",
      "ibx_name" : "SG1"
    } ] }
```

Sample Response 2:

```
HTTP/1.1 200 OK
Content-Type: application/json
{ "ports":[
  { "bandwidth":"10 G",
    "bandwidths":[
      "10 G", "10 G" ],
    "cross_connect_ids":[
      "123456"
      "100000", ],
    "encapsulation":"Qinq",
    "ibx_name":"SV3",
    "is_buyout":"N",
    "metro_code":"SV",
    "metro_name":"BAYM",
    "name":"QinqVirtualPort"
}
```

Error Code in Response:

| HTTP Status Code | Error Code | Error Description |
|---|---|---|
| 400 | 40001 | Invalid Parameter Value |
| 401 | 40102 | Token Expired. Login again |
| 401 | 40104 | Invalid Access Token |
| 406 | | Not Acceptable |
| 415 | | Unsupported Media Type |
| 500 | | Internal Server Error |

Resource: Seller Services
Description: Seller Services at the Cloud Exchange

| HTTP Method | Request URI |
|---|---|
| GET | /ecx/v1/sellerservices<br>/ecx/v1/sellerservices/{seller_service_name} |

GET Seller Services
Description: This implementation of the GET operation returns a list of all Seller Services at the Cloud Exchange.
Request
Request URI: GET http://<HostName>/ecx/v1/sellerservices,
GET http://<HostName>/ecx/v1/sellerservices/{seller_service_name}
Filter Parameters: Filter the results by metro. If this parameter is not included, the response contains all the seller services at the Cloud Exchange
Sample Request
GET http://<HostName>/ecx/v1/sellerservices/{seller_service_name}
http://<HostName>/ecx/v1/sellerservices?metro_code=SV
Response:
Response Fields:

seller_services

| | |
|---|---|
| Description | A list of a Seller |
| Type | List |
| Required | Yes |
| Default | None |
| Example | None | allow_custom_speed

| | |
|---|---|
| Description | The buyer can see all the seller services in a given metro that allow custom speeds if the buyer has a buyout port. The values that the response will include can be either 'Y' or 'N'. |
| Type | String |
| Required | Yes |
| Default | |
| Example | Y or N | availability_status: The availability status of the Service Profile as 'In Trial Testing' or Available for orders.

| encapsulation | |
|---|---|
| Description | Port encapsulation |
| Type | String |
| Default | None |
| Example | dot1q or qinq |
| Required | Yes |

| require_redudancy | |
|---|---|
| Description | This will define if a secondary virtual circuit creation is required when buyer requests a virtual circuit from this seller service provider. If yes, buyer will have to provide primary and secondary both secondary port and VLAN IDs. Acceptable values are Y and N. |
| Type | string |
| Required | Yes |
| Default | None |
| Example | TRUE | standard_speeds: The allowed standard speeds associated with the service profile when custom speed is not allowed by the seller.

seller service name metros: A list of Metros served by the seller. Metro name. Metro code. A list of IBX names in the metro.

Sample Response:

```
HTTP/1.1 200 OK
Content-Type: application/json
{
  "seller_services": [
    {
      "allow_custom_speed": "N",
      "encapsulation": "Dot1q",
      "metros": [
        {
          "code": "DC",
          "ibxs": [
            "DC5",
            "DC6"
          ],
          "name": "Ashburn"
        },
        {
          "code": "SV",
          "ibxs": [
            "SV1"
          ],
          "name": "SiliconValley"
        }
      ],
      "name": "test1",
      "availability_status": "in_trial_testing",
      "require_redundancy": "N",
      "standard_speed
s": [
        "Upto10G",
        "Upto200MB",
        "Upto500MB",
        "Upto1G"
      ]
    }
  ]
}
```

Resource: User Assets

Description: Get details of assets owned by a buyer in a given metro location.

| HTTP Method | Request URI |
|---|---|
| GET | /ecx/v1/assets |

GET Assets

Description: This implementation of the GET operation for buyers returns a list of all buyer assets including ports and virtual circuits in a given metro.

Request

Request URI: GET http://<HostName>/ecx/v1/assets

Filter Parameters:

| metro_code | |
|---|---|
| Description | Filter the results by metro. |
| Type | String |
| Required | Yes |
| Default | None |
| Example | SV |

| asset_type | |
|---|---|
| Description | Filter the results by the types of assets. Buyer: For getting assets that the user has as a buyer |
| Type | String |
| Required | Yes |
| Default | None |
| Example | buyer |

Request Headers:

| Header Attribute | Description |
|---|---|
| Authorization | Required. Specify the Oauth Bearer token |

Request

GET http://<HostName>/ecx/v1/assets?metro_code=SV&asset_type=buyer

Response:

Response Fields:

| buyer_assets | |
|---|---|
| Description | Buyer related assets of the user in the metro |
| Type | Object |
| Required | Yes |
| Default | None |
| Example | None |

| seller_assets | |
|---|---|
| Description | Seller related detail of the user in the metro |
| Type | Object |
| Required | Yes |
| Default | None |
| Example | None |

| ports | |
|---|---|
| Description | List of Ports. |
| Type | List |
| Required | Yes |
| Default | None |
| Example | None |

| name | |
|---|---|
| Description | Name of the Port |
| Type | String |
| Required | Yes |
| Default | None |
| Example | GSE_QA-R-EE- |

-continued

| | cross_connect_ids |
|---|---|
| Description | Cross connect Serial |
| Type | Array |
| Required | Yes |
| Default | None |
| Example | 1111111100 |

| | metro_code |
|---|---|
| Description | Code of the metro in which the port is |
| Type | String |
| Required | Yes |
| Default | None |
| Example | SV |

| | metro_name |
|---|---|
| Description | Name of the metro, in which the port is |
| Type | String |
| Required | Yes |
| Default | None |
| Example | Silicon Valley |

| | ibx_name |
|---|---|
| Description | Name of the IBX in which the port is |
| Type | String |
| Required | Yes |
| Default | None |
| Example | SV1 |

| | bandwidths |
|---|---|
| Description | The bandwidths of the port (Array of values for Lagged Ports) |
| Type | Array |
| Default | None |
| Example | 1 G, 1 G |
| Required | No |

| | encapsulation |
|---|---|
| Description | Port encapsulation |
| Type | String |
| Default | None |
| Example | dot1q or qinq |
| Required | Yes |

| | is_buyout |
|---|---|
| Description | Buyout Port or Standard Port |
| Type | String |
| Required | Yes |
| Default | None |
| Example | Y or N |

| | virtual_circuits |
|---|---|
| Description | List of virtual circuits for each |
| Type | List |
| Required | Yes |
| Default | None |
| Example | None | id Id of the virtual circuit. This id is required to perform operations on the virtual circuit APIs like DELETE or GET Virtual Circuit

| | redundant_id |
|---|---|
| Description | Virtual circuit ID associated with the redundant virtual circuit |
| Type | string |
| Required | Yes |
| Default | None |
| Example | 4D34239266A3952695956B | cross_connect_id [Deprecated, instead refer to field 'Ports'.'cross_connect_ids']

| Description | Id of the physical port |
|---|---|
| Type | String |
| Required | Yes |
| Default | None |

| Example | 1111111100 |
|---|---| port_speed [Deprecated, instead refer to field 'Ports'.'port_speeds']

| Description | The capacity of the port, e.g., 1 |
|---|---|
| Type | String |
| Required | Yes |
| Default | None |
| Example | 1000000000 |

| | name |
|---|---|
| Description | Virtual circuit name |
| Type | String |
| Required | Yes |
| Default | None |
| Example | API Test VC1 |

| | created_by |
|---|---|
| Description | Name of the user who has been created the virtual |
| Type | String |
| Required | Yes |
| Default | None |
| Example | First Name Last Name |

| | email |
|---|---|
| Description | email of the user who has been created the virtual circuit |
| Type | String |
| Required | Yes |
| Default | None |
| Example | x@y.com |

| | created_date |
|---|---|
| Description | Date and time when the virtual circuit has been created |
| Type | String |
| Required | Yes |
| Default | None |
| Example | 02-15-2014 21:58:20 |

| | seller_service_name |
|---|---|
| Description | Name of the seller service profile for the virtual circuit |
| Type | String |
| Required | No |
| Default | None |
| Example | Direct Connect | availability_status—The availability status of the Service Profile as 'In Trial Testing'

| | service_key |
|---|---|
| Description | Service Key or Digital Authorization Key obtained from the Seller |
| Type | String |
| Required | Yes |
| Default | None |
| Example | xxxxxxxx-xxxx-xxxx-xxxx-xxxxxxxxxxxx |

| | state |
|---|---|
| Description | State of the virtual circuit |
| Type | String |
| Required | No |
| Default | None |
| Example | PROVISIONED |

| | status |
|---|---|
| Description | Status of the virtual circuit |
| Type | String |
| Required | No |
| Default | None |
| Example | BILLED |

Sample Response:

```
HTTP/1.1 200 OK
Content-Type: application/json
[
  {
    "buyer_asset": {
      "ports": [
        {
          "bandwidth": "1 G",
          "bandwidths": [
          ],"1 G, 1 G"
          "cross_connect_ids": [
            "123456",
            "123457"
          ],
          "encapsulation": "Qinq",
          "ibx_name": "SV3",
          "is_buyout": "N", "metro_code":
          "SV", "metro_name": "BAYM",
          "name": "QinqVirtualPort",
          "virtualcircuits": [
            {
              "bandwidth": "Up to 200MB", "cloud_service_name":
              "CSP1", "seller_service_name": "CSP1",
              "availability_status": "in_trial_testing", "created_by":
              "reliance user", "created_date": "12-12-2014 22:08:06",
              "cross_connect_id": "123456",
              "email": "relianceuser@reliance.com",
              "id": "5566417575566047323754",
              "redundant_id": "6939666E3693916437C576",
              "name": "TestCSP1vc2",
              "port_speed": 100000000,
              "service_key": "87f4f12c-420a-4b3c-9087-c4f82071fd7e",
              "state": "Provisioned",
              "status": "Enabled"
            }
          ]
        }
      ]
    }
  },
  {
    "seller_asset": " "
  }
]
```

Resource: Virtual Circuits
Description: Virtual Circuits

| HTTP Method | Request URI |
|---|---|
| GET | /ecx/v1/virtualcircuits |
|  | /ecx/v1/virtualcircuits/{virtual_circuit_id} |
| POST | /ecx/v1/virtualcircuits |

GET Virtual Circuits:
Description: This implementation of the GET operation returns a list of all virtual circuits owned by the authenticated sender of the request. If the sender has no virtual circuits, a response with HTTP Code 204 is returned with no payload.
Request
Request Headers:

| Header Attribute | Description |
|---|---|
| Authorization | Required. Specify the Oauth Bearer token |

Request URI: /ecx/v1/virtualcircuits
Filter Parameters
None
Request Fields
None

Sample Request
GET http://<HostName>/ecx/v1/virtualcircuits/{virtual_circuit_id}
Response
Response Fields

| id | |
|---|---|
| Description | Virtual Circuit ID |
| Type | string |
| Required | Yes |
| Default | None |
| Example | 4D34239266A3952695956A |

| redundant_id | |
|---|---|
| Description | Virtual circuit ID associated with the redundant virtual circuit |
| Type | string |
| Required | Yes |
| Default | None |
| Example | 4D34239266A3952695956B |

| name | |
|---|---|
| Description | Name of the virtual circuit |
| Type | string |
| Required | Yes |

-continued

| | |
|---|---|
| Default | None |
| Example | Steve CSP_A Test VC-7 | buyer_port

| | |
|---|---|
| Description | Buyer side port name |
| Type | string |
| Required | Yes |
| Default | None |
| Example | "GSE_QA-R-EE-01 | cross_connect_id

| | |
|---|---|
| Description | Id of the physical port |
| Type | string |
| Required | yes |
| Default | None |
| Example | 11111111 | port_speed

| | |
|---|---|
| Description | The capacity of the port, e.g., 1 G |
| Type | string |
| Required | yes |
| Default | None |
| Example | 1 G | cloud_service_name

| | |
|---|---|
| Description | Cloud Service Name |
| Type | string |
| Required | Yes |
| Default | None |
| Example | CSP_A_1 | service_key

| | |
|---|---|
| Description | Service Key obtained from the Cloud Service |
| Type | string |
| Required | yes |
| Default | None |
| Example | xxxxxxxx-xxxx-xxxx-xxxx-xxxxxxxxxxxx | buyer_vlan

| | |
|---|---|
| Description | Buyer side VLAN Id |
| Type | string |
| Required | yes |
| Default | None |
| Example | 2004.* | bandwidth

| | |
|---|---|
| Description | Bandwidth |
| Type | string |
| Required | Yes |
| Default | None |
| Example | 200 MB | state

| | |
|---|---|
| Description | State of the virtual circuit. Example possible values are "Being Provisioned", "Ordering", "Pending", "Available", "Not Provisioned", "Provisioned", "Pending Add", "Deleted" and "Pending Delete. |
| Type | string |
| Default | None |
| Example | PROVISIONED |
| Required | No | status

| | |
|---|---|
| Description | Status of the virtual circuit |
| Type | string |
| Required | No |
| Default | None |
| Example | BILLED | created_date

| | |
|---|---|
| Description | Date the virtual circuit is created |
| Type | string |
| Required | Yes |
| Default | None |
| Example | 05/23/2014 01:21:54 | created_by

| | |
|---|---|
| Description | The user who created the virtual circuit |
| Type | string |
| Required | yes |
| Default | None |
| Example | tempuser1 | email

| | |
|---|---|
| Description | Email of the user |
| Type | string |
| Required | Yes |
| Default | None |
| Example | test@cloudexchange.com | seller_port

| | |
|---|---|
| Description | Seller side port |
| Type | string |
| Required | yes |
| Default | None |
| Example | GSE_QA-SJC-port-CIS-2-SEC-A | metro_code

| | |
|---|---|
| Description | Code of the metro in which this Virtual Circuit is located |
| Type | string |
| Required | Yes |
| Default | None |
| Example | SV | ibx_name

| | |
|---|---|
| Description | Name of the metro in which this Virtual Circuit is located |
| Type | string |
| Required | Yes |
| Default | None |
| Example | SV1 | seller_service_name

| | |
|---|---|
| Description | Name of the seller service profile for the virtual circuit |
| Type | string |
| Required | No |
| Default | None |
| Example | Direct Connect | metadata

| | |
|---|---|
| Description | This object can be used by users to enter metadata information about their VCs. This is not a mandatory object of fields. If the buyer passed metadata information during VC creation, the buyer can retrieve this metadata information during GET Virtual Circuit operation. Only 5 key-value pairs can be passed in this metadata object. For particular sellers, the metadata object shall be null. |
| Type | object |
| Required | No |
| Default | None |
| Example | None |

"key:value"

| | |
|---|---|
| Description | The key and associated value that the API user can pass in the metadata object. |
| Type | string |
| Required | No |
| Default | None |
| Example | None |

Sample Response:

```
HTTP/1.1 200 OK
Content-Type: application/json
{
  "virtualcircuits": [
    {
      "id": "4D34239266A3952695956A",
      "name": "Sample Test VC-7",
      "buyer_port": "GSE_QA-R-EE-01",
      "cross_connect_id": "14395166",
      "port_speed": "1G",
      "cloud_service_name": "CSP_A_1",
      "service_key": "xxxxxxxx-xxxx-xxxx-xxxx-xxxxxxxxxxxx",
      "buyer_vlan": "2004.*",
      "bandwidth": "Up to 200MB",
      "state": "PROVISIONED",
      "status": "BILLED",
      "created_date": "05/23/2014 01:21:54",
      "created_by": "testuser1",
      "email": "test@cloudexchange.com",
      "seller_port": "GSE_QA-SJC-06GMR-CIS-2-SEC-A",
      "metro_code": "SV",
      "ibx_name": "SV1",
      "seller_service_name": "cspereatetest",
"metadata": {
"key1": "value1",
"key2": "value2",
"key3": "value3",
"key4": "value4",
"key5": "value5"
    },
    {
      "id": "1432",
      "name": "Steve CSP_A Test VC-5",
      "buyer_port": "GSE_QA-R-EE-01",
      "cross_connect_id": "14395166",
      "port_speed": "1G",
      "cloud_service_name": "CSP_A_1",
      "service_key": "xxxxxxxx-xxxx-xxxx-xxxx-xxxxxxxxxxxx",
      "buyer_vlan": "2004.*",
      "bandwidth": "Up to 200MB",
      "state": "PROVISIONED",
      "status": "BILLED",
      "created_date": "05/23/2014 01:21:54",
      "created_by": "testuser1",
      "email": "test@cloudexchange.com",
      "seller_port": "GSE_QA-SJC-1234-CIS-2-SEC-A",
      "metro_code": "SV",
      "ibx_name": "SV1"
    }
  ]
}
```

Error Code in Response:

| HTTP Status Code | Error Code | Error Description |
|---|---|---|
| 401 | 40102 | Token Expired, Login again |
| 401 | 40104 | Invalid Access Token |
| 401 | 40105 | User doesn't have sufficient privilege to perform the operation |
| 406 | | Not Acceptable |
| 415 | | Unsupported Media Type |
| 500 | | Internal Server Error |

POST Virtual Circuits:

Description: Create Virtual Circuit.

Request
Request Headers:

| Header Attribute | Description |
|---|---|
| Authorization | Required. Specify the Oauth Bearer token |

Request URI: POST http://<hostname>/ecx/v1/virtualcircuits

Filter Parameters
None
Request Fields

| metro_name | |
|---|---|
| Description | Name of the metro in which this Virtual Circuit is located |
| Type | string |
| Required | Yes |
| Default | None |
| Example | Silicon Valley |

-continued

| | metro_code |
|---|---|
| Description | Code of the metro in which this Virtual Circuit is located |
| Type | string |
| Required | Yes |
| Default | None |
| Example | SV |

| | cloud_service_name |
|---|---|
| Description | Name of the Cloud Service Profile. Depending on the cloud service selected the fields required in the payload will differ. |
| Type | string |
| Required | Yes |
| Default | None |
| Example | CSP_A_1 |

| | seller_service_name |
|---|---|
| Description | Name of the Seller Service Profile. Depending on the seller service selected the fields required in the payload will differ. |
| Type | string |
| Required | Yes |
| Default | None |
| Example | Name provided by seller service provider |

| | primary_vc_name |
|---|---|
| Description | Primary virtual circuit name |
| Type | string |
| Required | Yes |
| Default | None |
| Example | twtca93 |

| | primary_port_name |
|---|---|
| Description | Primary buyer Port name |
| Type | string |
| Required | Yes |
| Default | None |
| Example | GSE_QA-SJC-06GMR-CIS-2-SEC-A |

| | secondary_vc_name |
|---|---|
| Description | Secondary virtual circuit name |
| Type | String |
| Required | No |
| Default | None |
| Example | twtca94 |

| | secondary_port_name |
|---|---|
| Description | Secondary buyer port name |
| Type | string |
| Required | No |
| Default | None |
| Example | GSE_QA-SJC-06GMR-CIS-2-SEC-A |

| | secondary_vlan_id |
|---|---|
| Description | Secondary buyer VLAN Id |
| Type | string |
| Required | No |
| Default | None |
| Example | 188 |

| | service_key |
|---|---|
| Description | Service Key obtained from the Cloud Service |
| Type | string |
| Required | Yes |
| Default | None |
| Example | xxxxxxxx-xxxx-xxxx-xxxx-xxxxxxxxxxxx |

| | virtual_circuit_speed |
|---|---|
| Description | Speed of the virtual circuit |
| Type | string |
| Required | Yes |
| Default | None |
| Example | 200 MB |

| | email |
|---|---|
| Description | Email of the user |
| Type | string |
| Required | No |
| Default | None |
| Example | test@cloudexchange.com |

Other example fields may include seller service provider account number, digital authorization key obtained from the seller service, border gateway protocol configuration number, the id of the virtual private gateway to a VPC, buyer peer ip (IP address assigned to buyer/client interface), IP address assigned to seller service provider interface, email of the user, metadata (as described above), key (This key, its associated value that the API user had passed in the metadata object during VC creation), and speed of the virtual circuit.

| Seller Service Providers | Standard Port (Buyer) | Buyout Port (Buyer) |
|---|---|---|
| Seller A | 200 MB, 500 MB | 50 MB, 100 MB, 200 MB, 300 MB, 400 MB, 500 MB |
| Seller B | 200 MB, 500 MB, 1 G | 200 MB, 500 MB, 1 G & 10 G (only when the buyer has a 10 G buyout port) |
| Other Seller Service Profiles (Allowing custom speed) | 200 MB, 500 MB, 1 G | 200 MB, 500 MB, 1 G or integer number, no decimals, between 1 and <= buyer physical port speed |

Sample Request

POST http://<HostName>/ecx/v1/virtualcircuits
Authorization: Bearer <accessToken>
Accept: application/xml or application/json
{
  "metro_name":"Silicon Valley",
  "metro_code":"SV",

```
"cloud_service_name":"CSP_A_1",
"primary_vc_name":"twtca93",
"primary_port_name":"GSE_QA-SJC-06GMR-CIS-2-SEC-A",
"primary_vlan_id":"188",
"secondary_vc_name":"twtcp94",
"secondary_port_name":"GSE_QA-SJC-06GMR-CIS-2-SEC-B",
"secondary_vlan_id":"188",
"service_key":"xxxxxxxx-xxxx-xxxx-xxxx-xxxxxxxxxxxx", "virtual_circuit_speed":"Up
to 200MB",
"email":test@cloudexchange.com
"metadata"
}
```

Response
Response Fields:

result

| | |
|---|---|
| Description | Result of the operation indicating whether it was successful. Valid values are SUCCESS and ERROR |
| Type | string |
| Required | Yes |
| Default | None |
| Example | SUCCESS | message

| | |
|---|---|
| Description | Success Message |
| Type | string |
| Required | Yes |
| Default | None |
| Example | Your Virtual Circuit request was successful |

Other example fields may include "more info," primary virtual circuit id, secondary virtual circuit id.
Sample Response:

```
HTTP/1.1 201 CREATED
Location: 4D34239266A3952695956A
{
  "result": "SUCCESS"
  "message": "Your Virtual Circuit request was successful."
  "more_info": "https://api.developer.cloudexchange.com/docs/api/messages/xx"
}
```

Error Code in Response:

| HTTP Status Code | Error Code | Error Description |
|---|---|---|
| 400 | 40002 | The value of VLAN should be between 1 and 4095 |
| 400 | 40003 | Cannot select the same port for Primary and Secondary Virtual Circuit |
| 400 | 40004 | Enter a value for all required fields |
| 400 | 40005 | The number of characters exceeded |
| 400 | 40006 | Cannot select the same name for Primary and Secondary Virtual Circuit |
| 400 | 40007 | Invalid Field Value |
| 400 | 40009 | Application specific error. Ex., duplicate VLAN Id |
| 401 | 40102 | Token Expired. Login again |
| 401 | 40104 | Invalid Access Token |
| 401 | 40105 | User doesn't have sufficient privilege to perform the operation |
| 415 | | Unsupported Media Type |
| 500 | | Internal Server Error |

In some examples, APIs may be provided for deleting virtual circuits. The DELETE operation will remove the virtual circuit provided, a response with HTTP Code 200 is returned if operation is successful. If the virtual circuit belongs to certain seller service providers, those seller service provider will have to confirm the deletion of the virtual circuit.

Sample Request

DELETE http://<HostName>/ecx/v1/virtualcircuits/{virtual_circuit_id}

Sample Response:

```
HTTP/1.1 200 DELETED
{
"result": "SUCCESS"
"message": "Your Virtual Circuit has been deleted successfully."
"more_info": " "
}
```

In some examples, APIs may be provided for PATCH enable connection. This implementation of the PATCH operation lets the users to enable virtual circuit if the seller requires additional step of authentication before enabling the buyer connection request.

Sample Response:

```
HTTP/1.1 201 CREATED
{
  "result": "SUCCESS",
  "message": "Connection enabling request successful"
  "more_info": " "
}
```

In some examples, APIs are provided for Seller Service Profiles to be created by sellers in Cloud Exchange. Cloud Exchange sellers are required to define and set up their service profiles for connectivity to their seller services. Sellers can create a profile for each discrete service that they offer.

In some examples, a "GET virtual circuit payload metadata" implementation of the GET operation returns the payload metadata required to create virtual circuits for a given seller service profile.

Sample Request

GET http://<HostName>/ecx/v1/sellerserviceprofiles/CloudSigma Profile/metadata

Sample Response:

```
HTTP/1.1 200 OK
Content-Type: application/json
{
"fields": [
{
"description": "Code of the metro in which this virtual circuit will be created",
"name": "metro_code",
"type": "string"
},
{
"description": "Seller Service Name",
"name": "seller_service_name",
"type": "string"
},
{
"description": "Primary virtual circuit name",
"name": "primary_vc_name",
"type": "string"
},
{
"description": "Buyers primary port name",
"name": "primary_port_name",
"type": "string"
},
{
"description": "Buyers primary VLAN Id",
"name": "primary_vlan_id",
"type": "string"
},
{
"description": "Secondary virtual circuit name",
"name": "secondary_vc_name",
"type": "string"
},
{
"description": "Buyers secondary port name",
"name": "secondary_buyer_port name",
"type": "string"
},
{
"description": "Buyers secondary VLAN Id",
"name": "secondary_buyer_vlan_id",
"type": "string"
},
{
"description": "Service Key or Digital Authorization Key obtained from CSP",
"name": "service_key",
"type": "string"
},
{
"description": "Speed of the virtual circuit",
"name": "virtual_circuit_speed",
"type": "string"
},
{
"description": "Email of the user",
"name": "email",
"type": "string"
    }
  ]
}
```

Seller APIs
Resource: Ports
Description: Ports on the Cloud Exchange Switch Fabric

| HTTP Method | Request URI |
|---|---|
| GET | /ecx/v1/ports |
|  | /ecx/v1/ports/{port_ name} |

GET Ports:

Description: This implementation of the GET operation returns a list of all ports owned by the authenticated sender of the request. The ports can be filtered by metro, and IBX Name. If no ports matching the criteria are found then a 204 HTTP response is returned without a payload.
Request
Request URI:
GET http://<HostName>/ecx/v1/ports?metro_code=SV&ibx_name=SV1
Filter Parameters:

| metro_code | |
|---|---|
| Description | Code of a Metro. If no Metro Code is provided ports in all metros are returned as part of the response |

-continued

| | |
|---|---|
| Type | string |
| Required | No |
| Default | None |
| Example | SV | ibx_name

| | |
|---|---|
| Description | Equinix IBX location name (IBX). If no IBX is provided, the method returns ports in all IBXs |
| Type | string |
| Required | No |
| Default | None |
| Example | SV1 | bandwidth

The bandwidth of the port. If no bandwidth is provided then ports with any bandwidth capacity are returned.

Request Headers:

| Header Attribute | Description |
|---|---|
| Authorization | Required. Specify the OAuth Bearer token |

Sample Request:

GET http://<HostName>/ecx/v1/ports?metro_code=SV&ibx=SV1

Response

Response Fields:

ports

| | |
|---|---|
| Description | List of Ports. |
| Type | List |
| Required | Yes |
| Default | None |
| Example | | name

| | |
|---|---|
| Description | Name of the Port |
| Type | string |
| Required | Yes |
| Default | None |
| Example | GSE_QA-R-EE-02 | metro_code

| | |
|---|---|
| Description | Code of the metro in which the port is located |
| Type | string |
| Required | yes |
| Default | None |
| Example | SV | metro_name

| | |
|---|---|
| Description | Name of the metro, in which the port is located |
| Type | string |
| Required | yes |
| Default | None |
| Example | Silicon Valley | ibx_name

| | |
|---|---|
| Description | Name of the IBX in which the port is located |
| Type | string |
| Required | yes |
| Default | None |
| Example | SV1 |

Other example response fields: bandwidths, encapsulation, is_buyout, cross_connect_ids (cross connect serial numbers).

Sample Response:

| HTTP/1.1 200 OK |
|---|
| Content-Type: application/json<br>{<br>  "ports": [<br>    {<br>      "name": "GSE_QA-R-EE-02",<br>      "metro_code" : "SV",<br>      "metro_name" : "Silicon Valley",<br>      "ibx_name" : "SV1"<br>    },<br>    {<br>    "name": "GSE_QA-R-EE-01",<br>    "metro_code": "SG",<br>    "metro_name": "Singapore",<br>    "ibx_name" : "SG1"<br>    } ] } |

Error Code in Response:

| HTTP Status Code | Error Code | Error Description |
|---|---|---|
| 400 | 40001 | Invalid Parameter Value |
| 401 | 40102 | Token Expired, Need to login again. |
| 401 | 40104 | Invalid Access Token |
| 401 | 40105 | User doesn't have sufficient privilege to perform the operation |
| 406 | | Not Acceptable |
| 415 | | Unsupported Media Type |
| 500 | | Internal Server Error |

Resource: seller service profiles

Description: Seller Service Profiles created by sellers in Equinix Cloud Exchange. Equinix Cloud Exchange sellers are required to define and set up their service profiles for connectivity to their seller services. Sellers can create a profile for each discrete service that they offer.

| HTTP Method | Request URI |
|---|---|
| GET | /ecx/v1/sellerserviceprofiles |
| GET | /ecx/v1/sellerserviceprofiles/{profile_name} |
| GET | /ecx/v1/sellerserviceprofiles/{profile_name}/metadata |
| POST | /ecx/v1/sellerserviceprofiles |
| | /ecx/v1/sellerserviceprofiles/{profile_name}/ports |
| PUT | /ecx/v1/sellerserviceprofiles/{profile_name} |
| DELETE | /ecx/v1/sellerserviceprofiles/{profile_name}/ports |

POST seller service profiles. This implementation of the POST operation creates a new seller service profile for the logged in user. Example request fields include: name, availability status (The availability status of the Service Profile as 'In Trial Testing' or 'Available for Orders'), virtual circuit label, service type, api available (Indicates whether API integration is available for this service. The API integration allows completing the virtual service provisioning. Acceptable values are TRUE and FALSE.), The authorization key label (This is what the seller organization calls the authorization key), The port encapsulation method used for seller side, Type of seller services this connection can reach, Require redundancy—This will define if a secondary virtual circuit creation is required when buyer requests a virtual circuit from this seller service provider. If yes, buyer will have to provide both primary and secondary port and VLAN IDs. Acceptable values are TRUE and FALSE; secondary_vlan_same—If this field has a value of "TRUE" the buyer will be forced to provide the same vlan id for both primary and secondary virtual circuits; capture_buyer_peer_ip—Indicates whether to capture buyer peer IP address. Acceptable values are TRUE and FALSE; Capture Buyer BGP ASN; Capture Virtual Private Gateway; capture_seller_peer_ip—Indicates whether to capture buyer peer IP address. Acceptable values are TRUE and FALSE.

Other example request fields include: The Bandwidth Threshold Alert Contacts. Multiple email address can be separated by comma. notification contacts: Contacts that will be notified of virtual circuit requests and deletions. alert percentage: Bandwidth threshold per port; The ports the seller service provider will enable for buyers to establish virtual circuit connection; The virtual circuit speeds offered; allow_custom_speed: The seller can choose to allow buyers to select custom speeds if the buyer has a buyout port.

Sample Request

```
POST http://<HostName>/ecx/v1/sellerserviceprofiles
{
    "name": "TestService123", "availability_status": "In_Trial_Testing",
    "virtual_circuit_label": "Virtual Connection Name", "service_type":
    "Seller Service Connectivity", "api_available": "TRUE",
"auth_key_label": "Authorization Key",
    "port_encapsulation": "QNQ", "connection_service_type":
    "Hybrid", "require_redundancy": "TRUE",
    "secondary_vlan_same": "TRUE", "capture_buyer_bgp_asn":
    "FALSE", "capture_buyer_peer_ip": "TRUE",
    "capture_seller_peer_ip": "TRUE",
    "capture_virtual_private_gateway": "TRUE",
    "threshold_alert_contacts": "user1@equinix.com,user@equinix.com",
    "notification_contacts": "user2@equinix.com", "allow_custom_speed": "TRUE",
"ports": [
"GSE_Test-02",
"GSE_Test-03"
],
"vlan_speeds": [
"Up to 200MB",
"Up to 500MB",
"Up to 1G"
    ],
    "alert_percentage": "90"
}
```

Response Fields:

| result | |
|---|---|
| Description | Result of the operation indicating whether it was successful. Valid values are SUCCESS and ERROR |
| Type | String |
| Require | Yes |
| Default | None |
| Exampl | SUCCESS |
| message | |
| Descript | Success Message |
| Type | string |
| Require | Yes |
| Default | None |
| Exampl | The Seller Service Profile has been Created |
| more_info | |
| Descript | Additional |
| Type | string |
| Require | No |
| Default | None |
| Example | |

Sample Response:

```
HTTP/1.1 200 Created
{
"result": "SUCCESS",
```

```
-continued

"message": "The Seller Service Profile
has been Created successfully",
"more_info": " "
}
```

POST Ports to Seller Service Profiles

Description: This implementation of the POSToperation enables given ports (owned by the user) for seller exchange service offering. In particular, the operation adds ports to an existing seller service profile.

Note: A Seller Service Profile will have to be Approved for this operation to be possible. Rejected or Pending Seller Service Profiles will not be allowed to be edited and ports can't be added until it is in Approved status.

Request URIs:

POST http://<HostName>/ecx/v1/sellerserviceprofiles/{profile_name}/ports

As another example, a DELETE operation will remove the port from the Seller Service Profile, a response with HTTP Code 200 is returned if operation is successful. There cannot be an active VC associated to the port which is being deleted, if a virtual circuit already exists on the port, an error message is displayed indicating that there is an existing virtual circuit on the port.

At least one port must be present in a service profile.

As another example, a PUT operation will be used to edit the existing Seller Service Profile, a response with HTTP Code 200 is returned if operation is successful. The profile state (Approved or Pending Approval) will not change during the Edit operation.

The fields that can be updated in the put operation are:

| Attribute | Req | Comments |
| --- | --- | --- |
| Name | Required | If the input matches the existing value in DB then no change. If does not match then the input value will be updated in DB. |
| availability_status | Required | If the input matches the existing value in DB then no change. If does not match then the input value will be updated in DB. |
| virtual_circuit_label | Required | If the input matches the existing value in DB then no change. |
| service_type | Required | If the input matches the existing value in DB then no change. |
| api_available | Required | If the input matches the existing value in DB then no change. If does not match then the input value will be updated in DB. |
| auth_key_label | Required | If the input matches the the existing value in DB then no change. If does not match then the input value will be updated in DB. |
| connection_service_type | Required | If the input matches the existing value in DB then no change. If does not match then the input value will be updated in DB. |
| require_redundancy | Required | If the input matches the existing value in DB then no change. If does not match then the input value will be updated in DB. |
| secondary_vlan_same | Required | If the input matches the the existing value in DB then no change. |
| capture_buyer_bgp_asn | Required | If the input matches the existing value in DB then no change. If does not match then the input value will be updated in DB. |
| capture_buyer_peer_ip | Required | If the input matches the existing value in DB then no change. If does not match then the input value will be updated in DB. |
| capture_seller_peer_ip | Required | If the value matches the existing value in DB then no change. If does not match then the input value will be updated in DB. |
| capture_virtual_private_gateway | Required | If the value matches the existing value in DB then no change. If does not match then the input value will be updated in DB. Valid values are 'TRUE' or 'FALSE'. |
| alert_percentage | Optional | The range is from 0 to 99. If not provided then threshold_alert_contacts must also be NULL/EMPTY. |
| threshold_alert_contacts | Optional | If alert_percentage is provided then threshold_alert_contacts must also be NOT-NULL and provided with valid array of alert contacts. |
| notification_contacts | Required | Update all the threshold_alert_contacts from input into the DB. Existing contacts will be removed and overridden with the new input array. |
| ports | Required | Update all the ports from input into the DB. Existing ports will be removed and overridden with the new input array. |
| vlan_speeds | Required | Update all the vlan_speed values from input into the DB. Existing speeds will be removed and overridden with the new input array. |
| allow_custom_speed | Required | If the value matches the existing value in DB then no change. If does not match then the input value will be updated in DB. Valid values are 'TRUE' or 'FALSE'. |

As another example, "GET My Seller Service Profiles" can be used by sellers to get a list of all seller service profiles they have created. This implementation of the GET operation returns a seller service profile passed as part of the profile_name path parameter. Filtering by seller service status is also available by setting a parameter.

Sample Request:

GET http://<HostName>/ecx/v1/sellerserviceprofiles (get all my seller service profiles)

GET http://<HostName>/ecx/v1/sellerserviceprofiles/{profile_name} (get seller service profile by name)

GET http://<HostName>/ecx/v1/sellerserviceprofiles/{profile_name} ?status={valid_status} (get seller service profile by name and status)

GET http://<HostName>/ecx/v1/sellerserviceprofiles?status={valid_status} (get seller service profile by status)

As another example, GET assets can be used by sellers to get details of assets owned by a Seller in a given metro location. This implementation of the GET operation for sellers returns a list of all assets including ports and virtual circuits in a given metro. A seller can also be a Buyer and hence the 'asset type' for a seller can be both 'buyer' and 'seller'.

Resource: Virtual Circuits
Description: Virtual Circuits

| HTTP Method | Request URI |
|---|---|
| GET | /ecx/v1/virtualcircuits |
|  | /ecx/v1/virtualcircuits/{virtual_circuit_id} |
| POST | /ecx/v1/virtualcircuits |

GET Virtual Circuits:

Description: This implementation of the GET operation returns a list of virtual circuits owned by the user. The virtual circuits can be filtered based on their status. If no virtual circuits are found matching the criteria, a response with HTTP Code 204 is returned with no payload.

Request
Request URI(s):
GET http://<HostName>/ecx/v1/virtualcircuits?pending=add
Filter Parameters:
  pending

| Description: | Status of the virtual circuits. Possible values are |
|---|---|
| | add |
| | To get all the virtual circuits that are created by a buyer but not yet accepted by the seller |
| | delete |
| | To get all the virtual circuits that are deleted by a buyer but not yet accepted by the seller |
| Type | string |
| Required | No |
| Default | None |
| Example | add |

Request Headers:

| Header Attribute | Description |
|---|---|
| Authorization | Required. Specify the Oauth Bearer token |

Request Fields:
None
Sample Request:
GET http://<HostName>/ecx/v1/virtualcircuits?pending=add
Response
Response Fields id

| Description | Virtual circuit ID |
|---|---|
| Type | string |
| Required | Yes |
| Default | None |
| Example | 4D34239266A3952695956A | name

| Description | Name of the virtual circuit |
|---|---|
| Type | string |
| Required | Yes |
| Default | None |
| Example | Steve CSP_A Test VC-7 | buyer_port

| Description | buyer side port id |
|---|---|
| Type | string |
| Required | Yes |
| Default | None |
| Example | "GSE_QA-R-EE-01" | cross_connect_id

| Description | Id of the physical port |
|---|---|
| Type | string |
| Required | Yes |
| Default | None |
| Example | 11111111 | port_speed

| Description | The capacity of the port eg: 1G or 10G |
|---|---|
| Type | string |
| Required | Yes |
| Default | None |
| Example | 1G | cloud_service_name

| Description | Cloud Service Name |
|---|---|
| Type | string |
| Required | Yes |
| Default | None |
| Example | CSP_A_1 | service_key

| Description | Service Key obtained from the Cloud Service |
|---|---|
| Type | string |
| Required | Yes |
| Default | None |
| Example | xxxxxxxx-xxxx-xxxx-xxxx-xxxxxxxxxxxx | buyer_vlan

| Description | Buyer side VLAN Id |
|---|---|
| Type | string |
| Required | Yes |
| Default | None |
| Example | 2004.* | bandwidth

| Description | Bandwidth |
|---|---|
| Type | string |
| Required | Yes |
| Default | None |
| Example | 200 MB | status

| Description | Status of the virtual circuit |
|---|---|
| Type | string |
| Required | No |
| Default | None |
| Example | BILLED | created_date

| Description | Date the virtual circuit is created |
|---|---|
| Type | string |
| Required | Yes |
| Default | None |
| Example | 05/23/2014 01:21:54 | created_by

| Description | The user who created the virtual circuit |
|---|---|
| Type | string |
| Required | Yes |
| Default | None |
| Example | tempuser1 | email

| Description | Email of the user |
|---|---|
| Type | string |
| Required | Yes |
| Default | None |
| Example | test@cloudexchange.com | seller_port

| Description | Seller port |
|---|---|
| Type | string |
| Required | No |
| Default | None |
| Example | GSE_QA-SJC-06GMR-CIS-2-SEC-A |

-continued

| metro_code | |
|---|---|
| Description | Code of the metro in which this Virtual Circuit is located. |
| Type | string |
| Required | Yes |
| Default | None |
| Example | SV |

| ibx_name | |
|---|---|
| Description | Name of the IBX in which this Virtual Circuit is located |
| Type | string |
| Required | Yes |
| Default | None |
| Example | SV1 |

Other example fields such as those included above in other examples may be used.

Sample Response:

```
HTTP/1.1 200 OK
Content-Type: application/json
{
    "virtualcircuits": [
        {
            "id": "4D34239266A3952695956A",
            "name": "Test Virtual Circuit",
            "buyer_port": "GSE_QA-R-EE-01",
            "cross_connect_id": "11111111",
            "port_speed": "1G",
            "cloud_service_name": "CSP_A_1",
            "service_key": "xxxxxxxx-xxxx-xxxx-xxxx-xxxxxxxxxxxx",
            "buyer_vlan": "2004.*",
            "bandwidth": "Up to 200MB",
            "status": "BILLED",
            "created_date": "05/23/2014 01 :21 :54",
            "created_by": "temp user",
            "email": "test@cloudexchange.com",
            "seller_port": "sellerport",
            "metro_code": "SV",
            "ibx_name": "SV1"
        } ]}
```

Error Code in Response:

| HTTP Status Code | Error Code | Error Description |
|---|---|---|
| 400 | 40001 | Invalid Parameter Value |
| 401 | 40102 | Token Expired, need to login again |
| 401 | 40104 | Invalid Access Token |
| 401 | 40105 | User doesn't have sufficient privilege to perform the operation |
| 406 | | Not Acceptable |
| 415 | | Unsupported Media Type |
| 500 | | Internal Server Error |

PATCH Virtual Circuit:

Description: The PATCH operation can be used to perform the following three types of operations on a virtual circuit by the seller:

Accept a Virtual Circuit created by a buyer

Reject a Virtual Circuit created by a buyer

Confirm the deletion of the Virtual Circuit by a buyer

Request

Request URI(s):

PATCH http://<HostName>/ecx/v1/virtualcircuits/{virtual_circuit_id}

Request Headers:

| Header Attribute | Description |
|---|---|
| Authorization | Required. Specify the Oauth Bearer token |

Request Fields:

| action | |
|---|---|
| Description | Action on the resource. Valid values are<br>approve<br>Approve a virtual circuit created by a buyer<br>reject<br>Create a virtual circuit created by a buyer<br>confirm_delete<br>Confirm the deletion of the Virtual Circuit by a buyer<br>available<br>Update the status of Virtual Circuit is available after approval<br>not_available<br>Update the status of Virtual Circuit to not available. |
| Type | string |
| Required | Yes |
| Default | None |
| Example | approve |

| port_name | |
|---|---|
| Description | Seller side Port Name |
| Type | string |
| Required | Yes |
| Default | None |
| Example | GSE_QA-SJC-06GMR-CIS-2-SEC-A |

| vlan_id | |
|---|---|
| Description | Seller side VLAN Id |
| Type | string |
| Required | Yes |
| Default | None |
| Example | xxxx-xxxxxx | redundant_vlan_id reject_comment—seller side comment to explain the rejection of the virtual circuit Sample Request

```
PATCH   http://<hostname>/ecx/vc2/
virtualcircuit/
4D34239266A3952695956A
{
    "action": "approve",
    "port_name": "GSE_QA-SJC-06GMR-CIS-2-SEC-A",
    "vlan_id": "188"
}
```

Response:

Response Fields:

| result | |
|---|---|
| Description | Result of the Operation indication whether it was successful. Valid values are SUCCESS and ERROR |
| Type | string |
| Required | Yes |
| Default | None |
| Example | SUCCESS |

Sample Response:

```
HTTP/1.1 200 OK
{
    "result": "SUCCESS",
    "message": "The requested virtual circuit has
    been rejected and the buyer has been
    notified.",
    "more_info": "https://api.developer.cloudexchange.com/
    docs/api/messages/vcs/2"
}
```

Error Code in Response:

| HTTP Status Code | Error Code | Error Description |
|---|---|---|
| 400 | 40002 | The value of VLAN should be between 1 and 4095 |
| 400 | 40004 | Enter a value for all required fields |
| 400 | 40007 | Invalid Field Value |
| 400 | 40008 | Virtual Circuit cannot be deleted by seller as it is not deleted by the buyer |
| 400 | 40009 | Application specific error. Ex., duplicate VLAN ID |
| 401 | 40101 | Authentication failed |
| 401 | 40102 | Token Expired, Login again |
| 401 | 40104 | Invalid Access Token |
| 401 | 40105 | User doesn't have sufficient privilege to perform the operation |
| 406 | | Not Acceptable |
| 415 | | Unsupported Media Type |
| 500 | | Internal Server Error |

All Error Codes

| HTTP Status Code | Error Code | Error Description |
|---|---|---|
| 400 | 40001 | Invalid Parameter Value |
| 400 | 40002 | The value of VLAN should be between 1 and 4095 |
| 400 | 40003 | Cannot select the same port for Primary and Secondary Service |
| 400 | 40004 | Enter a value for all required fields |
| 400 | 40005 | The number of characters exceeded |
| 400 | 40006 | Cannot select the same name for Primary and Secondary Virtual Circuit |
| 400 | 40007 | Invalid Field Value |
| 400 | 40008 | Virtual Circuit cannot be deleted by seller as it is not deleted by the buyer |
| 400 | 40009 | Application specific error. Ex., duplicate VLAN Id |
| 400 | 40010 | Invalid value for grant_type. The acceptable value is "password". |
| 401 | 40101 | Authentication Failed. Invalid Username or Password. |
| 401 | 40102 | Token Expired. Login again. |
| 401 | 40103 | Invalid API Key |
| 401 | 40104 | Invalid Access Token |
| 401 | 40105 | User doesn't have sufficient privilege to perform the operation |
| 404 | | Not Found |
| 405 | | Method not Allowed |
| 406 | | Not Acceptable |
| 415 | | Unsupported Media Type |
| 500 | | Internal Server Error |
| 503 | | Service Unavailable |
| 504 | | Gateway Timeout |

Other endpoints 406 may have request/response schemes similar to those provided above for Login 406A, Ports 406B, Metros 406C, Virtual Circuits 406E, and Cloud Services 406F.

Login 406A enables a secure channel for access to interconnection assets by authenticated and authorized partners and customers. Moreover, the interconnection platform provides out-of-the-box capability to address security issues (threat protection, SQL Injection protection, DDoS attack prevention, JSON bomb protection, etc.). In some examples, an entity uses its credentials (e.g., username, password, API key, and/or API secret) to obtain a security token (e.g., an OAuth 2.0 token) using Login 406A, the security token thereafter ensuring that requests issued by the now-authorized entity to other endpoints 406 are from an authorized customer or partner.

API gateway 403, in some examples, transforms application data formatted according to a request to any of endpoints 406 and uses the transformed application data to make calls to orchestration engine 407. Orchestration engine 407 may represent one or more real servers and/or virtual machines configured to implement the cloud exchange platform services 408A-408H (collectively, "platform services 408") in this example. In response to invocation by API gateway 403 A workflow and rules engine (not shown in FIG. 3B) of orchestration engine 407 may apply defined rules and policies to generate a workflow of cloud exchange API services 409 that, in general, fit within an overall function associated with one of platform services 408. As illustrated, the platform services 408 include policy management 408A, profiles and configuration 408B, billing and invoicing 408C, seller API integration 408D, virtual circuit management 408E, network interface management 408F, search and recommendation 408G, and inventory and location discovery 408H. Each of platform services may represent a workflow and rules engine for a different aspect of cloud service provisioning.

Cloud exchange API services 409A-409R (collectively, "cloud exchange services 409") represent services offered by the interconnection platform to modify the cloud exchange network infrastructure, manage content, manage incidents, manage inventory and capacity, ensure secured access, and manage orders/billing for providers and customers, as examples. Any of cloud exchange services 409 may itself represent a bundle of microservices for request/response transactions invokable by orchestration engine 407 managing a workflow.

Cloud exchange services 409 includes request validation 409A, authorization and auditing 409B, account and profile management 409C, inventory management 409D, capacity management 409E, network provisioning 409F, credit check validator 409G, billing 409H, seller API integration 409I, location 409J, trouble ticket management 409K, localization 409L, usage statistics 409M, recommendation 409N, schedulers and batch processors 409O, notifications 409P, error parser 409Q, and content management 409R. Seller API integration 409I may enable orchestration engine 407 to invoke software interfaces of seller applications of CSPs to, e.g., request that the seller application confirm addition or deletion of virtual circuits (as requested by the NSP/customer) on behalf of the seller.

Figure 4:
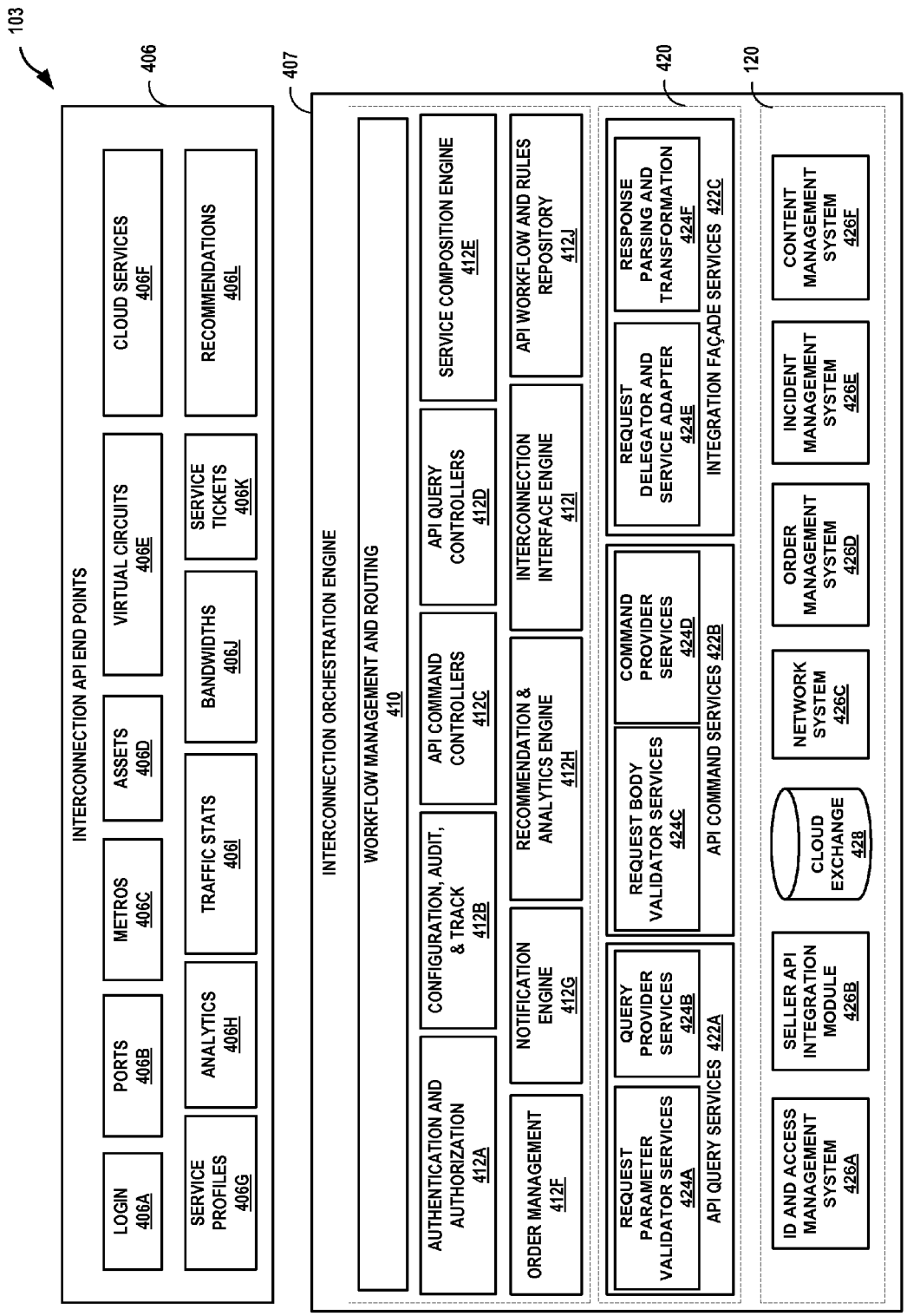
FIG. 4 is a block diagram showing an alternative representation of an interconnection platform 103 for a cloud exchange according to techniques described in this disclosure.

FIG. 4 is a block diagram showing an alternative representation of an interconnection platform 103 for a cloud exchange according to techniques described in this disclosure. In this diagram, the technical architecture for interconnection platform 103 includes an API services layer 420 for validating and satisfying API queries, validating and satisfying API commands, and integrating subsystems 120 with the interconnection orchestration engine 407. One or more real servers and/or virtual machines of a data center may execute each of interconnection orchestration engine 407, services of API services layer 420, and sub-systems 120. Interconnection API endpoints 406 are example API endpoints by which API consumers 402 (FIG. 3A) may manage cloud exchange interconnections.

Workflow management and routing component 410 manages workflows and routes API calls to endpoints 406 to engines 412A-412J (collectively, "engines 412") that perform consolidated functionality by invoking various microservices of API services layer 420. Engines 412 include authentication and authorization engine 412A; configuration, audit, and tracking engine 412B; API command controllers 412C; API query controllers 412D; service composition engine 412E; order management engine 412F; notification engine 412G; recommendation and analytics engine 412H; interconnection interface engine 412I; and API workflow and rules repository 412J.

Examples API services of API services layer, as illustrated, include API query services 422A having request parameter validator services 424A and query provider services 424B; API command services 422B having request body validator services 424C and command provider services 424D; and integration façade services 422C having request delegator and service adapter 424E and response parsing and transformation 424F.

Examples of sub-systems 120 are illustrated in FIG. 4. Identification and access management system 426A performs authentication and authorization to valid access to the interconnection platform services. Seller API integration module 426B facilitates integration of the interconnection platform 103 with cloud service provider APIs for creating and validating interconnections with cloud service provider networks, as described elsewhere herein. Cloud exchange database 428 represents a configuration database describing the configuration of the cloud exchange managed by interconnection platform 103. Network system 426C provisions, configures, queries, and otherwise controls the network infrastructure of the cloud exchange managed by interconnection platform 103. Order management system 426D performs end-to-end management of customer orders for, e.g., virtual circuits. Incident management system 426E facilitates handling errors in the cloud exchange managed by interconnection platform, such as by alerting the cloud exchange provider, notifying customers, etc. Content management system 426F manages content for the interconnection platform 103.

FIGS. 5-11 are flow diagrams each illustrating a call flow and operations performed by example components of an interconnection platform for a cloud exchange, as described in this disclosure.

Figure 5:
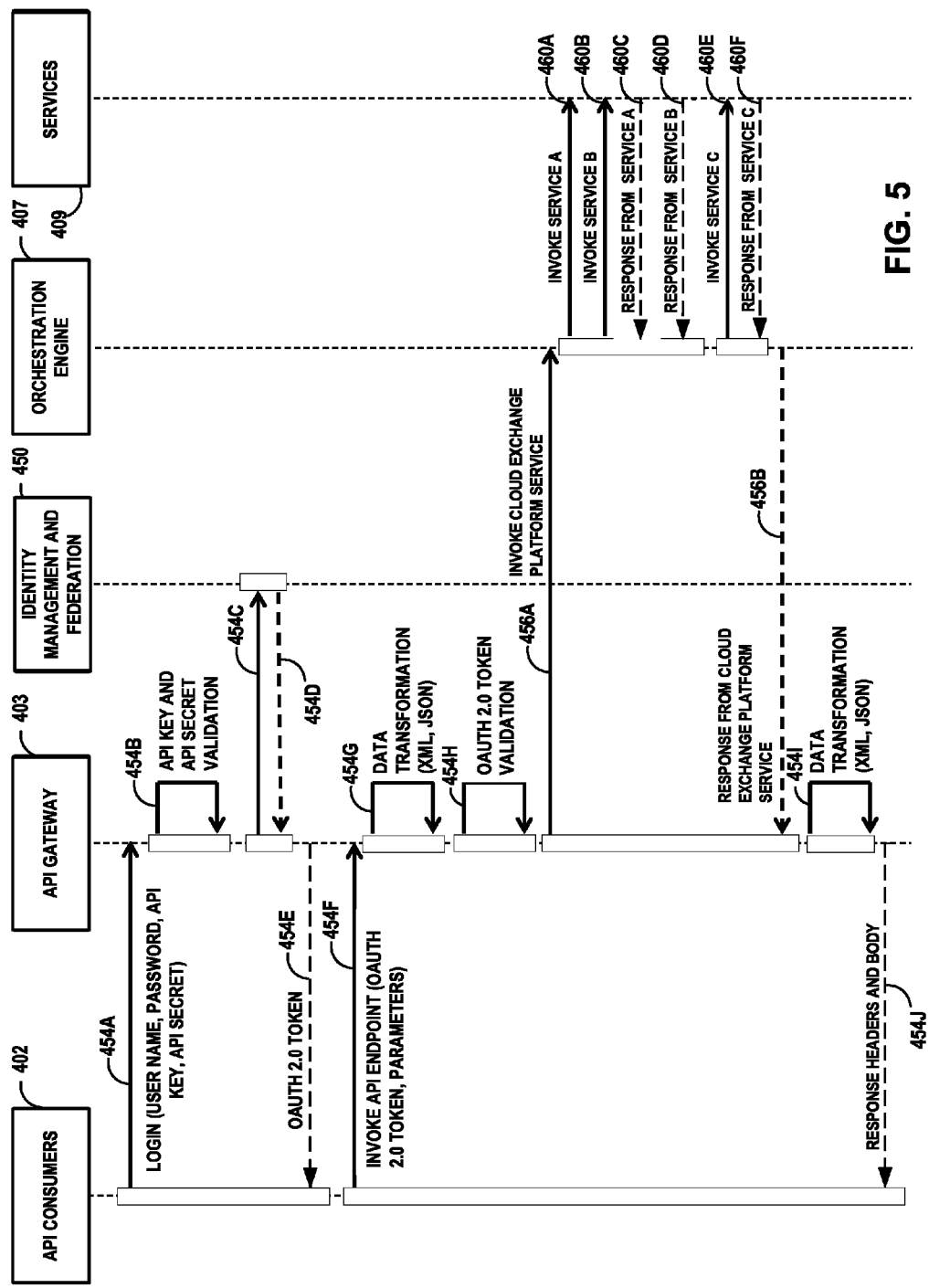
FIGS. 5-11 are flow diagrams each illustrating a call flow and operations performed by example components of an interconnection platform for a cloud exchange, as described in this disclosure.

In the example of FIG. 5, API developers 402 (e.g., a buyer/seller/third party) can make use of services 409 to manage cloud exchange interconnections. FIG. 5 illustrates a process which can be used for virtual circuit creation applicable to all Cloud Service Providers (CSPs). For example, one of API developers 402 can pass login information, such as one or more of a user name, password, API key, and API secret, to API gateway 403 (454A). API gateway 403 performs API key and API secret validation (454B), interacts with identity management and federation 450 (454C, 454D), and provides an OAuth 2.0 token back to the API developer 402 (454E). API developer 402 receives the OAuth 2.0 token and can invoke an API endpoint (e.g., one of API endpoints 406) by providing the OAuth 2.0 token and one or more parameters to API gateway 403 (454F). API gateway 403 may perform a data format transformation (e.g., XML, JSON) (454G) and OAuth 2.0 token validation (454H). API gateway 403 then contacts orchestration engine 407 to invoke the cloud exchange platform service (456A).

Orchestration engine 407 orchestrates an API workflow based on defined rules and responses. For example, workflow and rules engine 306 of orchestration engine 407 can orchestrate the API workflow based on one or more of policies 308A, profiles 308B, configurations 308C, and micro services 308D (FIG. 2). Generally speaking, orchestration engine 407 can invoke one or more services 409 in parallel or in a defined order based on configured rules and/or policies. In the example of FIG. 5, orchestration engine 407 invokes service A (460A) and service B (460B) of services 409, then receives a response from service A (460C) and receives a response from service B (460D). Orchestration engine 407 then invokes service C (460E) and receives a response from service C (460F). Orchestration engine 407 sends to API gateway 403 a response from the cloud exchange platform service (456B). API gateway 403 receives the response from the cloud exchange platform service, and may perform a data format transformation (e.g., XML, JSON) on the information received in the response (454I). API gateway 403 sends one or more response headers and body to API developer 402 that invoked the API endpoint (454J).

In this manner, orchestration engine 407 provides an interconnection platform for a cloud exchange, making interconnection asset information available to API developers 402 through machine-to-machine interaction. The process outlined in FIG. 5 may be applied to different use cases, such as for allowing API developers to obtain information about one or more virtual circuits, allowing API developers to obtain information about one or more interconnection assets (e.g., metro-based cloud exchanges, cloud exchange points, ports of cloud exchanges), allowing sellers to define parameters for connectivity, allowing API developers to obtain information about cloud service profile and attributes expected for creation of a virtual circuit, or near real-time deletion of virtual circuits by buyers.

Figure 6:
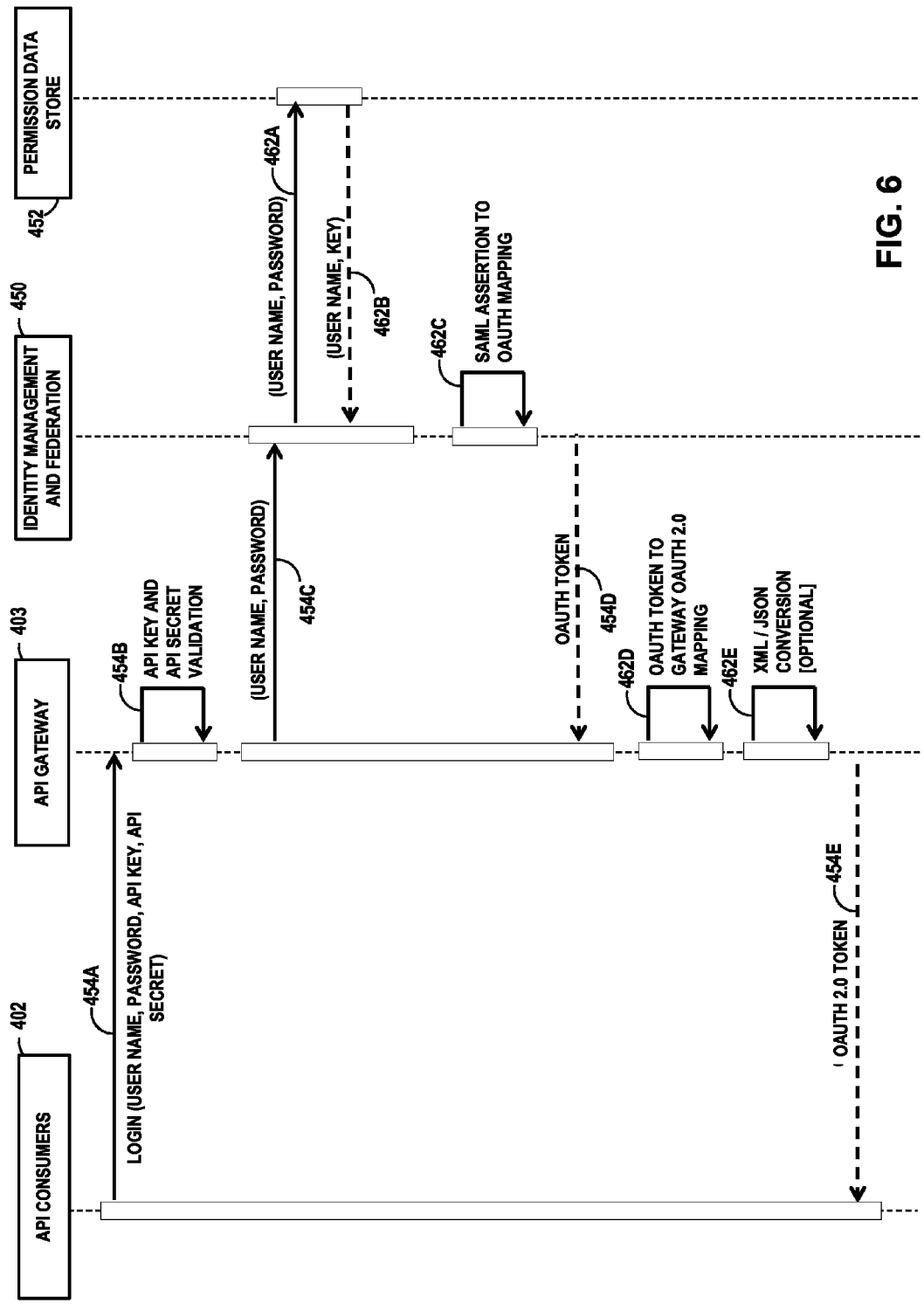

FIG. 6 is a flow diagram illustrating a call flow and operations performed by example components of an interconnection platform for a cloud exchange in making interconnection asset information available to API developers 402 through machine-to-machine interaction. FIG. 6 includes some operations similar to those described above respect to FIG. 5. In response to receiving a request from API gateway 403 invoking the cloud exchange platform service, orchestration engine 407 can orchestrate an API workflow based on defined rules and responses. For example, FIG. 6 allows API developers 402 to obtain information such as an OAuth 2.0 token from permission data store 452 through machine-to-machine interaction. Specifically, API gateway 403 can send a user name and password received from API developer 402 (454A), after validation (454B), to identity management and federation 450 (454C), which in turn provides this information to permission data store 452 (462A), which returns a user name and user key to identity management and federation 450 (462B). Identity management and federation 450 may perform SAML to OAuth mapping (462C), and provides an OAuth token to API gateway 403 (454D). API gateway 403 can perform an OAuth Token to Gateway OAuth 2.0 mapping (462D), and may optionally perform an XML/JSON conversion (462E). API gateway 403 then provides the OAuth 2.0 token to API developer 402 (454E).

Figure 7:
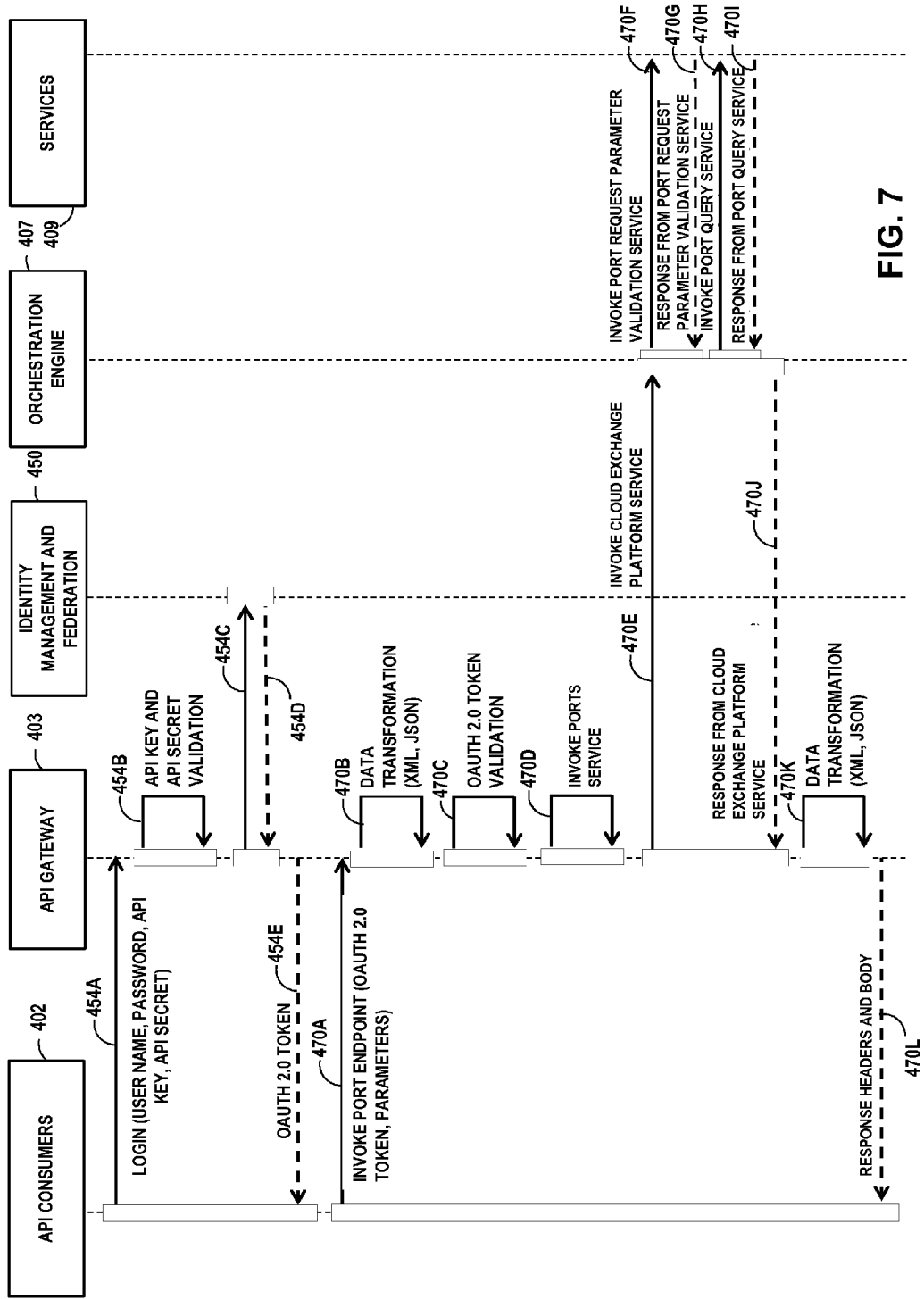

FIG. 7 is a flow diagram illustrating a call flow and operations performed by example components of an interconnection platform for a cloud exchange in making interconnection asset information available to API developers 402 through machine-to-machine interaction. FIG. 7 includes some operations similar to those described above respect to FIG. 5. In response to receiving a request from API gateway 403 invoking the cloud exchange platform service (470E), orchestration engine 407 can orchestrate an API workflow based on defined rules and responses. For example, FIG. 7 shows how orchestration engine 407 can invoke a port request parameter validation service of services 409 specifying port parameters that were included in the initial request from API developer 402 invoking the ports endpoint (470F). Orchestration engine 407 receives a response from the port request parameter validation service indicating whether the port request parameter(s) are valid (470G). Orchestration engine 407 can then invoke a port query service (470H) and receive a response from port query service (470I), e.g., specifying specific port information based on the port request parameters. Orchestration engine 407 can include the port information in the response from the cloud exchange platform service to API gateway 403 (470J), and API gateway 403 in turn can provide the port information to API developers 402 (470L).

Figure 8:
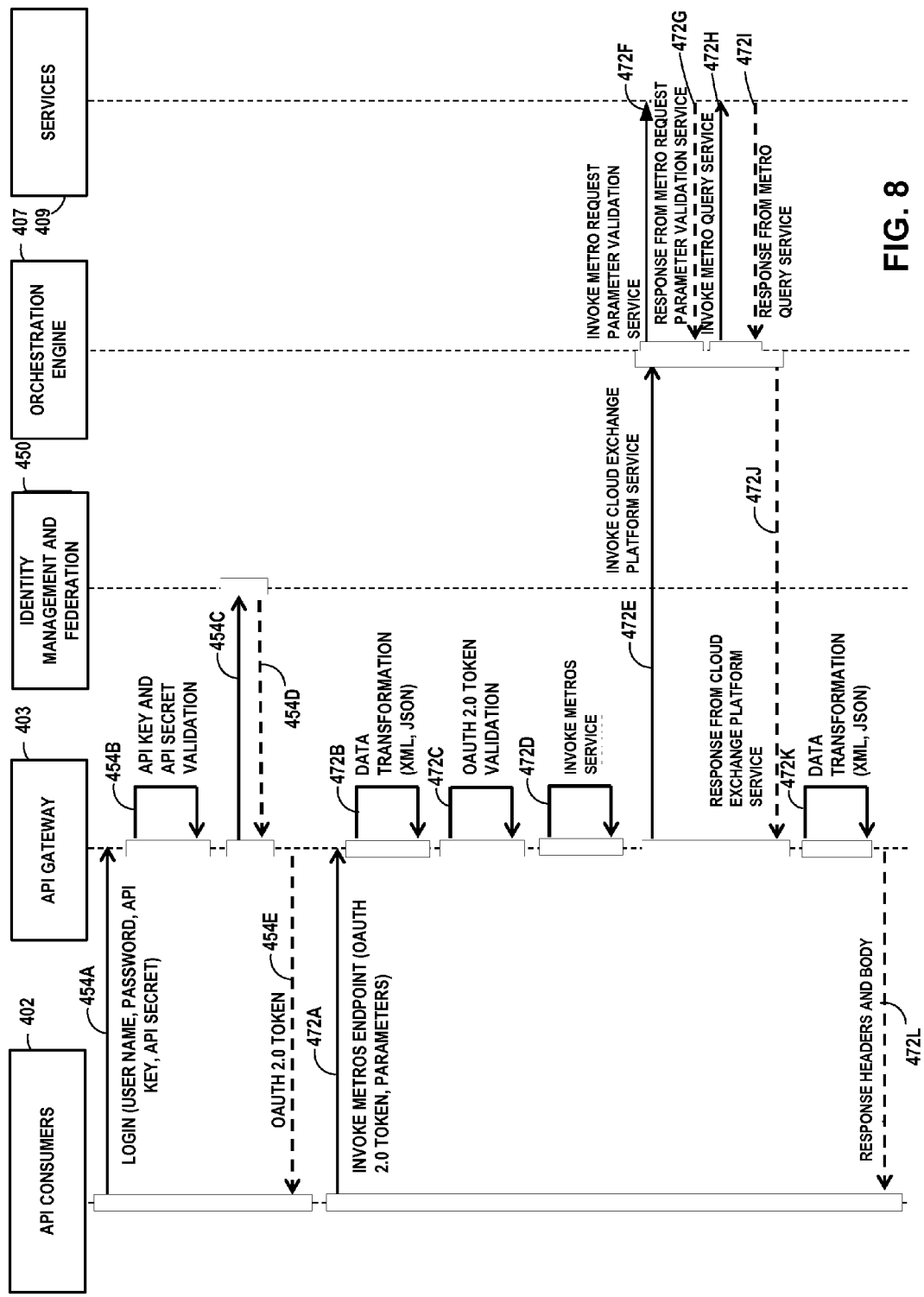

FIG. 8 is a flow diagram illustrating a call flow and operations performed by example components of an interconnection platform for a cloud exchange in making interconnection asset information available to API developers 402 through machine-to-machine interaction. FIG. 8 includes some operations similar to those described above respect to FIG. 5. In response to receiving a request from API gateway 403 invoking the cloud exchange platform service (472E), orchestration engine 407 can orchestrate an API workflow based on defined rules and responses. For example, FIG. 8 shows how orchestration engine 407 can invoke a metro request parameter validation service of services 409 specifying metro parameters that were included in the initial request from API developer 402 invoking the metros endpoint (472F). Orchestration engine 407 receives a response from the metro request parameter validation service, e.g., indicating whether the metro request parameter(s) are valid (472G). Orchestration engine 407 can then invoke a metro query service (472H) and receive a response from metro query service, e.g., specifying specific metro information based on the metro request parameters (472I). Orchestration engine 407 can include the metro information in the response from the cloud exchange platform service to API gateway 403 (472J), and API gateway 403 in turn can provide the metro information to API developers 402 (472L).

Figure 9:
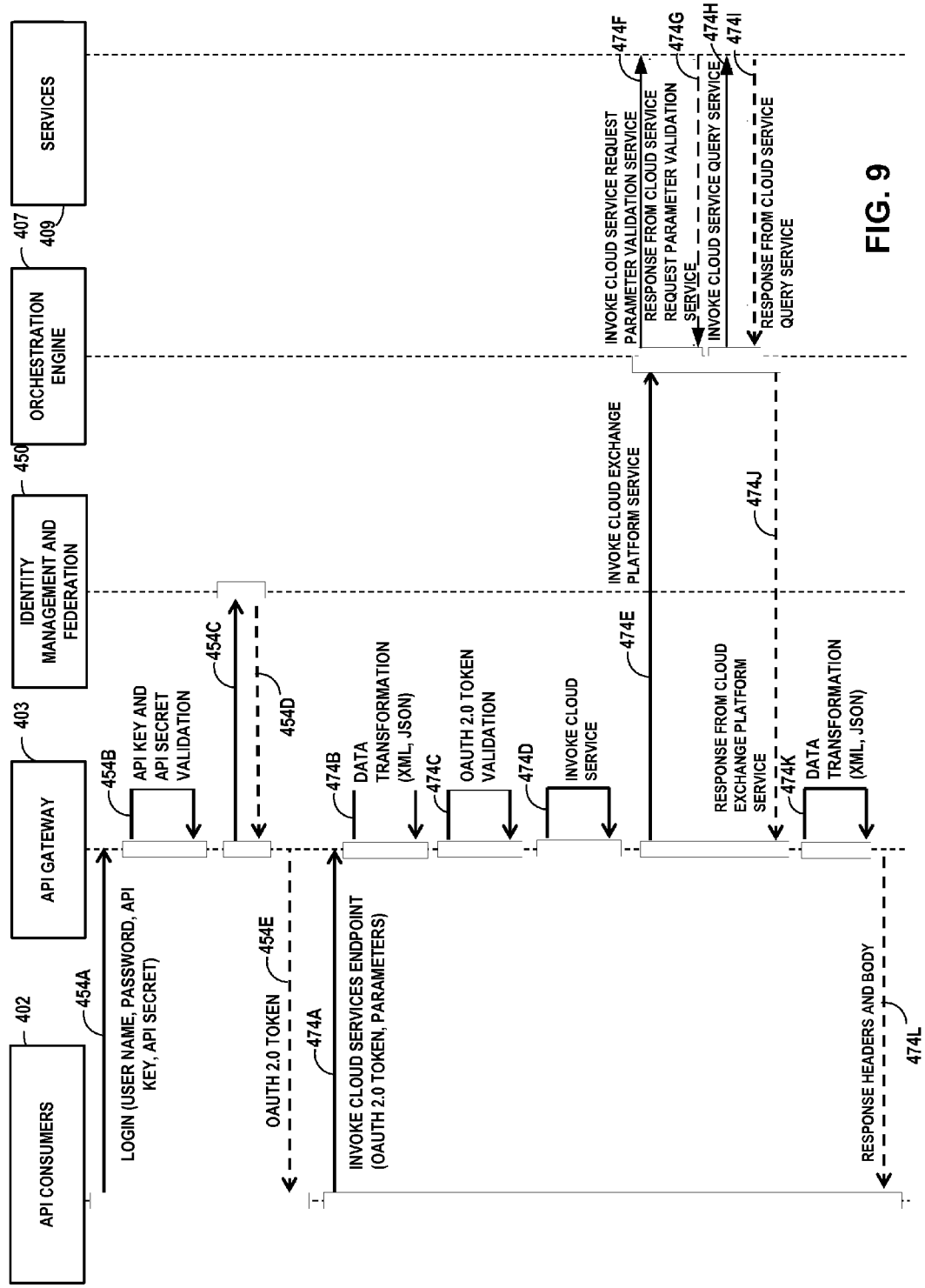

FIG. 9 is a flow diagram illustrating a call flow and operations performed by example components of an interconnection platform for a cloud exchange in making interconnection asset information available to API developers 402 through machine-to-machine interaction. FIG. 9 includes some operations similar to those described above respect to FIG. 5. In response to receiving a request from API gateway 403 invoking the cloud exchange platform service (474E), orchestration engine 407 can orchestrate an API workflow based on defined rules and responses. For example, FIG. 9 shows how orchestration engine 407 can invoke a cloud service request parameter validation service of services 409 specifying cloud service parameters that were included in the initial request from API developer 402 invoking the cloud services endpoint (474F). Orchestration engine 407 receives a response from the cloud service request parameter validation service, e.g., indicating whether the cloud service request parameter(s) are valid (474G). Orchestration engine 407 can then invoke a cloud service query service (474H) and receive a response from cloud service query service, e.g., specifying specific cloud service information based on the cloud service request parameters (474I). Orchestration engine 407 can include the cloud service information in the response from the cloud exchange platform service to API gateway 403 (474J), and API gateway 403 in turn can provide the cloud service information to API developers 402 (474L).

Figure 10:
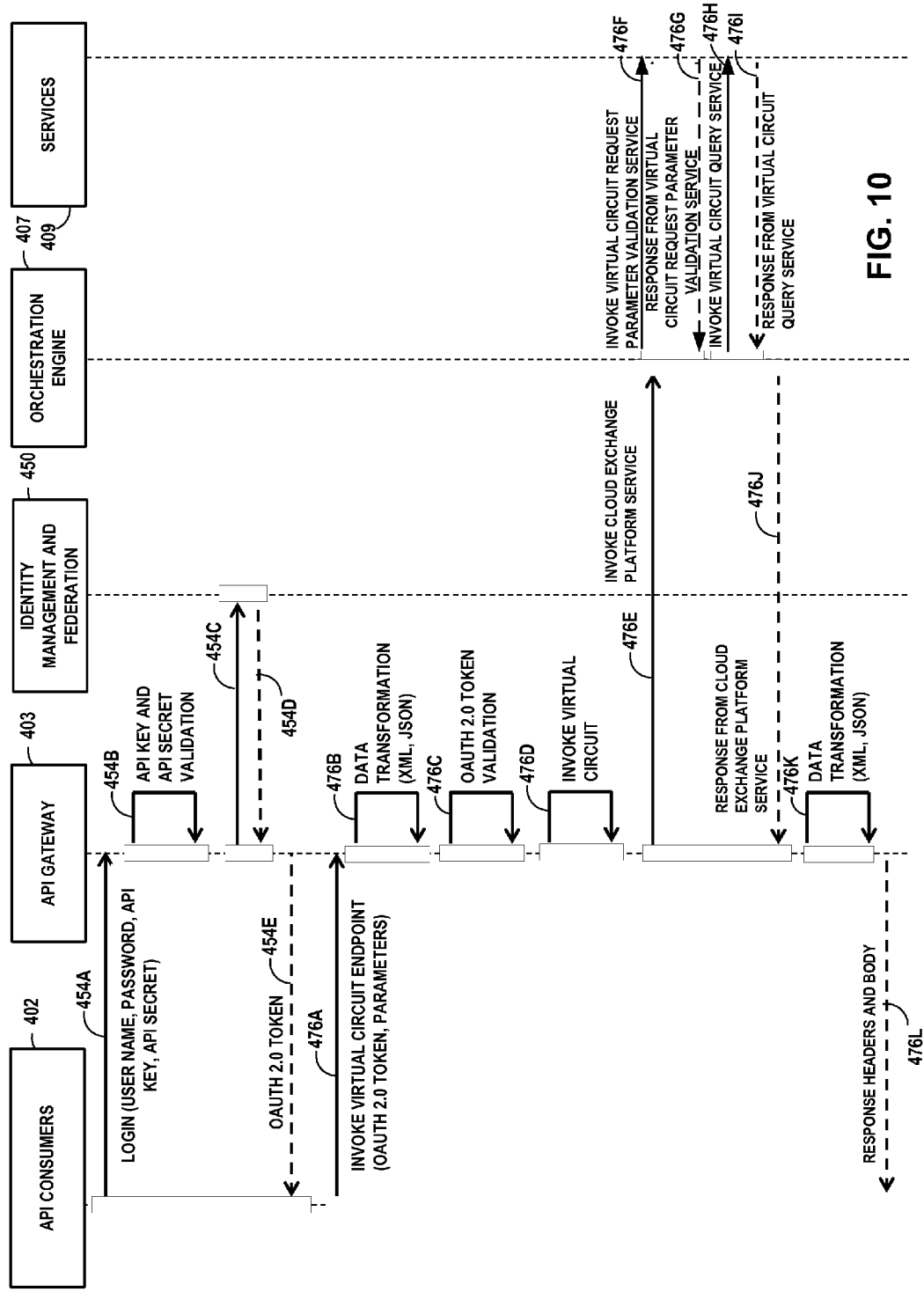

FIG. 10 is a flow diagram illustrating a call flow and operations performed by example components of an interconnection platform for a cloud exchange in making interconnection asset information available to API developers 402 through machine-to-machine interaction. FIG. 10 includes some operations similar to those described above respect to FIG. 5. In response to receiving a request from API gateway 403 to view a virtual circuit and invoking the cloud exchange platform service (476E), orchestration engine 407 can orchestrate an API workflow based on defined rules and responses. For example, FIG. 10 shows how orchestration engine 407 can invoke a virtual circuit request parameter validation service of services 409 (476F) specifying virtual circuit parameters that were included in the initial request (476A) from API developer 402 invoking the virtual circuit endpoint. Orchestration engine 407 receives a response from the virtual circuit request parameter validation service, e.g., indicating whether the virtual circuit request parameter(s) are valid (476G). Orchestration engine 407 can then invoke a virtual circuit query service (476H) and receive a response from virtual circuit query service, e.g., specifying specific cloud service information based on the virtual circuit request parameters (476I). Orchestration engine 407 can include the virtual circuit information in the response (476J) from the cloud exchange platform service to API gateway 403, and API gateway 403 in turn can provide the virtual circuit information to API developers 402 (476L).

Figure 11:
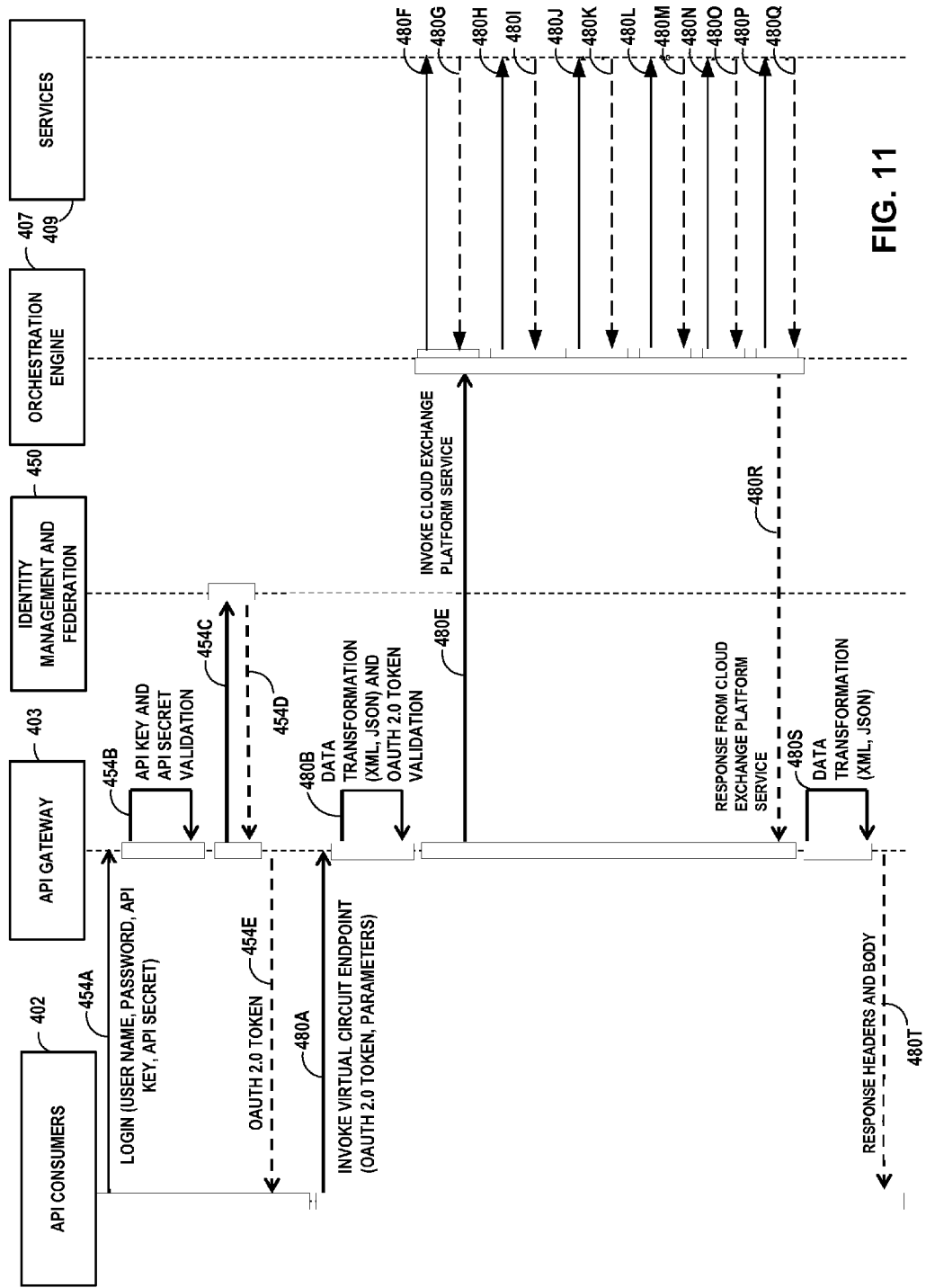

FIG. 11 is a flow diagram illustrating a call flow and operations performed by example components of an interconnection platform for a cloud exchange in dynamically managing interconnection assets for API developers 402 through machine-to-machine interaction. FIG. 11 includes some operations similar to those described above respect to FIG. 5. In response to receiving a request from API gateway 403 invoking the cloud exchange platform service (480E), orchestration engine 407 can orchestrate an API workflow based on defined rules and responses. For example, FIG. 11 shows how orchestration engine 407 can invoke a metro service (480F) to validate a metro code included in the initial request from API developer 402 invoking the virtual circuit endpoint (480A). Orchestration engine 407 receives a response from the metro service (480G).

Orchestration engine 407 can then validate a cloud service provider name with a cloud service (480H), and receive a response from cloud service (480I). Orchestration engine 407 can then invoke a port service to validate the seller and buyer ports (480J), and receive a response from the port service specifying whether the ports are valid for the requested virtual circuit (480K). Orchestration engine 407 can then invoke a network service provisioning service (e.g., network provisioning service 409F, FIG. 3B) to automatically configure the virtual circuit within the cloud exchange (480L), and receive a response from the network service provisioning service (480M). Orchestration engine 407 can then invoke a billing service (e.g., billing service 409H, FIG. 3B) (480N) and receive a response from the billing service (480O). Orchestration engine 407 can then invoke a CSP API to complete virtual circuit creation (480P), and receive a response from the CSP API (480Q). Orchestration engine 407 can include the virtual circuit information describing, e.g., whether the virtual circuit creation was successful, confirmation parameters, and connectivity parameters, in the response from the cloud exchange platform service to API gateway 403 (480R), and API gateway 403 in turn can provide the virtual circuit information to the requesting API developers 402 (480T).

In this manner, the techniques of this disclosure can be used to make Interconnection Asset Information such as Virtual Circuits and Ports information available to developers through machine-to-machine interaction. In some examples, the techniques of this disclosure can allow access to an Interconnection platform to enable creation or modification of Virtual Circuits of varying bandwidths through machine-to-machine interaction. In some examples, the techniques of this disclosure can allow Sellers (e.g., CSPs, NSPs and managed SP (MSPs)) the access to the Interconnection platform to obtain customized analytics about competitor presence in different metros and data centers through machine-to-machine interaction.

In some examples, the techniques of this disclosure can allow Buyers (e.g., NSPs, Enterprises) the access to the Interconnection Platform to obtain customized analytics about cloud service presence in areas where they already have port presence through machine-to-machine interaction. In some examples, the techniques of this disclosure can allow Sellers (CSPs, NSPs, and MSPs) the access to Interconnection platform to obtain customized analytics about buyer port density across different metros and data centers through machine-to-machine interaction. In some examples, the techniques of this disclosure can allow automated API request interception to validate partner access to interconnection assets, thus ensuring security of partner assets through machine-to-machine interaction. In some examples, the techniques of this disclosure can allow on demand access to dynamically set up and tear down virtual circuits through machine-to-machine interaction and direct access to interconnection platform resources. In some examples, the techniques of this disclosure can allow on demand access to schedule setup and tear down of virtual circuits at predefined intervals through machine-to-machine interaction and direct access to interconnection platform resources. In some examples, the techniques of this disclosure can accept and Allow request for virtual circuit speed bursting at certain pre-scheduled times to buyers (NSPs and enterprises) to capitalize on lower bandwidth usage and enable faster completion of batch processing tasks such as data backup or restore through machine-to-machine interaction (speed bursting).

In some examples, the techniques of this disclosure can allow detailed and customized analytics on virtual circuit traffic usage across data centers, metros and regions through machine-to-machine interaction. In some examples, the techniques of this disclosure can provide detailed and customized recommendations through APIs to partner developers and business teams on setting up their ports and virtual circuits for optimal performance, low latency and better interconnectivity through machine-to-machine interaction. In some examples, the techniques of this disclosure can allow machine based access to interconnection assets through the use of APIs. In some examples, the techniques of this disclosure can allow on demand setup of virtual circuits between buyers and sellers through the use of API ecosystem. In some cases, APIs may enable a much better connectivity between buyers and sellers through the availability of location discovery, asset discovery, cloud service discovery, customized traffic analytics, customized usage analytics, superior recommendation engine and an end-to-end automated virtual circuit provisioning system, for example, while abstracting the complexity of the entire interconnection platform. APIs can also enable a secure channel for access to interconnection assets outside of the cloud exchange domain by authenticated and authorized partners and customers. The API platform provides out of the box capability to address security issues (e.g., threat protection, SQL Injection protection, DDoS attack prevention, JSON bomb protection, etc).

Example details of a cloud-based service exchange are found in U.S. Provisional Patent Application No. 62/149, 374, entitled "Cloud-based Services Exchange" and filed on Apr. 17, 2015, which is incorporated herein by reference in its entirety.

Further example details of services exchanges for Ethernet and L3/Internet with direct L3/BGP peering are found in U.S. Pat. No. 8,537,845 entitled "REAL TIME CONFIGURATION AND PROVISIONING FOR A CARRIER ETHERNET EXCHANGE", filed Sep. 13, 2012; U.S. Utility Application titled "REAL TIME CONFIGURATION AND PROVISIONING FOR A CARRIER ETHERNET EXCHANGE" filed on Sep. 2, 2010 having application Ser. No. 12/875,054, which claims the benefit of and priority to all three:

1) U.S. Provisional Application titled "ETHERNET EXCHANGE" filed on Dec. 10, 2009 having application Ser. No. 61/285,371 and is incorporated herein by reference in its entirety; 2) U.S. Provisional Application titled "PRIVATE NETWORK CONNECTIVITY PLATFORM" filed on Sep. 4, 2009 having application Ser. No. 61/239,997 and is incorporated herein by reference in its entirety; and 3) U.S. Provisional Application titled "ETHERNET EXCHANGE" filed on Apr. 12, 2010 having application Ser. No. 61/323,066 and is incorporated herein by reference in its entirety, and U.S. patent application titled "REAL TIME CONFIGURATION AND PROVISIONING FOR A CARRIER ETHERNET EXCHANGE" filed on Sep. 2, 2010 having application Ser. No. 12/875,054. Each of the above patents and patent applications are incorporated herein by reference in their respective entireties.

Figure 12:
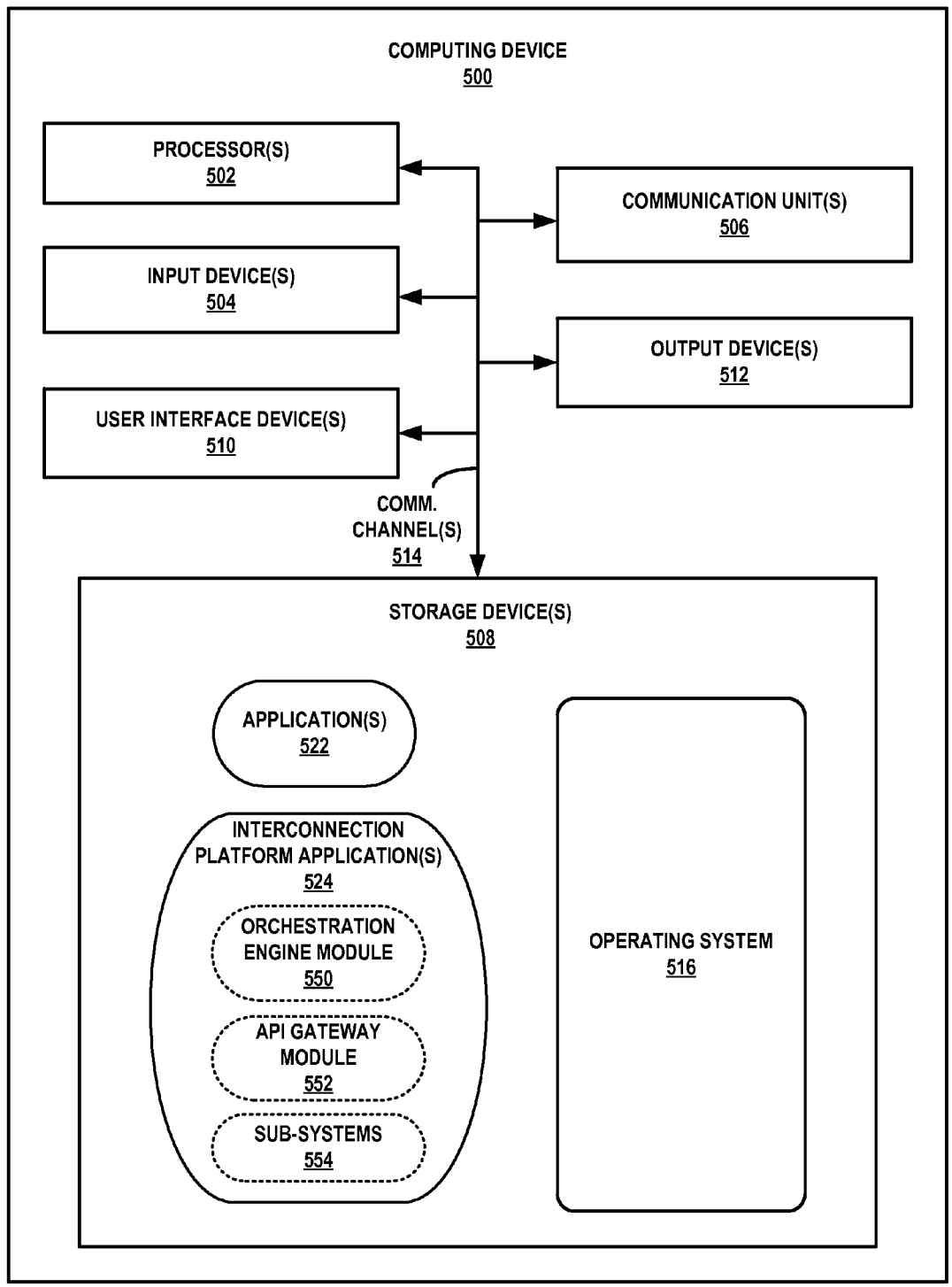
FIG. 12 is a block diagram illustrating further details of one example of a computing device that operates in accordance with one or more techniques of the present disclosure.

FIG. 12 is a block diagram illustrating further details of one example of a computing device that operates in accordance with one or more techniques of the present disclosure. FIG. 12 may illustrate a particular example of a server or other computing device 500 that includes one or more processor(s) 502 for executing any one or more of API gateway 112/403, orchestration engine 118/407, sub-systems 120, or any other computing device described herein. Other examples of computing device 500 may be used in other instances. Although shown in FIG. 12 as a stand-alone computing device 500 for purposes of example, a computing device may be any component or system that includes one or more processors or other suitable computing environment for executing software instructions and, for example, need not necessarily include one or more elements shown in FIG. 12 (e.g., communication units 506; and in some examples components such as storage device(s) 508 may not be co-located or in the same chassis as other components). Computing device 500 may be located and execute, for example, within any of cloud exchange points 128, another interconnection facility, or at a branch office or cloud computing environment employed or used by a cloud exchange provider.

As shown in the specific example of FIG. 12, computing device 500 includes one or more processors 502, one or more input devices 504, one or more communication units 506, one or more output devices 512, one or more storage devices 508, and user interface (UI) device 510, and communication unit 506. Computing device 500, in one example, further includes one or more applications 522, virtual concept-building application 524, and operating system 516 that are executable by computing device 500. Each of components 502, 504, 506, 508, 510, and 512 are coupled (physically, communicatively, and/or operatively) for inter-component communications. In some examples, communication channels 514 may include a system bus, a network connection, an inter-process communication data structure, or any other method for communicating data. As one example, components 502, 504, 506, 508, 510, and 512 may be coupled by one or more communication channels 514. Computing device 500 may be located and execute, for example, within any of cloud exchange points 128, another interconnection facility, or at a branch office or cloud computing environment employed or used by a cloud exchange provider.

Processors 502, in one example, are configured to implement functionality and/or process instructions for execution within computing device 500. For example, processors 502 may be capable of processing instructions stored in storage device 508. Examples of processors 502 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 508 may be configured to store information within computing device 500 during operation. Storage device 508, in some examples, is described as a computer-readable storage medium. In some examples, storage device 508 is a temporary memory, meaning that a primary purpose of storage device 508 is not long-term storage. Storage device 508, in some examples, is described as a volatile memory, meaning that storage device 508 does not maintain stored contents when the computer is turned off. Examples of volatile memories include random access memories (RAM), dynamic random access memories (DRAM), static random access memories (SRAM), and other forms of volatile memories known in the art. In some examples, storage device 508 is used to store program instructions for execution by processors 502. Storage device 508, in one example, is used by software or applications running on computing device 500 to temporarily store information during program execution.

Storage devices 508, in some examples, also include one or more computer-readable storage media. Storage devices 508 may be configured to store larger amounts of information than volatile memory. Storage devices 508 may further be configured for long-term storage of information. In some examples, storage devices 508 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 500, in some examples, also includes one or more communication units 506. Computing device 500, in one example, utilizes communication units 506 to communicate with external devices via one or more networks, such as one or more wired/wireless/mobile networks. Communication units 506 may include a network interface card, such as an Ethernet card, an optical transceiver, a radio frequency transceiver, or any other type of device that can send and receive information. Other examples of such network interfaces may include 3G and WiFi radios. In some examples, computing device 500 uses communication unit 506 to communicate with an external device.

Computing device 500, in one example, also includes one or more user interface devices 510. User interface devices 510, in some examples, are configured to receive input from a user through tactile, audio, or video feedback. Examples of user interface devices(s) 510 include a presence-sensitive display, a mouse, a keyboard, a voice responsive system, video camera, microphone or any other type of device for detecting a command from a user. In some examples, a presence-sensitive display includes a touch-sensitive screen.

One or more output devices 512 may also be included in computing device 500. Output device 512, in some examples, is configured to provide output to a user using tactile, audio, or video stimuli. Output device 512, in one example, includes a presence-sensitive display, a sound card, a video graphics adapter card, or any other type of device for converting a signal into an appropriate form understandable to humans or machines. Additional examples of output device 512 include a speaker, a cathode ray tube (CRT) monitor, a liquid crystal display (LCD), or any other type of device that can generate intelligible output to a user.

Computing device 500 may include operating system 516. Operating system 516, in some examples, controls the operation of components of computing device 500. For example, operating system 516, in one example, facilitates the communication of one or more applications 522 and interconnection platform application(s) 524 with processors 502, communication unit 506, storage device 508, input device 504, user interface devices 510, and output device 512.

Application 522 and interconnection platform application(s) 524 may also include program instructions and/or data that are executable by computing device 500. Example interconnection platform application(s) 524 executable by computing device 500 may include any one or more of orchestration engine module 550, API gateway module 552, and sub-systems 554, each illustrated with dashed lines to indicate that these may or may not be executable by any given example of computing device 500.

Orchestration engine module 550 may include instructions for causing computing device to perform one or more of the operations and actions described in the present disclosure with respect to orchestration engine 118 and orchestration engine 407. As one example, orchestration engine module 550 may include instructions that cause computing device 500 to organize, direct and integrate underlying software sub-systems of the interconnection platform for a cloud exchange for managing various aspects of interconnection within the network infrastructure as well as cloud services management. The orchestration engine module 550 may, for example, provide a rule-drive workflow engine that operates between the APIs and the underlying interconnect platform of a cloud exchange that includes sub-systems and network infrastructure.

API gateway module 552 may include instructions for causing computing device to perform one or more of the operations and actions described in the present disclosure with respect to API gateway 112 and API gateway 403. As one example, API gateway module 403 may include instructions that cause computing device 500 to expose a collection of software interfaces, e.g., APIs 114, that define the methods, fields, and/or other software primitives by which applications may invoke the interconnection platform. These software interfaces allow carriers and customers programmable access to capabilities and assets of a cloud exchange.

Sub-systems 554 may include instructions for causing computing device to perform one or more of the operations and actions described in the present disclosure with respect to sub-systems 120.

Figure 13:
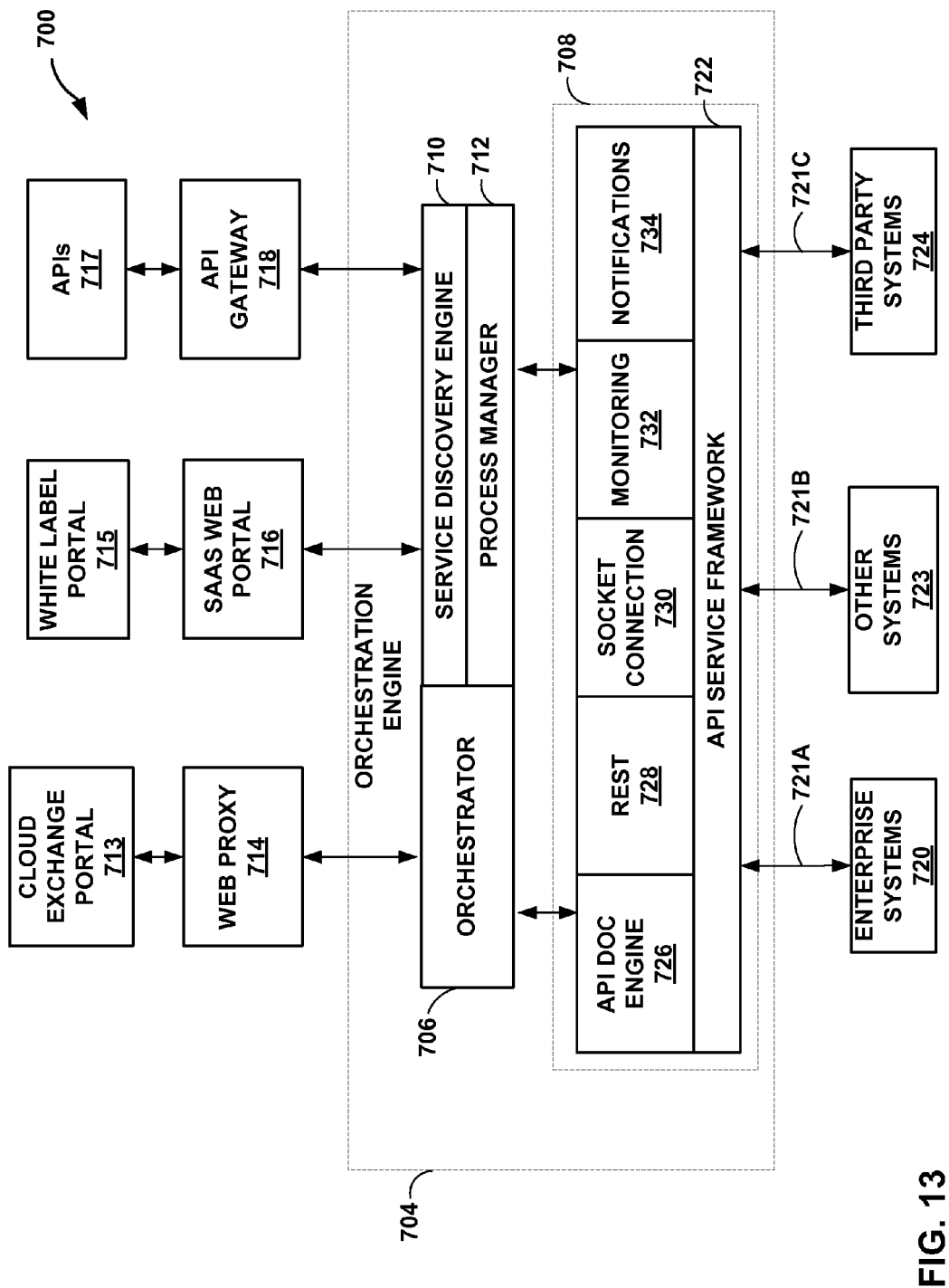
FIG. 13 is a block diagram illustrating an example system showing a logical architecture of an orchestration engine, in further detail, according to techniques described herein.

FIG. 13 is a block diagram illustrating an example cloud exchange system 700 showing an example logical architecture of an orchestration engine 704 in further detail. Orchestration engine 704 may represent, for example, any of orchestration engine 118 (FIGS. 1A-1C and FIG. 2), orchestration engine 407 (FIGS. 3A-3B, 4-5, 7-11), and orchestration engine module 550 of computing device 500 (FIG. 12).

The orchestration engine 704 operates as part of an overall interconnection platform (e.g., interconnection platform 103 of FIGS. 1B, 1C) to seamlessly set up interconnection assets including virtual connections (e.g., virtual circuits) between buyers and sellers, such as between an enterprise and a cloud service provider. In the example of FIG. 13, orchestration engine 704 includes two major components: orchestrator 706 and microservices 708 provided by the cloud exchange system 700. Orchestration engine 704 also includes service discovery engine 710 and process manager 712. Orchestration engine 704 may represent a centralized or distributed application and may execute on a management device such as one or virtual machines and/or real servers of data center 101 (FIG. 1A).

Microservices 708 each implements a set of focused and distinct features or functions, and a microservice conforms to (or is usable in) an architectural pattern in which many dozens or even hundreds of microservices can be independently developed and deployed. Microservice 708 may be organized around a business capability (e.g., API dock engine 726, REST interfaces 728, socket connection 730, monitoring 732, and notifications 734) and may implement a "broad-stack" of software for the business capability, including persistent storage and any external collaboration. The various microservices 708 expose interfaces that enable the microservices 708 to invoke one another to exchange data and perform the respective sets of functions in order to create an overall application. In some examples, microservices 708 may represent or include other microservice examples described in this disclosure, e.g., microservices for implementing cloud exchange services 409, API query services 422A, API command services 422B, integration façade services 422C, any microservices provided by sub-systems 120, and microservices 308D.

Each of microservices 708 may adhere to a well-defined Application Programming Interface (API) and may be orchestrated, by invoking the API of the microservice 708, according to a workflow performed by the orchestrator 706. The orchestrator 706 component "orchestrates" the microservices 706 based on rules or workflow defined for various APIs exposed by the orchestrator 706 (e.g., via an API server/gateway such as API gateways 112, 403, and 718) and invokable by API requests that conform to the respective API contracts. The orchestrator 706 may handle API requests generically by following an established set of rules, or workflows, that allow a fully-customizable API contract for each external channel to API consumers, whether a portal, mobile application, or developer API, for instance. The workflow may be implemented in some examples as a state machine. Because of variability in the request/response contract for each channel, the orchestrator 706 described in this disclosure may embrace and provide equal support for the differences across different channels.

Orchestration engine 704 organizes, directs and integrates underlying software and network sub-systems for managing various aspects of interconnection for the cloud exchange. Orchestrator 706 of orchestration engine 704 may, for example, execute a rule-driven workflow engine that operates between the APIs and the underlying interconnect platform of the exchange. For example, orchestrator 706 may correspond to workflow and rules engine 306 of FIG. 2 that operates in accordance with policies 308A. In this way, orchestration engine 704 can be used by customer-proprietary applications and the APIs for direct participation within the interconnection platform of the cloud exchange.

As described herein, orchestration engine 704 synthesizes the information and actions from underlying sub-systems of the interconnection platform to formulate intelligent next steps and responses to dynamic requests made by the customer applications. As such, orchestration engine 704 abstracts the complexity of the underlying software and network sub-systems of the cloud exchange by providing a uniform, simplified, and secured means to access the interconnection platform.

In the example of FIG. 13, cloud exchange system 700 provides multiple platforms allowing access to the cloud exchange functionality provided by cloud exchange system 700, including web proxy 714, SaaS web portal 716, and API gateway 718. Orchestration engine 704 services all requests coming in from these platforms, regardless of whether the requests were made via cloud exchange portal 713, white label portal 715 developed by the cloud exchange provider but labeled for the customer, and APIs 717. For example, web proxy 714, SaaS web portal 716, and Web proxy 714, SaaS web portal 716, and API gateway 718 represent different channels for requests to access the orchestrator 706. For example, a customer may use a web application to log in to the portal 713 and access services of the interconnection platform. As another example, a customer or developer may use APIs to access cloud exchange data. Orchestration engine 704 can receive requests entered using a cloud exchange portal 713 via web proxy 714. Orchestration engine 704 can receive requests entered using a white label portal 715 via a SaaS web portal 716. Orchestration engine 704 may communicate with SaaS web portal 716 (e.g., a CSP portal) using a network protocol such as Hyper Text Transfer Protocol (HTTP), for example, or other network protocol. Orchestration engine 704 can receive requests entered using APIs 717 via an API gateway 718. API gateway 718 may represent any of the API gateways described herein and uses service discovery engine 710 to identify service instances to which to route requests received via APIs 717.

As described briefly above, microservices 708 represent cloud exchange functions that are broken down into smaller services (microservices) organized around business capability. The microservices 708 may execute a broad-stack software implementation for that business area, including persistent storage, and any external collaboration, such as with third party systems 724.

Orchestrator 706 receives a request from the web proxy 714, portal 716, or API gateway 718, and seamlessly coordinates multiple microservices of microservices 708 to service the request. For example, based on the received request, orchestrator 706 may determine a workflow that automatically calls the microservices needed to service the request. For example, API gateway 718 passes an input, orchestration engine 704 processes the input, calls multiple microservices 708 and obtains data needed to satisfy the contracts needed by the API and sends a response to the API including the data needed by the API. For example, to create a virtual circuit, orchestrator 706 needs multiple microservice endpoints. For example, orchestrator 706 needs a metro, a port, and billing information. These are all individual internal APIs which are seamlessly orchestrated through orchestrator 706, as described herein. With a request/response operation, the API (for instance) may invoke the metro microservice, and the orchestration engine invokes a managed metro routine (workflow) and performs required services to fulfill the request with regard to that metro routine, via the microservice, and then sends back any data relevant to the operation. Orchestration engine 704 may invoke cloud service provider connectors from one of the microservices. In this manner, orchestration engine 704 provides the service or data requested by the customer in a seamless manner such that the customer is not made aware of the underlying details of the individual microservices being invoked according to the workflow selected by the orchestrator 706 for servicing the customer request.

In some examples, the microservices 708 may represent microservices developed and provided by cloud service providers. That is, orchestrator 706 may invoke a cloud service provider interface accessible via one of the microservices. For example, Azure (provided by Microsoft Corporation) may provide cloud services and expose an interface accessible by one of the microservices 708 developed for the purpose of managing the cloud services. The orchestrator 706 can call a RESTful interface (an example of a "CSP API" described elsewhere herein) to the microservice provided by Azure to fulfill some of the functionality. For example, to create a virtual connection from the cloud-exchange application to a cloud service provider, the orchestration engine 704 may invoke an Azure-provided microservice to perform certain of the functions, such as enabling a port. After invoking the Azure-provided microservice, the orchestrator may invoke other microservices to implement the overall workflow. For example, the orchestrator may then invoke ordering, validation, and/or authentication microservices. RESTful API endpoints/channels may provide accessibility to microservices.

In the example of FIG. 13, microservices 708 include an internal API document engine API 726 ("API Doc Engine"), REST interface microservice 728, socket connection microservice 730, monitoring microservice 732, notifications microservice 734, and API service framework 722. Orchestration engine 704 also uses internal API service framework 722 to interact with various internal or third party systems via APIs, when invoking one or more of microservices 708. Microservices 708 may present API interfaces to orchestrator 706 and execute in the API service framework 722. APIs 721A-721C ("APIs 721") may be called by components of a microservices layer of orchestration engine 704, and may be considered microservice endpoints. APIs 721 are not customer-facing APIs.

In the example of FIG. 13, orchestration engine 704 uses API service framework 722 to interact with enterprise systems 720 via private API 721A. Orchestration engine 704 uses API service framework 722 to interact with other systems 723 via private API 721B. Orchestration engine 704 uses API service framework 722 to interact with third party systems via a public API 721C, and to integrate cloud-based services platforms into the cloud exchange.

Figure 14:
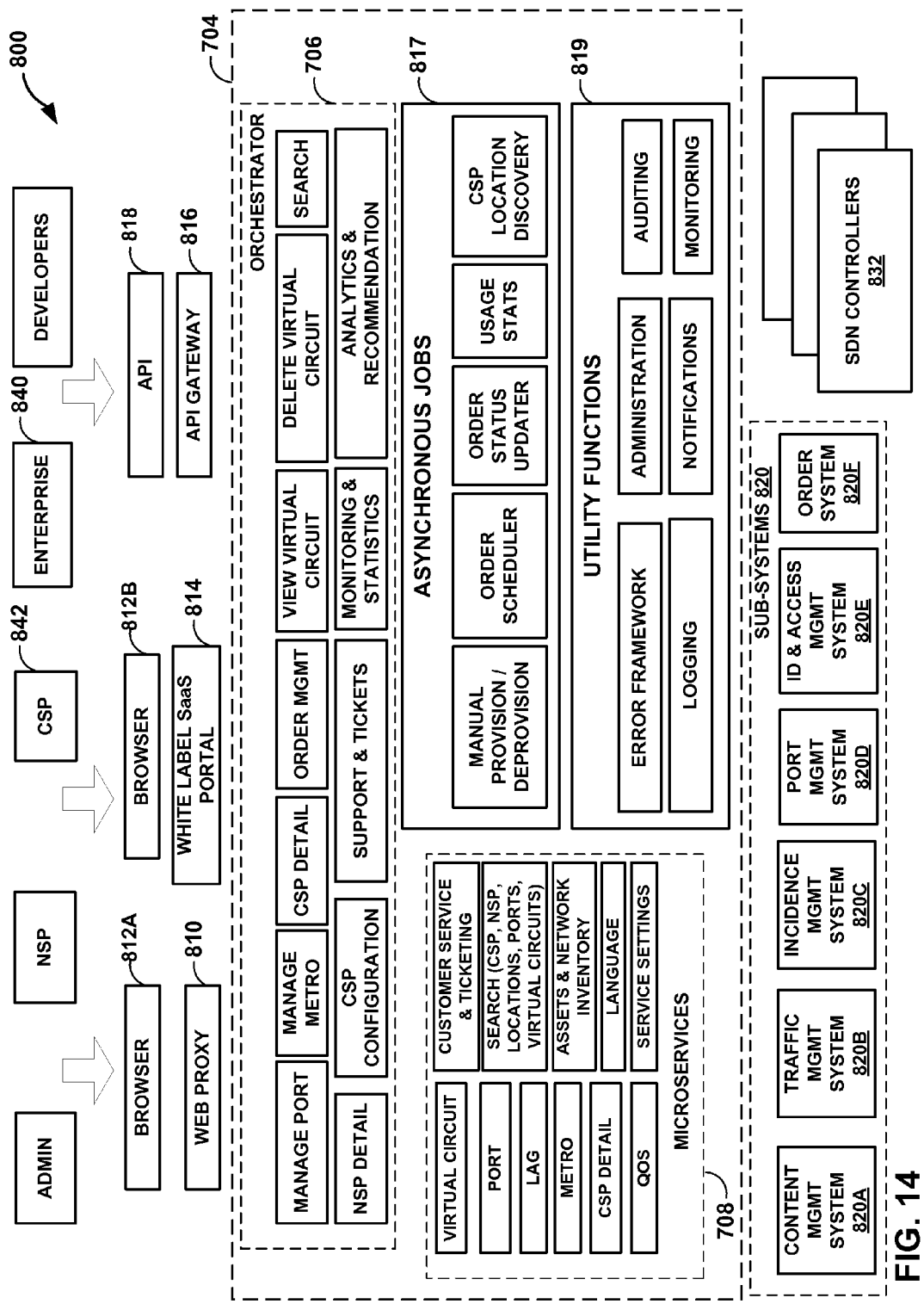
FIG. 14 is a block diagram illustrating an example system showing reference architecture of an orchestration engine, in further detail, according to techniques described herein.

FIG. 14 is a block diagram illustrating an example system 800 showing a reference architecture for an orchestration engine 704 in further detail. Orchestration engine 704 may represent, for example, any of orchestration engine 118 (FIGS. 1A-1C and FIG. 2), orchestration engine 407 (FIGS. 3A-3B, 4-5, 7-11), orchestration engine module 550 of computing device 500 (FIG. 12), and orchestration engine 704 of FIG. 13. As one example, system 800 may represent a different logical view of cloud exchange system 700 of FIG. 13.

Orchestration engine 704 operates as part of an overall interconnection platform (e.g., interconnection platform 103 of FIGS. 1B, 1C) to seamlessly set up interconnection assets including virtual connections (e.g., virtual circuits) between buyers and sellers, such as between an enterprise 840 and a cloud service provider 842. For example, orchestration engine 704 may seamlessly set up virtual circuits 150, 155, 160, 165, 170 between customer systems 196 of FIG. 1C.

Orchestration engine 704 may represented centralized or distributed applications and may execute on a management device such as one or virtual machines and/or real servers of data center 101 (FIG. 1A). Orchestration engine 704 may receive requests for interconnection assets from various customer systems. For example, orchestration engine 704 may receive requests from internal administrators (i.e., administrators belonging to the same entity as orchestration engine 704) ("admin"), network service providers (NSP), cloud service providers (CSP) 842, enterprises 840 and developers. Orchestration engine 804 may receive the requests at web proxy 810 via browser 812A, at white label SaaS 814 via browser 812B, or at API gateway 816 via API 818.

Orchestrator 806 can manage workflows for performing such functions as manage port, manage metro, CSP detail, order management, view virtual circuit, delete virtual circuit, search, support and tickets, monitoring and statistics, analytics and recommendation, for example. Orchestrator 806 can also perform additional functions not shown, including those described above with respect to orchestration engine 407. In some examples, orchestrator 806 may maintain a library of workflows, from which orchestrator can select and load a suitable workflow in response to receiving a request via any of the channels mentioned above.

In some examples, orchestration engine 704 may run as a set of virtual machines executing on a server network device. Orchestration engine 704 may be built and run on a software application platform such as Node.js. Microservices may be enabled using a web application framework. Microservices and workflows may be built and run as distributed applications in software containers. Orchestration engine 704 may use in-memory grid caching using an in-memory and persistent disk database.

Aspects of the orchestration engine 704 may be built on Node.js or other similar platform that, e.g., provides an event-driven architecture and a non-blocking I/O API designed to optimize an application's throughput and scalability for real-time web applications. Node.js is a lightweight, open-source platform having that facilitates loosely-coupled and scalable systems that communicate using, e.g., HTTP and JSON, which are built into Node.js. This may facilitate microservice design principles for creating and deploying microservices 708.

The orchestrator 706 may use state machines to implement workflows that invoke multiple microservices 706 in a defined ordering to satisfy an API contract. Microservices 706 (and multiple instances of each of microservices 706) may be deployed in separate containers for isolation and modularity, while also providing enhanced quality and reliability with integrated testing, logging, monitoring, and diagnostic strategies. Container technology is a mechanism for deploying units of work across a vast pool of compute resources and has become a strategic deployment strategy for scalability. Microservices and containers provide a convergence of technical approaches to building scalable systems. Node.js is an open source platform that is optimized for building highly scalable lightweight, asynchronous communicating processes and exposing APIs to any Web consumer. Orchestration engine 704 may leverage Node.js, microservices, and containers, for implementation and deployment as a microservices-based interconnection platform for a cloud-based services exchange.

Orchestration engine 704 also includes functionality for calling utility functions 819 including error framework, logging, administration, notifications, auditing, and monitoring, for example. Utility functions 819 may include a process manager to keep applications alive with zero downtime, and which performs process monitoring, process log watching, memory management, and the like.

FIG. 14 also illustrates a plurality of internal microservices 708 of orchestration engine 704 including, for example, virtual circuit, port, link aggregation group (LAG), metro, CSP detail, Quality of Service (QoS), customer service and ticketing, search (e.g., CSP, NSP, locations, ports, virtual circuits), assets and network inventory, language, and service settings. Microservices 708 present individual internal APIs (that is, internal to orchestration engine 706 and not exposed via API 818, e.g.) or microservice endpoints. In some examples, microservices 708 may correspond to microservices 308D of FIG. 2. For example, the "metro" internal API of microservices 708 corresponds to a microservice interface for a metro operation that is internal to orchestration engine 704. An API consumer such as one of API consumers 402 (FIG. 3A) may request a metro via customer-facing metros API 406C of APIS 114 (FIG. 3A), and orchestrator 706 will translate from the customer-facing metros API 406C to the internal metro microservice 806. Orchestrator 706 can select a workflow that ties together the individual microservices that are needed to satisfy the customer-facing metro API operation.

Orchestration engine 704 also includes functionality for calling asynchronous jobs 817 including manual provisioning/de-provisioning, order scheduler, order status updater, usage statistics, cloud service provider location discovery, for example. The orchestrator 706 may call these jobs asynchronously.

Orchestration engine 704 can interface with various sub-systems 820A-820F ("sub-systems 820"), such as content management system 820A, traffic management systems 820B, incidence management system 820C, port management system 820D, ID and access management system 820E, and order management system 820F, for example. Sub-systems 820 may correspond to sub-systems 120 of FIGS. 1B, 1C, 2, and 4, for example. For example, content management system 820A includes data associated with content that may be distributed via a web application portal, such as SaaS web portal 716. For example, traffic management systems 820B provides traffic-related data for internal cloud exchange platform traffic, such as at the port level or virtual circuit level. In one example, when orchestrator 706 selects a workflow to provide a function relating to support and tickets, orchestrator 706 uses one of microservices 708 (e.g., customer service and ticketing microservice) to interface with one of sub-systems 820, such as incidence management system 820C, according to the selected workflow. The microservice may connect to a database, connect using a REST API, connect using a JSON call, or other mechanism, to interface with the sub-systems 820.

In some examples, sub-systems 820 may apply the service tasks orchestrated by orchestration engine 118, which may include modifying any of cloud exchange points 128 to perform the on-demand setup of virtual circuits between CSPs 842 and enterprises 840, for example, or otherwise manage cloud exchange interconnection assets such as ports, metros, data centers, virtual circuits and virtual circuit bandwidth, profiles, and configuration.

Orchestration engine 704 can interface with one or more SDN controllers 832 for the network infrastructure of the cloud-based services exchange. SDN controllers 832 may reside within the cloud exchange platform data center, such as data center 101 of FIG. 1. SDN controllers 832 may be used to connect switches between point A to point B within a cloud exchange network infrastructure. Techniques for orchestrating SDN controllers in the context of a cloud-based services exchange are described in further detail in U.S. Provisional Patent Appln. No. 62/164,965, filed May 21, 2015 and entitled "Active Panel Demarcation"; and in U.S. Provisional Patent Appln. No. 62/216,804, filed Sep. 10, 2015 and entitled "Automated Fiber Cross-connect Service within a Multi-tenant Interconnection Facility;" each of which is incorporated by reference herein in its entirety.

Figure 15:
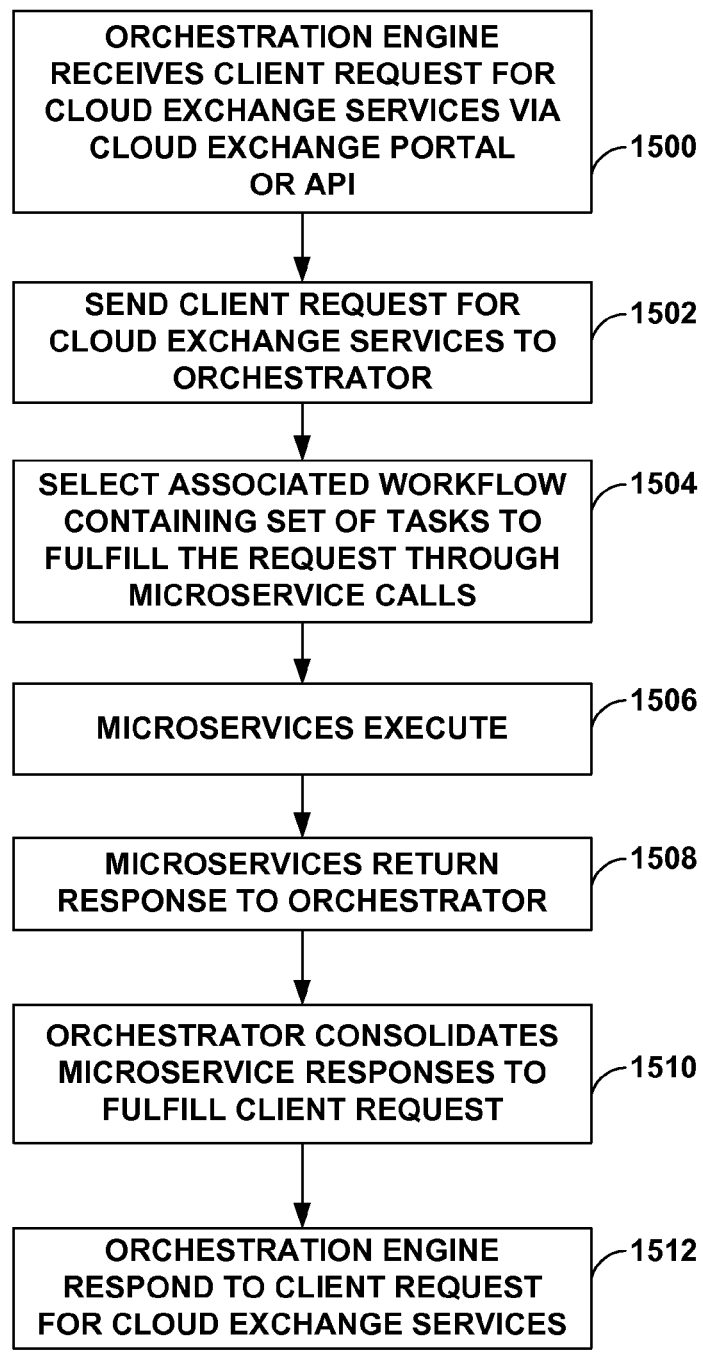
FIG. 15 is a flowchart illustrating an example workflow performed by an orchestration engine in accordance with example aspects of this disclosure.

FIG. 15 is a flowchart illustrating an example workflow performed by an orchestration engine in accordance with example aspects of this disclosure. For purposes of example, FIG. 15 is described with respect to orchestration engine 704 of FIGS. 13 and 14, but may likewise apply to other examples of an orchestration engine described herein.

Orchestration engine 704 receives client requests for cloud exchange platform services, such as via the cloud exchange portal 814 or API gateway 816 (1500). Orchestration engine 704 sends the client request for cloud exchange platform services to orchestrator 706 (1502). Based on the client request, orchestrator 706 selects a workflow from a workflow library or folder (e.g., workflows folder 1612 of FIG. 16 including workflows WF1, WF2, WF3, and WF4), where the selected workflow contains the set of tasks needed to fulfill the request through microservice calls (1504). For example, orchestrator 706 may select the workflow based on configured rules or policies (e.g., policies 308A of FIG. 2), and/or based on a profile associated with the client (e.g., profiles 308B of FIG. 2). Orchestrator 706 will automatically load the selected workflow, and the microservices execute according to the workflow (e.g., sequentially and/or in parallel) (1506). The workflows folder 1612 contains workflows that have been previously defined (e.g., by cloud exchange developers) for each customer endpoint. For example, there may be a first workflow defined for a metro customer endpoint and a second workflow defined for a port customer endpoint. Workflows provide a set of logic that uses one or more state machines as a guide to indicate how to transfer from one state to another to fulfill the request. A workflow defines a task orchestration. Workflows provide a way to decompose a series of complex operations down to a sequence of discrete tasks within a state machine and executed by microservices to satisfy requests received via different request channels like portals and API. Each request can have different associated domain contracts. For a given request, orchestrator 706 selects a workflow that uses a sequence of discrete tasks within a state machine to satisfy the domain contract associated with the request.

The microservices then return respective responses to orchestrator 706 (1508). The responses may include data provided by the microservice. Orchestrator 706 consolidates the data received in the responses from each of the workflows, as necessary to fulfill the client request (1510). Orchestration engine 704 then responds to the client request for cloud exchange services (1512).

In this context, microservices are endpoints, and a task is an action currently executing to fulfill a request. One example task could be to call a set of microservices (endpoints), collectively. When you call a particular endpoint, some data is returned, which may be data to be used by the next endpoint, in a chain. In this manner, the workflow may define a chain of tasks to be completed, where data obtained in one task may be used in and/or may determine the next task.

As one example, a cloud exchange customer may want to connect to multiple different cloud service providers via the cloud exchange platform. In this situation, orchestrator 706 has to call multiple APIs. In another example, a cloud service provider can create a template for onboarding new customers and provide the template to orchestrator, and the orchestrator can easily use the template for onboarding new customers who want to connect with the cloud service provider. Orchestrator 706 can orchestrate any type of workflows, and more than one customer can use the workflows. The same workflow can be used by different customers for executing the functionality they need (e.g., creating a virtual circuit). Various example workflows are illustrated and described with respect to FIGS. 5-11 and 16-17.

Figure 16:
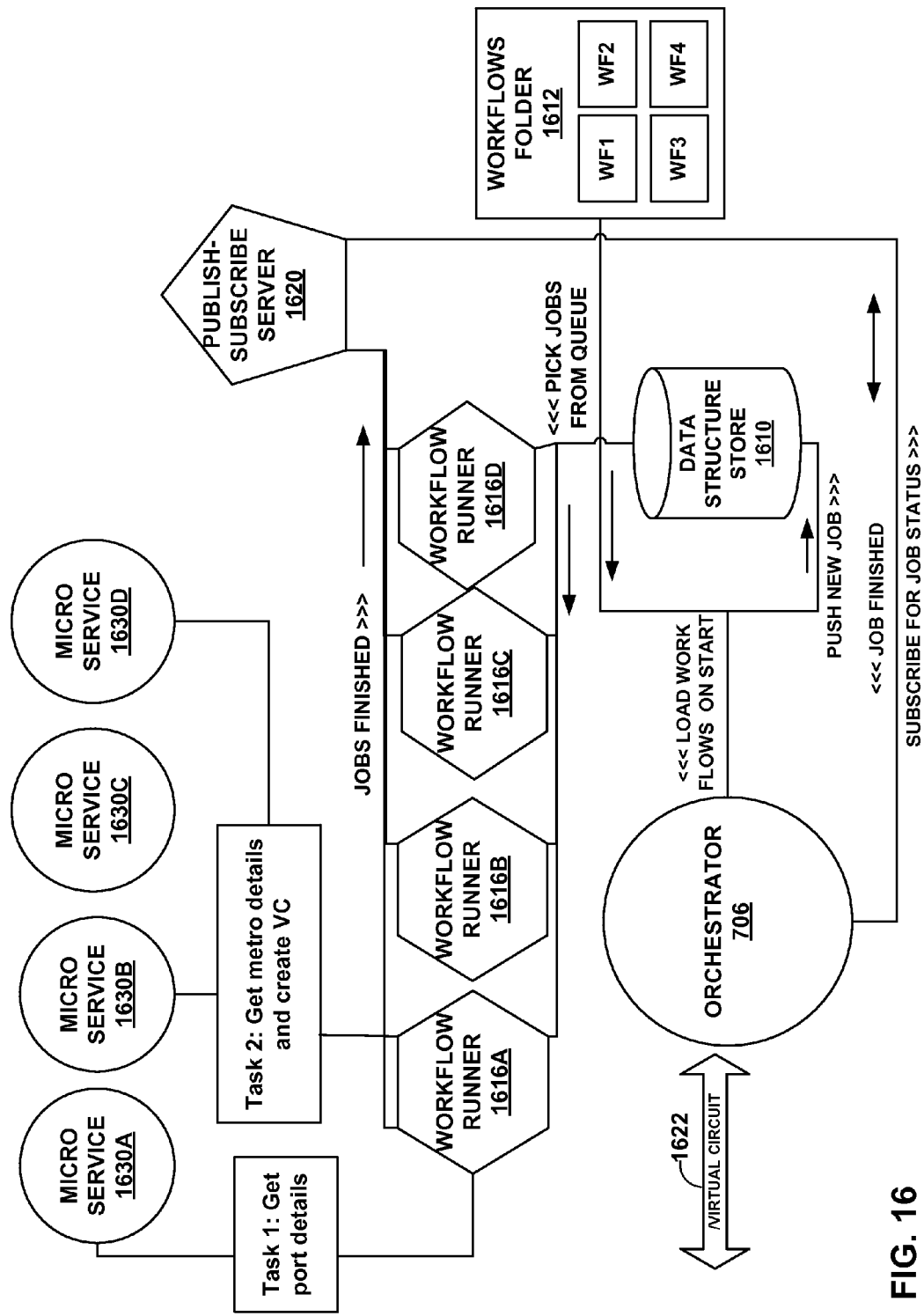
FIG. 16 is an example logical diagram illustrating an example orchestration engine workflow relating to creating a virtual circuit in accordance with example aspects of this disclosure.

FIG. 16 is an example logical diagram illustrating an example orchestration engine workflow relating to creating a virtual circuit. In this example, orchestrator 706 receives a client request 1622 that invokes a "/virtual circuit" API endpoint, exposed by orchestrator 706, to provision a virtual circuit in the cloud-based services exchange between the client and a cloud service provider. Orchestrator 706 selects a workflow for provisioning a virtual circuit from workflows folder 1612, loads the selected workflow, and pushes a new job to data structure store 1610. Orchestrator 706 also subscribes to publish-subscribe server 1620 for job status.

The workflow specifies a set of task. For example, the workflow for provisioning the virtual circuit specifies a set of tasks comprising: (i) obtaining port details, (ii) obtaining metro details, and (iii) creating the virtual circuit based on the port details and the metro details. Orchestrator 706 can distribute tasks of the set of tasks across a plurality of workflow runners 1616A-1616D, which access one or more of microservices 1630A-1630D (endpoints) to perform the tasks. The workflow runners 1616 may pick jobs from a queue maintained by data structure store 1610. In some examples, each task in a selected workflow may be executed on a different thread. Tasks may be executed in parallel or sequentially. As each task finishes, publish-subscribe server 1620 is updated, and publish-subscribe server 1620 notifies orchestrator 706. For example, "Job Finished" is a method that is called once the execution of the workflow finishes. When orchestrator 706 determines that the virtual circuit has been established, orchestrator 706 may notify the client that made the request, e.g., by returning an HTTP response.

In some cases, the sequence of tasks in a workflow may be more complex than just tasks performed in a series. Tasks can fail, and so orchestrator 706 may at times need to deal with timeouts, retries, "stuck" flows, and so forth. One way to define a workflow and its tasks is using an arbitrarily-complex language. Another way may involve making some assumptions, such as: (1) Code is the definition language; (2) Tasks are independent, and can be used into different workflows; (3) The only way to communicate between tasks is the workflow. Tasks can add, remove or modify properties of the workflow. (4) If a task requires a specific property of the workflow to be present, the task can fail, or re-schedule itself within the workflow. The system must be designed with failures in mind. Tasks can fail and, as a consequence, workflows may fail. Orchestrator 706 may need to recover from a task failure, or from a whole workflow failure. In some examples, orchestrator 706 uses a service discovery engine 710 (FIG. 13) to discover an alternate microservice to use when a first task fails due to the microservice not responding properly or returning an error message.

For example, if there are five microservice tasks that orchestrator 706 has to execute for providing a cloud exchange service, process manager 712 of orchestration engine 704 can decide to execute the tasks in parallel, or sequentially. If orchestrator 706 determines that a particular microservice is not responding properly, or the microservice returns an error message, orchestrator 706 determines whether to execute the microservice again or whether there is any other fallback microservice that orchestrator 706 can use instead. Orchestrator 708 uses service discovery engine 710 (FIG. 13) to discover an alternate microservice (e.g., having a different uniform resource locator (URL)).

Orchestrator 706 may call a first URL for a microservice, but that microservice returns an error code. Orchestrator 706 uses service discovery engine 710 to determine whether orchestrator 706 should discover an alternate microservice (e.g., having a different uniform resource locator (URL)). For example, orchestrator 706 may invoke a port microservice, which includes multiple different URLs that are interfaces to different port applications that perform the port microservice.

Figure 17:
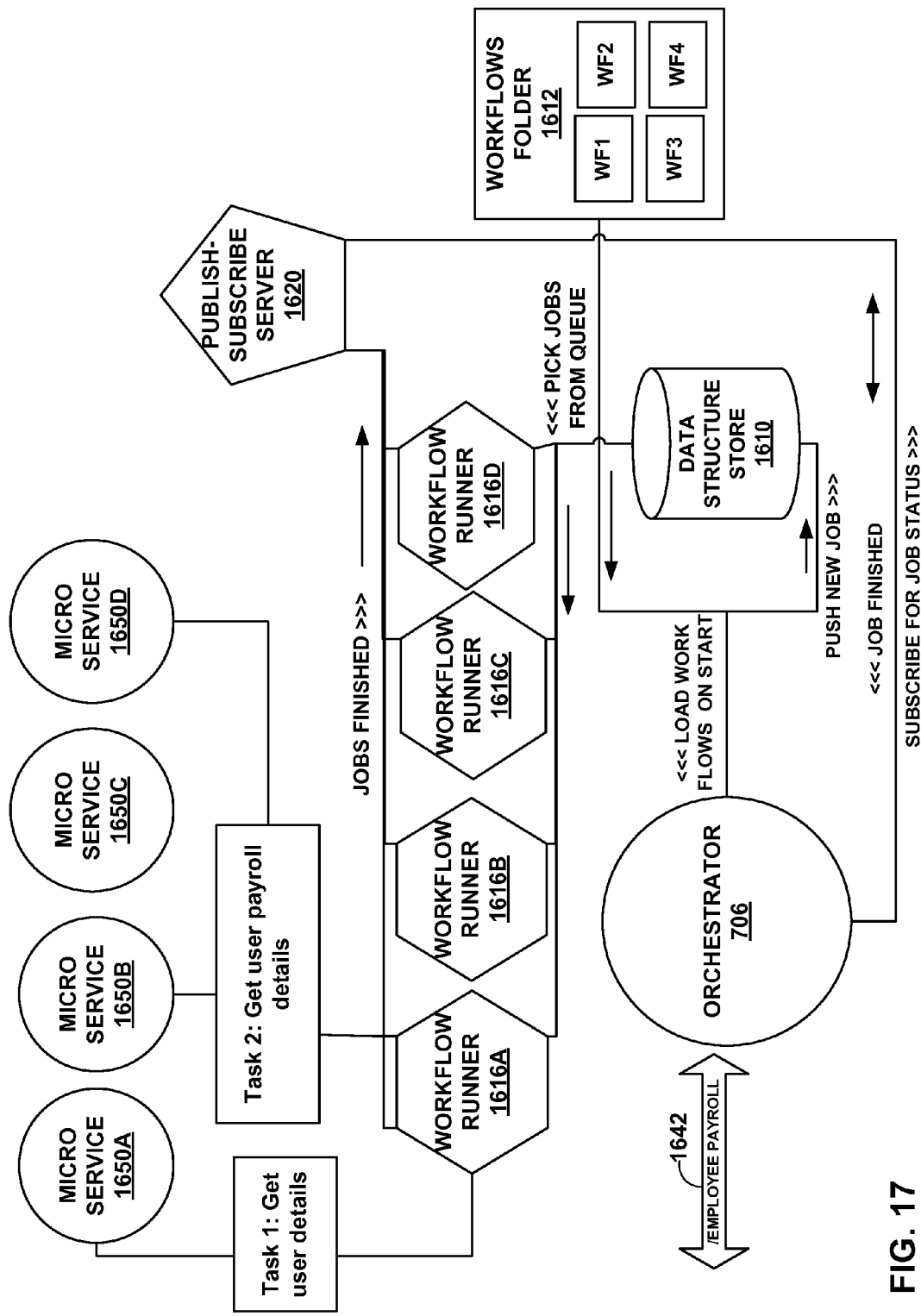
FIG. 17 is an example logical diagram illustrating an example orchestration engine workflow relating to obtaining employee payroll information in accordance with example aspects of this disclosure.

FIG. 17 is an example logical diagram illustrating an example orchestration engine workflow relating to obtaining employee payroll information. In this example, orchestrator 706 receives a client request 1642 that invokes an "/employee payroll" API endpoint, exposed by orchestrator 706, to obtain employee payroll information. Orchestrator 706 selects a workflow for obtaining employee payroll information from workflows folder 1612, loads the selected workflow, and pushes a new job to data structure store 1610. Orchestrator 706 also subscribes to publish-subscribe server 1620 for job status.

The workflow specifies a set of task. For example, the workflow for obtaining employee payroll information specifies a set of tasks comprising: (i) obtaining user details, (ii) obtaining user payroll details based on the user details. Orchestrator 706 can distribute tasks of the set of tasks across a plurality of workflow runners 1616A-1616D, which access one or more of microservices 1650A-1650D (endpoints) to perform the tasks. The microservices 1650A-1650D accessed by workflow runners 1616A-1616D in the example of FIG. 17 may be different microservices than microservices 1630A-1630D in the example of FIG. 16. The workflow runners 1616 may pick jobs from a queue maintained by data structure store 1610. In some examples, each task in a selected workflow may be executed on a different thread. Tasks may be executed in parallel or sequentially. As each task finishes, publish-subscribe server 1620 is updated, and publish-subscribe server 1620 notifies orchestrator 706. For example, "Job Finished" is a method that is called once the execution of the workflow finishes. When orchestrator 706 determines that the employee payroll information has been obtained, orchestrator 706 may notify the client that made the request, e.g., by returning an HTTP response.

Figure 18A:
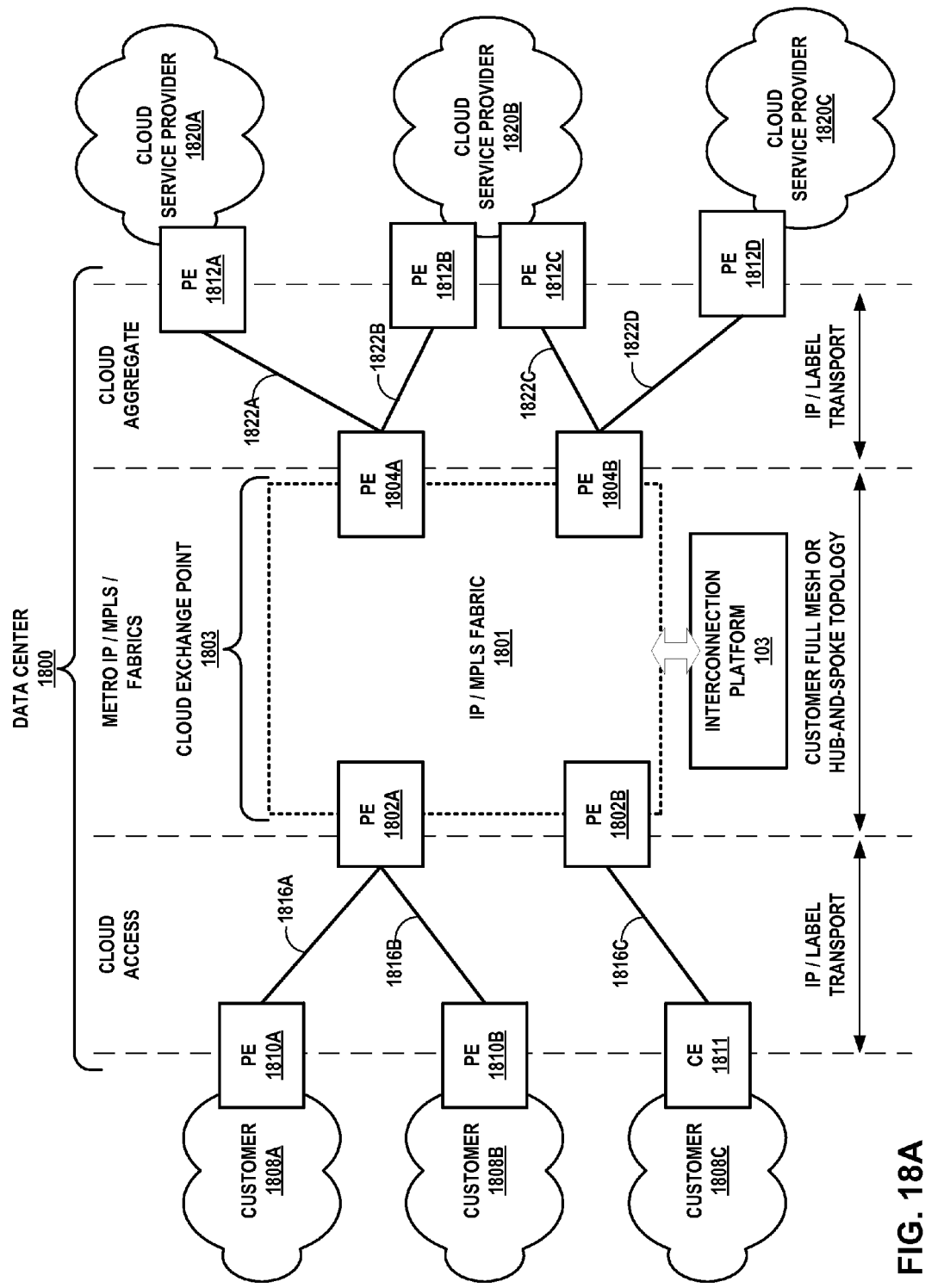
FIGS. 18A-18B are block diagrams illustrating example network infrastructure and service provisioning by a programmable network platform for a cloud exchange that aggregates the cloud services of multiple cloud service providers for provisioning to customers of the cloud exchange provider and aggregates access for multiple customers to one or more cloud service providers, in accordance with techniques described in this disclosure.
Figure 18B:
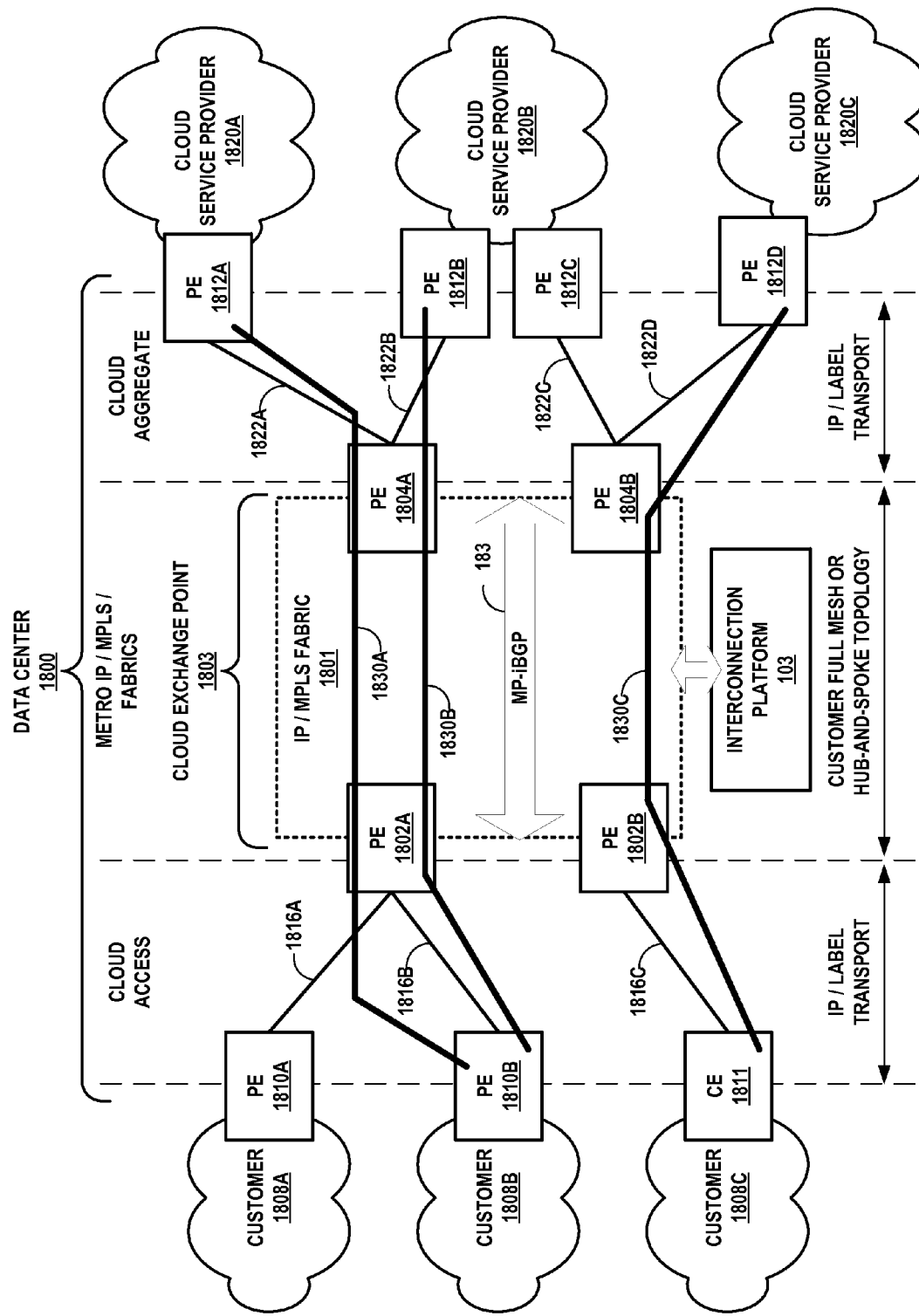

FIGS. 18A-18B are block diagrams illustrating example network infrastructure and service provisioning by an interconnection platform for a cloud exchange that aggregates the cloud services of multiple cloud service providers for provisioning to customers of the cloud exchange provider and aggregates access for multiple customers to one or more cloud service providers, in accordance with techniques described in this disclosure. In this example, customer networks 1808A-1808C (collectively, "customer networks 1808"), each associated with a different customer, access a cloud exchange point within a data center 1800 in order receive aggregated cloud services from one or more cloud service provider networks 1820, each associated with a different cloud service provider 110. Customer networks 1808 each include endpoint devices that consume cloud services provided by cloud service provider network 1820. Example endpoint devices include servers, smart phones, television set-top boxes, workstations, laptop/tablet computers, video gaming systems, teleconferencing systems, media players, and so forth.

Customer networks 1808A-1808B include respective provider edge/autonomous system border routers (PE/ASBRs) 1810A-1810B. Each of PE/ASBRs 1810A, 1810B may execute exterior gateway routing protocols to peer with one of PE routers 1802A-1802B ("PE routers 1802" or more simply "PEs 1802") over one of access links 1816A-1816B (collectively, "access links 1816"). In the illustrated examples, each of access links 1816 represents a transit link between an edge router of a customer network 1808 and an edge router (or autonomous system border router) of cloud exchange point 1803. For example, PE 1810A and PE 1802A may directly peer via an exterior gateway protocol, e.g., exterior BGP, to exchange L3 routes over access link 1816A and to exchange L3 data traffic between customer network 1808A and cloud service provider networks 1820. Access links 1816 may in some cases represent and alternatively be referred to as attachment circuits for IP-VPNs configured in IP/MPLS fabric 1801, as described in further detail below. Access links 1816 may each include a direct physical connection between at least one port of a customer network 1808 and at least one port of cloud exchange point 1803, with no intervening transit network. Access links 1816 may operate over a VLAN or a stacked VLAN (e.g, QinQ), a VxLAN, an LSP, a GRE tunnel, or other type of tunnel.

While illustrated and primarily described with respect to L3 connectivity, PE routers 1802 may additionally offer, via access links 1816, L2 connectivity between customer networks 1808 and cloud service provider networks 1820. For example, a port of PE router 1802A may be configured with an L2 sub-interface that provides, to customer network 1808A, L2 connectivity to cloud service provider 1820A via access link 1816A. The port of PE router 1802A may be additionally configured with an L3 interface that provides, to customer network 1808A, L3 connectivity to cloud service provider 1820B via access links 1816A.

Each of access links 1816 and aggregation links 1822 may include a network interface device (NID) that connects customer network 1808 or cloud service provider 1828 to a network link between the NID and one of PE routers 1802, 1804. Each of access links 1816 and aggregation links 1822 may represent or include any of a number of different types of links that provide L3/network connectivity.

In this example, customer network 1808C is not an autonomous system having an autonomous system number. Customer network 1808C may represent an enterprise, network service provider, or other customer network that is within the routing footprint of the cloud exchange point. Customer network includes a customer edge (CE) device 1811 that may execute exterior gateway routing protocols to peer with PE router 1802B over access link 1816C. In various examples, any of PEs 1810A-1810B may alternatively be or otherwise represent CE devices.

Access links 1816 include physical links. PE/ASBRs 1810A-1810B, CE device 1811, and PE routers 1802A-1802B exchange L2/L3 packets via access links 1816. In this respect, access links 1816 constitute transport links for cloud access via cloud exchange point 1803. Cloud exchange point 1803 may represent an example of any of cloud exchange points 128. Data center 1800 may represent an example of data center 201.

Cloud exchange point 1803, in some examples, aggregates customers 1808 access to the cloud exchange point 1803 and thence to any one or more cloud service providers 1820. FIGS. 18A-18B, e.g., illustrate access links 1816A-1816B connecting respective customer networks 1808A-1808B to PE router 1802A of cloud exchange point 1803 and access link 1816C connecting customer network 1808C to PE router 1802B. Any one or more of PE routers 1802, 1804 may comprise ASBRs. PE routers 1802, 1804 and IP/MPLS fabric 1801 may be configured according to techniques described herein to interconnect any of access links 1816 to any of cloud aggregation links 1822. As a result, cloud service provider network 1820A, e.g., needs only to have configured a single cloud aggregate link (here, access link 1822A) in order to provide services to multiple customer networks 1808. That is, the cloud service provider operating cloud service provider network 1802A does not need to provision and configure separate service links from cloud service provider network 1802A to each of PE routers 1810, 1811, for instance, in order to provide services to each of customer network 1808. Cloud exchange point 1803 may instead cross-connect cloud aggregation link 1822A and PE 1812A of cloud service provider network 1820A to multiple cloud access links 1816 to provide layer 3 peering and network reachability for the cloud services delivery.

In addition, a single customer network, e.g., customer network 1808A, need only to have configured a single cloud access link (here, access link 1816A) to the cloud exchange point 1803 within data center 1800 in order to obtain services from multiple cloud service provider networks 1820 offering cloud services via the cloud exchange point 1803. That is, the customer or network service provider operating customer network 1808A does not need to provision and configure separate service links connecting customer network 1808A to different PE routers 1812, for instance, in order to obtain services from multiple cloud service provider networks 1820. Cloud exchange point 1803 may instead cross-connect cloud access link 1816A (again, as one example) to multiple cloud aggregate links 1822 to provide layer 3 peering and network reachability for the cloud services delivery to customer network 1808A.

Cloud service provider networks 1820 each includes servers configured to provide one or more cloud services to users. These services may be categorized according to service types, which may include for examples, applications/software, platforms, infrastructure, virtualization, and servers and data storage. Example cloud services may include content/media delivery, cloud-based storage, cloud computing, online gaming, IT services, etc.

Cloud service provider networks 1820 include PE routers 1812A-1812D that each executes an exterior gateway routing protocol, e.g., eBGP, to exchange routes with PE routers 1804A-1804B (collectively, "PE routers 1804") of cloud exchange point 1803. Each of cloud service provider networks 1820 may represent a public, private, or hybrid cloud. Each of cloud service provider networks 1820 may have an assigned autonomous system number or be part of the autonomous system footprint of cloud exchange point 1803.

In the illustrated example, an Internet Protocol/Multiprotocol label switching (IP/MPLS) fabric 1801 interconnects PEs 1802 and PEs 1804. IP/MPLS fabric 1801 include one or more switching and routing devices, including PEs 1802, 1804, that provide IP/MPLS switching and routing of IP packets to form an IP backbone. In some example, IP/MPLS fabric 1801 may implement one or more different tunneling protocols (i.e., other than MPLS) to route traffic among PE routers and/or associate the traffic with different IP-VPNs. In accordance with techniques described herein, IP/MPLS fabric 1801 implement IP virtual private networks (IP-VPNs) to connect any of customers 1808 with multiple cloud service provider networks 1820 to provide a data center-based 'transport' and layer 3 cross-connect. Whereas service provider-based IP backbone networks require wide-area network (WAN) connections with limited bandwidth to transport service traffic from layer 3 services providers to customers, the cloud exchange point 1803 as described herein 'transports' service traffic and cross-connects cloud service providers 1820 to customers 1808 within the high-bandwidth local environment of data center 1800 provided by a data center-based IP/MPLS fabric 1801. In some examples, IP/MPLS fabric 1801 implements IP-VPNs using techniques described in Rosen & Rekhter, "BGP/MPLS IP Virtual Private Networks (VPNs)," Request for Comments 4364, February 2006, Internet Engineering Task Force (IETF) Network Working Group, the entire contents of which is incorporated by reference herein. In some example configurations, a customer network 1808 and cloud service provider network 1820 may connect via respective links to the same PE router of IP/MPLS fabric 1801.

Access links 1816 and aggregation links 1822 may include attachment circuits that associate traffic, exchanged with the connected customer network 1808 or cloud service provider network 1820, with virtual routing and forwarding instances (VRFs) configured in PEs 1802, 1804 and corresponding to IP-VPNs operating over IP/MPLS fabric 1801. For example, PE 1802A may exchange IP packets with PE 1810A on a bidirectional label-switched path (LSP) operating over access link 1816A, the LSP being an attachment circuit for a VRF configured in PE 1802A. As another example, PE 1804A may exchange IP packets with PE 1812A on a bidirectional label-switched path (LSP) operating over access link 1822A, the LSP being an attachment circuit for a VRF configured in PE 1804A. Each VRF may include or represent a different routing and forwarding table with distinct routes.

PE routers 1802, 1804 of IP/MPLS fabric 1801 may be configured in respective hub-and-spoke arrangements for cloud services, with PEs 1804 implementing cloud service hubs and PEs 1802 being configured as spokes of the hubs (for various hub-and-spoke instances/arrangements). A hub-and-spoke arrangement ensures that service traffic is enabled to flow between a hub PE and any of the spoke PEs, but not directly between different spoke PEs. As described further below, in a hub-and-spoke arrangement for data center-based IP/MPLS fabric 1801 and for southbound service traffic (i.e., from a CSP to a customer) PEs 1802 advertise routes, received from PEs 1810, to PEs 1804, which advertise the routes to PEs 1812. For northbound service traffic (i.e., from a customer to a CSP), PEs 1804 advertise routes, received from PEs 1812, to PEs 1802, which advertise the routes to PEs 1810.

For some customers of cloud exchange point 1803, the cloud exchange point 1803 provider may configure a full mesh arrangement whereby a set of PEs 1802, 1804 each couple to a different customer site network for the customer. In such cases, the IP/MPLS fabric 1801 implements a layer 3 VPN (L3VPN) for cage-to-cage or redundancy traffic (also known as east-west or horizontal traffic). The L3VPN may effectuate a closed user group whereby each customer site network can send traffic to one another but cannot send or receive traffic outside of the L3VPN.

PE routers may couple to one another according to a peer model without use of overlay networks. That is, PEs 1810 and PEs 1812 may not peer directly with one another to exchange routes, but rather indirectly exchange routes via IP/MPLS fabric 1801. In the example of FIG. 18B, cloud exchange point 1803 is configured to implement multiple layer 3 virtual circuits 1830A-1830C (collectively, "virtual circuits 1830") to interconnect customer network 1808 and cloud service provider networks 1822 with end-to-end IP paths. Each of cloud service providers 1820 and customers 1808 may be an endpoint for multiple virtual circuits 1830, with multiple virtual circuits 1830 traversing one or more attachment circuits between a PE/PE or PE/CE pair for the IP/MPLS fabric 1801 and the CSP/customer. A virtual circuit 1830 represents a layer 3 path through IP/MPLS fabric 1801 between an attachment circuit connecting a customer network to the fabric 1801 and an attachment circuit connecting a cloud service provider network to the fabric 1801. Each virtual circuit 1830 may include at least one tunnel (e.g., an LSP and/or Generic Route Encapsulation (GRE) tunnel) having endpoints at PEs 1802, 1804. PEs 1802, 1804 may establish a full mesh of tunnels interconnecting one another.

Each virtual circuit 1830 may include a different hub-and-spoke network configured in IP/MPLS network 1801 having PE routers 1802, 1804 exchanging routes using a full or partial mesh of border gateway protocol peering sessions, in this example a full mesh of Multiprotocol Interior Border Gateway Protocol (MP-iBGP) peering sessions. MP-iBGP or simply MP-BGP is an example of a protocol by which routers exchange labeled routes to implement MPLS-based VPNs. However, PEs 1802, 1804 may exchange routes to implement IP-VPNs using other techniques and/or protocols.

In the example of virtual circuit 1830A, PE router 1812A of cloud service provider network 1820A may send a route for cloud service provider network 1820A to PE 1804A via a routing protocol (e.g., eBGP) peering connection with PE 1804A. PE 1804A associates the route with a hub-and-spoke network, which may have an associated VRF, that includes spoke PE router 1802A. PE 1804A then exports the route to PE router 1802A; PE router 1804A may export the route specifying PE router 1804A as the next hop router, along with a label identifying the hub-and-spoke network. PE router 1802A sends the route to PE router 1810B via a routing protocol connection with PE 1810B. PE router 1802A may send the route after adding an autonomous system number of the cloud exchange point 1803 (e.g., to a BGP autonomous system path (AS_PATH) attribute) and specifying PE router 1802A as the next hop router. Cloud exchange point 1803 is thus an autonomous system "hop" in the path of the autonomous systems from customers 1808 to cloud service providers 1820 (and vice-versa), even though the cloud exchange point 1803 may be based within a data center. PE router 1810B installs the route to a routing database, such as a BGP routing information base (RIB) to provide layer 3 reachability to cloud service provider network 1820A. In this way, cloud exchange point 1803 "leaks" routes from cloud service provider networks 1820 to customer networks 1808, without cloud service provider networks 1820 to customer networks 1808 requiring a direct layer peering connection.

PE routers 1810B, 1802A, 1804A, and 1812A may perform a similar operation in the reverse direction to forward routes originated by customer network 1808B to PE 1812A and thus provide connectivity from cloud service provider network 1820A to customer network 1808B. In the example of virtual circuit 1830B, PE routers 1812B, 1804A, 1802A, and 1810B exchange routes for customer network 1808B and cloud service provider 1820B in a manner similar to that described above for establishing virtual circuit 1830B. As a result, cloud exchange point 1803 within data center 1800 internalizes the peering connections that would otherwise be established between PE 1810B and each of PEs 1812A, 1812B so as to perform cloud aggregation for multiple layer 3 cloud services provided by different cloud service provider networks 1820A, 1820B and deliver the multiple, aggregated layer 3 cloud services to a customer network 1808B having a single access link 1816B to the cloud exchange point 1803. Absent the techniques described herein, fully interconnecting customer networks 1808 and cloud service provider networks 1820 would require 3×3 peering connections between each of PEs 1810 and at least one of PEs 1812 for each of cloud service provider networks 1820. For instance, PE 1810A would require a layer 3 peering connection with each of PEs 1812. With the techniques described herein, cloud exchange point 1803 may fully interconnect customer networks 1808 and cloud service provider networks 1820 with one peering connection per site PE (i.e., for each of PEs 1810 and PEs 1812) by internalizing the layer 3 peering and providing data center-based 'transport' between cloud access and cloud aggregate interfaces.

In examples in which IP/MPLS fabric 1801 implements BGP/MPLS IP VPNs or other IP-VPNs that use route targets to control route distribution within the IP backbone, PEs 1804 may be configured to import routes from PEs 1802 and to export routes received from PEs 1812, using different asymmetric route targets. Likewise, PEs 1802 may be configured to import routes from PEs 1804 and to export routes received from PEs 1810 using the asymmetric route targets. Thus, PEs 1802, 1804 may configured to implement advanced L3VPNs that each includes a basic backbone L3VPN of IP/MPLS fabric 1801 together with extranets of any of customer networks 1808 and any of cloud service provider networks 1820 attached to the basic backbone L3VPN. Each advanced L3VPN constitutes a cloud service delivery network from a cloud service provider network 1820 to one or more customer networks 1808, and vice-versa. In this way, cloud exchange point 1803 enables any cloud service provider network 1820 to exchange cloud service traffic with any customer network 1808 while internalizing the layer 3 routing protocol peering connections that would otherwise be established between pairs of customer networks 1808 and cloud service provider networks 1820 for any cloud service connection between a given pair. In other words, the cloud exchange point 1803 allows each of customer networks 1808 and cloud service provider networks 1820 to establish a single (or more for redundancy or other reasons) layer 3 routing protocol peering connection to the data center-based layer 3 cross-connect. By filtering routes from cloud service provider networks 1820 to customer networks 1808, and vice-versa, PEs 1802, 1804 thereby control the establishment of virtual circuits 1830 and the flow of associated cloud service traffic between customer networks 1808 and cloud service provider networks 1820 within a data center 1800. Routes distributed into MP-iBGP mesh 183 may be VPN-IPv4 routes and be associated with route distinguishers to distinguish routes from different sites having overlapping address spaces.

Interconnection platform 103 may receive service requests for creating, reading, updating, and/or deleting end-to-end services of the cloud exchange point 1803. In response, interconnection platform 103 may configure PEs 1802, 1804 and/or other network infrastructure of IP/MPLS fabric 1801 to provision or obtain performance or other operations information regarding the service. Operations for provisioning a service and performed by interconnection platform 103 may include configuring or updating VRFs, installing SDN forwarding information, configuring LSPs or other tunnels, configuring BGP, configuring access links 1816 and aggregation links 1822, or otherwise modifying the configuration of the IP/MPLS fabric 1801. Other operations may include making service requests to an orchestration system for cloud service provider networks 1820, as described in further detail below.

Figure 19:
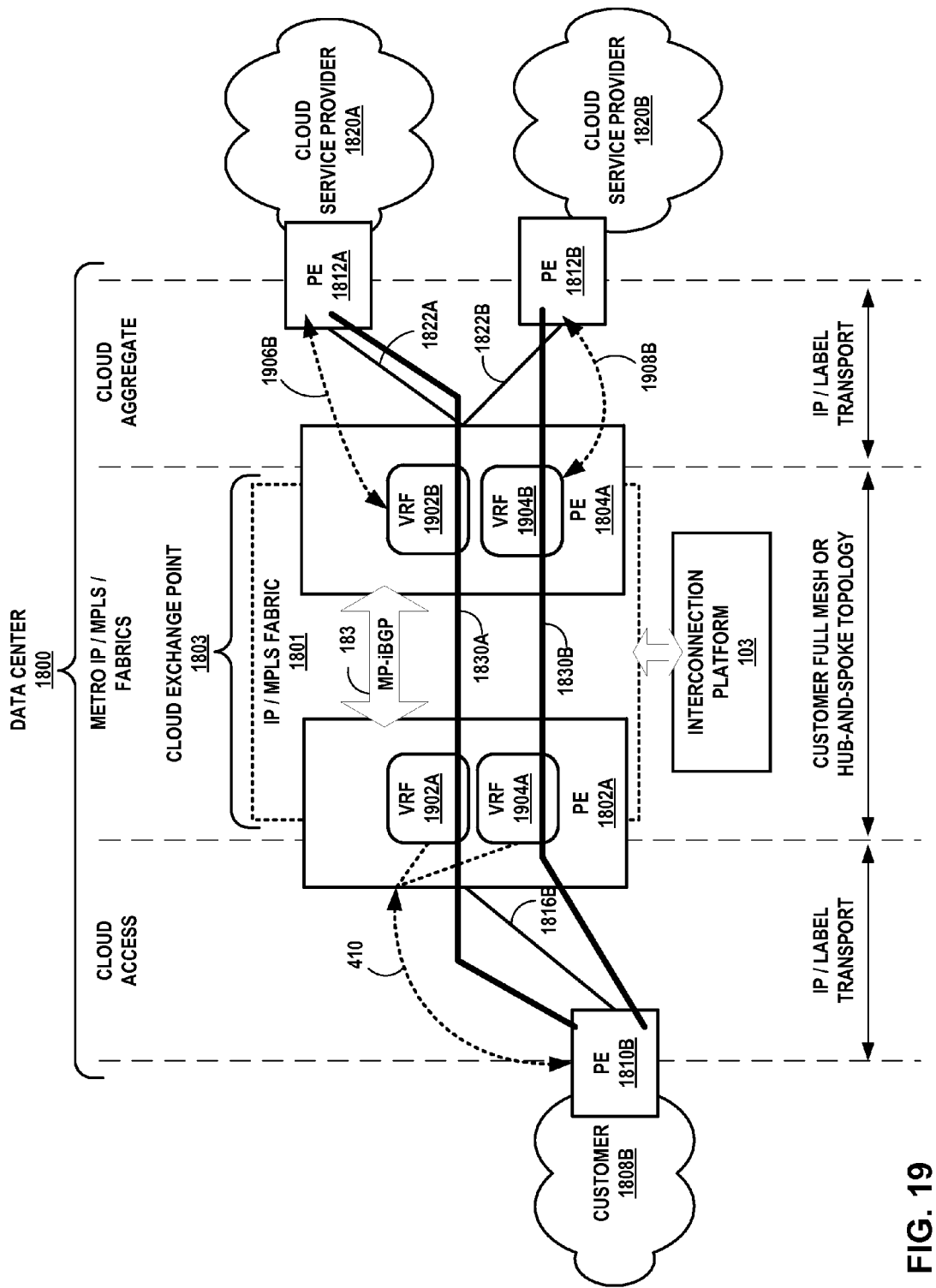
FIG. 19 is a block diagram illustrating an example of a data center-based cloud exchange point in which routers of the cloud exchange point are configured by an interconnection platform with virtual private network routing and forwarding instances for routing and forwarding aggregated service traffic from multiple cloud service provider networks to a customer network, according to techniques described herein.

FIG. 19 is a block diagram illustrating an example of a data center-based cloud exchange point in which routers of the cloud exchange point are configured by interconnection platform 103 with VPN routing and forwarding instances for routing and forwarding aggregated service traffic from multiple cloud service provider networks to a customer network, according to techniques described herein. In this example, to establish virtual circuits 1830A-1830B, PE routers 1802A and 1804A of IP/MPLS fabric 1801 are configured with VRFs. PE 1802A is configured with VRFs 1902A and 1904A, while PE 1804A is configured with VRFs 1902B and 1904B. VRF 1902A is configured to import routes exported by VRF 1902B, and VRF 1902B is configured to import routes exported by VRF 1902A. The configuration may include asymmetric route targets for import/export between VRFs 1902A, 1902B. VRF 1904A is configured to import routes exported by VRF 1902B, and VRF 1902B is configured to import routes exported by VRF 1902A. The configuration may include asymmetric route targets for import/export between VRFs 1902A, 1902B.

In this example, PE 1804A operates BGP or other route distribution protocol peering connections 1906B, 1908B with respective PEs 1812A, 1812B to exchange routes with respective cloud service provider networks 1820A, 1820B. PE 1802A operates a BGP or other route distribution protocol peering connection 1910 with PE 1810B to exchange routes with customer network 1808B. In some examples, PEs 1802A, 1804A may be statically configured with routes for the site networks.

An administrator or an interconnection platform described herein for cloud exchange point 1803 may configure PEs 1802A, 1804A with the VRF 1902A-1902B, 1904A-1904B in order to leak routes between PEs 1812 and PE 1810B and facilitate layer 3 connectivity for end-to-end IP paths illustrated here by virtual circuits 1830, while potentially optimizing the end-to-end IP paths by fostering data center-based or at least metro-based connectivity. Cloud exchange point 1803 may thus provide dedicated cloud service provider access to customer network 1808B by way of private and/or public routes for the cloud service provider networks 1820. In the northbound direction, cloud exchange point 1803 may provide dedicated cloud service provider distribution to multiple customer networks 1808 by way of private and/or public routes for the customer networks 1808. Neither PE 1810B nor any of PEs 1802A, 1804A need access to the full Internet BGP routing table in order to reach cloud service provider networks 1820 or customer networks 1808. Moreover, PEs 1802A, 1804A may be configured to aggregate customer/CSP routes and/or service traffic based on any one or more of physical, IP, service, and VRFs.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

In addition to or as an alternative to the above, the following examples are described. The features described in any of the following examples may be utilized with any of the other examples described herein.

EXAMPLE 1

A cloud-based services exchange comprising a network data center that includes respective ports by which a plurality of networks connect to the network data center, each of the networks having a different network address space and associated with a different one of a plurality of customers or cloud service providers; a plurality of interconnection assets within the network data center and configured to connect, through a switching fabric of the network data center, each of the networks associated with the plurality of customers of the cloud-based services exchange to one or more of the networks associated with the cloud service providers, the plurality of interconnection assets including a respective set of one or more virtual circuits for each of the networks associated with the plurality of customers and providing network connectivity within the network data center between the networks associated with the plurality of customers and cloud services executing from within the networks associated with the plurality of cloud service providers; and an interconnection platform executing on one or more management devices within the network data center and presenting a software interface reachable by the networks associated with the plurality of customers and configured to, in response to receiving a request issued by an application executing within any of the networks associated with the customer, access the plurality of interconnection assets to satisfy the request.

EXAMPLE 2

The cloud-based services exchange of example 1, wherein the software interface comprises a discovery application programming interface comprising at least one method configured to, in response to an invocation of the method by a second application, return a description of the plurality of interconnection assets.

EXAMPLE 3

The cloud-based services exchange of any of examples 1-2, wherein the software interface comprises a transact application programming interface comprising at least one method configured to, in response to an invocation of the method by a second application, provision one of the virtual circuits, validate one of the virtual circuits, and confirm deletion of one of the virtual circuits.

EXAMPLE 4

The cloud-based services exchange of any of examples 1-3, wherein the software interface comprises a use application programming interface comprising at least one method configured to, in response to an invocation of the method by an application, return one of recommended setup information for cloud services, customized analytics regarding competitor presence, cloud service presence, cloud service availability, customer presence, customer availability, and usage statistics for cloud services.

EXAMPLE 5

The cloud-based services exchange of any of examples 1-4, wherein the software interface comprises a support application programming interface comprising at least one method configured to, in response to an invocation of the method by a second application, perform at least one of managing accounts, bill the customer, validate credit of the customer, configure a profile of an entity associated with the application, and configure a policy of an entity associated with the application.

EXAMPLE 6

The cloud-based services exchange of any of examples 2-5, wherein the second application comprises one of the application associated with the customer and an application associated with a cloud service provider of the one or more cloud service providers.

EXAMPLE 7

The cloud-based services exchange of example 1, wherein the software interface comprises an application programming interface, and wherein receiving the request issued by the application executing within any of the networks associated with the customer comprises receiving a method invocation for a method of the application programming interface.

EXAMPLE 8

The cloud-based services exchange of any of examples 1-7, wherein the software interface comprises a Representational State Transfer (RESTful) interface, and wherein the request comprises application data that specifies an interface method and a resource identifier for an interconnection asset of the plurality of interconnection assets.

EXAMPLE 9

The cloud-based services exchange of any of examples 1-8, wherein the plurality of the interconnection assets further include at least one of a port, a location, an order, the cloud service, a bandwidth of the virtual circuit, and the virtual circuit.

EXAMPLE 10

The cloud-based services exchange of any of examples 1-9, wherein the interconnection platform comprises: an application programming interface gateway configured to: execute the software interface to receive the request; and validate the customer based on a security credential included in the request.

EXAMPLE 11

The cloud-based services exchange of any of examples 1-9, wherein the interconnection platform comprises: an application programming interface gateway configured to: execute the software interface to receive the request; invoke a cloud exchange platform service to access the plurality of interconnection assets to satisfy the request; receive, from the cloud exchange platform service, a response; and send, to the application executing within any of the networks associated with the customer, a representation of the response.

EXAMPLE 12

The cloud-based services exchange of any of examples 1-9, wherein the interconnection platform comprises: at least one sub-system configured to execute a plurality of cloud exchange services, each cloud exchange service of the plurality of cloud exchange services configured to perform a virtual circuit provisioning task; and an orchestration engine configured to orchestrate the plurality of cloud exchange services according to a workflow to satisfy the request.

EXAMPLE 13

The cloud-based services exchange of example 12, wherein the orchestration engine is configured to generate the workflow by applying a workflow and rules engine to the request and to at least one of policies and cloud service profiles, wherein the workflow comprises a series of requests for the plurality of cloud exchange services.

EXAMPLE 14

The cloud-based services exchange of example 12, wherein the interconnection platform comprises: an application programming interface gateway configured to invoke the orchestration engine based at least on the request.

EXAMPLE 15

The cloud-based services exchange of example 1, wherein to access the plurality of interconnection assets to satisfy the request, the interconnection platform is configured to provision one of the virtual circuits.

EXAMPLE 16

The cloud-based services exchange of any of examples 1-9, wherein the interconnection platform comprises: a cloud service query service; an orchestration engine; an application programming interface gateway configured to, in response to receiving the request, invoke the orchestration engine to obtain a description of the cloud service, wherein the orchestration engine generates and executes a workflow to invoke the cloud service query service, wherein the cloud service query service returns the description of the cloud service to the orchestration engine, wherein the orchestration engine returns the description of the cloud service to the application programming interface gateway, and wherein, responsive to the request, the application programming interface gateway returns the description of the cloud service to the application executing within any of the networks associated with the customer.

EXAMPLE 17

The cloud-based services exchange of any of examples 1-9, wherein the interconnection platform further comprises: a virtual circuit query service; an orchestration engine; an application programming interface gateway configured to, in response to receiving the request, invoke the orchestration engine to obtain a description of the virtual circuit, wherein the orchestration engine generates and executes a workflow to invoke the virtual circuit query service, wherein the virtual circuit query service returns the description of the virtual circuit to the orchestration engine, wherein the orchestration engine returns the description of the virtual circuit to the application programming interface gateway, and wherein, responsive to the request, the application programming interface gateway returns the description of the virtual circuit to the application executing within any of the networks associated with the customer.

EXAMPLE 18

The cloud-based services exchange of any of examples 1-9, wherein the request comprises a request to provision the virtual circuit to provide the customer with access to the cloud service, wherein the interconnection platform further comprises: a network service provisioning service; an orchestration engine; an application programming interface gateway configured to, in response to receiving the request, invoke the orchestration engine to provision the virtual circuit, wherein the orchestration engine generates and executes a workflow to invoke the network service provisioning service, wherein the network service provisioning service establishes the virtual circuit according to parameters of the request.

EXAMPLE 19

The cloud-based services exchange of example 18, wherein the interconnection platform further comprises: a cloud service provider integration service, wherein the orchestration engine generates and executes the workflow to invoke the cloud service provider integration service to request confirmation of the virtual circuit by a cloud service provider of the one or more cloud service providers, and wherein the orchestration engine generates and executes a workflow to invoke the network service provisioning service responsive to receiving confirmation of the virtual circuit by the cloud service provider.

EXAMPLE 20

The cloud-based services exchange of example 19, wherein the parameters of the request specify a buyer port of the ports and a seller port of the ports, and wherein the interconnection platform further comprises: a port service, wherein the orchestration engine generates and executes the workflow to invoke the port service to validate the buyer port and the seller port, and wherein the orchestration engine generates and executes a workflow to invoke the network service provisioning service responsive to receiving validation of the buyer port and the seller port.

EXAMPLE 21

The cloud-based services exchange of example 18, wherein the parameters of the request specify a bandwidth for the virtual circuit, and wherein to establish the virtual circuit according to parameters of the request the network service provisioning service establishes the virtual circuit having the bandwidth for the virtual circuit.

EXAMPLE 22

The cloud-based services exchange of any of examples 1-21, wherein the customer comprises one of a network services provider and an enterprise.

EXAMPLE 23

The cloud-based services exchange of any of examples 1-22, wherein each of the plurality of networks is publicly-addressable and has a different public network address space.

EXAMPLE 24

A cloud-based services exchange comprising a plurality of interconnection assets configured to connect a customer of the cloud-based services exchange to one or more cloud service providers, the plurality of interconnection assets including a virtual circuit by which the customer accesses a cloud service from the one or more cloud service providers; and an orchestration engine configured to modify the plurality of interconnection assets.

EXAMPLE 25

The cloud-based services exchange of example 24, further comprising: at least one sub-system configured to execute a plurality of cloud exchange services, each cloud exchange service of the plurality of cloud exchange services configured to perform a virtual circuit provisioning task, wherein to modify the plurality of interconnection assets the orchestration engine is configured to orchestrate the plurality of cloud exchange services according to a workflow to satisfy the request.

EXAMPLE 26

The cloud-based services exchange of example 25, wherein the orchestration engine is configured to generate the workflow by applying a workflow and rules engine to the request and to at least one of policies and cloud service profiles, and wherein the workflow comprises a series of requests for the plurality of cloud exchange services.

EXAMPLE 27

The cloud-based services exchange of any of examples 24-26, further comprising: an interconnection platform having a software interface configured to, in response to receiving a request issued by an application associated with the customer, access the plurality of interconnection assets to satisfy the request; an application programming interface gateway configured to invoke the orchestration engine based at least on the request, wherein to modify the plurality of interconnection assets the orchestration engine is configured to, in response to the application programming interface gateway invoking the orchestration, modify the plurality of interconnection assets.

EXAMPLE 28

A method comprising: executing, by a cloud-based services exchange on one or more management devices within a network data center, an interconnection platform to present a software interface reachable by networks associated with a plurality of customers; and in response to receiving a request issued by an application executing within any of the networks associated with the customer, access a plurality of interconnection assets of the network data center to satisfy the request, wherein the network data center includes respective ports by which a plurality of networks connect to the network data center, each of the networks having a different network address space and associated with a different one of a plurality of customers or cloud service providers, and wherein a plurality of interconnection assets within the network data center connect, through a switching fabric of the network data center, each of the networks associated with the plurality of customers of the cloud-based services exchange to one or more of the networks associated with the cloud service providers, the plurality of interconnection assets including a respective set of one or more virtual circuits for each of the networks associated with the plurality of customers and providing network connectivity within the network data center between the networks associated with the plurality of customers and cloud services executing from within the networks associated with the plurality of cloud service providers.

EXAMPLE 29

The method of example 28, wherein the software interface comprises a discovery application programming interface comprising at least one discovery method, the method further comprising: by the discovery method in response to an invocation of the discovery method by a second application, return a description of the plurality of interconnection assets.

EXAMPLE 30

The method of any of examples 28-29, wherein the software interface comprises a transact application programming interface comprising at least one transact method, the method further comprising: by the transact method in response to an invocation of the transact method by a second application, provision one of the virtual circuits, validate one of the virtual circuits, and confirm deletion of one of the virtual circuits.

EXAMPLE 31

The method of any of examples 28-30, wherein the software interface comprises a use application programming interface comprising at least one use method, the method further comprising: by the use method in response to an invocation of the use method by an application, return one of recommended setup information for cloud services, customized analytics regarding competitor presence, cloud service presence, cloud service availability, customer presence, customer availability, and usage statistics for cloud services.

EXAMPLE 32

The method of any of examples 28-31, wherein the software interface comprises a support application programming interface comprising at least one support method, the method further comprising: by the support method in response to an invocation of the support method by a second application, perform at least one of managing accounts, bill the customer, validate credit of the customer, configure a profile of an entity associated with the application, and configure a policy of an entity associated with the application.

EXAMPLE 33

The method of any of examples 29-32, wherein the second application comprises one of the application associated with the customer and an application associated with a cloud service provider of the one or more cloud service providers.

EXAMPLE 34

The method of example 28, wherein the software interface comprises an application programming interface, and wherein receiving the request issued by the application executing within any of the networks associated with the customer comprises receiving a method invocation for a method of the application programming interface.

EXAMPLE 35

The method of any of examples 28-34, wherein the software interface comprises a Representational State Transfer (RESTful) interface, and wherein the request comprises application data that specifies an interface method and a resource identifier for an interconnection asset of the plurality of interconnection assets.

EXAMPLE 36

The method of any of examples 28-35, wherein the plurality of the interconnection assets further include at least one of a port, a location, an order, the cloud service, a bandwidth of the virtual circuit, and the virtual circuit.

EXAMPLE 37

The method of any of examples 28-36, wherein the interconnection platform comprises an application programming interface gateway, wherein receiving the request comprises executing the software interface to receive the request, the method further comprising: validating the customer based on a security credential included in the request.

EXAMPLE 38

The method of any of examples 28-36, wherein the interconnection platform comprises an application programming interface gateway, wherein receiving the request comprises executing the software interface to receive the request, the method further comprising: invoking, by the application programming interface gateway, a cloud exchange platform service to access the plurality of interconnection assets to satisfy the request; receiving, by the application programming interface gateway from the cloud exchange platform service, a response; and sending, by the application programming interface gateway to the application executing within any of the networks associated with the customer, a representation of the response.

EXAMPLE 39

The method of any of examples 28-36, the method further comprising: executing, by at least one sub-system of the interconnection platform, a plurality of cloud exchange services, each cloud exchange service of the plurality of cloud exchange services configured to perform a virtual circuit provisioning task; and orchestrating, by an orchestration engine of the interconnection platform, the plurality of cloud exchange services according to a workflow to satisfy the request.

EXAMPLE 40

The method of example 39, further comprising: generating, by the orchestration engine, the workflow by applying a workflow and rules engine to the request and to at least one of policies and cloud service profiles, wherein the workflow comprises a series of requests for the plurality of cloud exchange services.

EXAMPLE 41

The method of example 39, invoking, by an application programming interface gateway of the interconnection platform, the orchestration engine based at least on the request.

EXAMPLE 42

The method of example 28, wherein to access the plurality of interconnection assets to satisfy the request, the interconnection platform provisions one of the virtual circuits.

EXAMPLE 43

The method of any of examples 28-36, wherein the interconnection platform comprises: a cloud service query service; an orchestration engine; an application programming interface gateway configured to, in response to receiving the request, invoke the orchestration engine to obtain a description of the cloud service, wherein the orchestration engine generates and executes a workflow to invoke the cloud service query service, wherein the cloud service query service returns the description of the cloud service to the orchestration engine, wherein the orchestration engine returns the description of the cloud service to the application programming interface gateway, and wherein, responsive to the request, the application programming interface gateway returns the description of the cloud service to the application executing within any of the networks associated with the customer.

EXAMPLE 44

The method of any of examples 28-36, wherein the interconnection platform further comprises: a virtual circuit query service; an orchestration engine; an application programming interface gateway configured to, in response to receiving the request, invoke the orchestration engine to obtain a description of the virtual circuit, wherein the orchestration engine generates and executes a workflow to invoke the virtual circuit query service, wherein the virtual circuit query service returns the description of the virtual circuit to the orchestration engine, wherein the orchestration engine returns the description of the virtual circuit to the application programming interface gateway, and wherein, responsive to the request, the application programming interface gateway returns the description of the virtual circuit to the application executing within any of the networks associated with the customer.

EXAMPLE 45

The method of any of examples 28-36, wherein the request comprises a request to provision the virtual circuit to provide the customer with access to the cloud service, wherein the interconnection platform further comprises: a network service provisioning service; an orchestration engine; an application programming interface gateway configured to, in response to receiving the request, invoke the orchestration engine to provision the virtual circuit, wherein the orchestration engine generates and executes a workflow to invoke the network service provisioning service, wherein the network service provisioning service establishes the virtual circuit according to parameters of the request.

EXAMPLE 46

The method of example 45, wherein the interconnection platform further comprises: a cloud service provider integration service, wherein the orchestration engine generates and executes the workflow to invoke the cloud service provider integration service to request confirmation of the virtual circuit by a cloud service provider of the one or more cloud service providers, and wherein the orchestration engine generates a workflow to invoke the network service provisioning service responsive to receiving confirmation of the virtual circuit by the cloud service provider.

47

The method of example 46, wherein the parameters of the request specify a buyer port of the ports and a seller port of the ports, and wherein the interconnection platform further comprises: a port service, wherein the orchestration engine generates and executes the workflow to invoke the port service to validate the buyer port and the seller port, and wherein the orchestration engine generates and executes a workflow to invoke the network service provisioning service responsive to receiving validation of the buyer port and the seller port.

EXAMPLE 48

The method of example 45, wherein the parameters of the request specify a bandwidth for the virtual circuit, and wherein to establish the virtual circuit according to parameters of the request the network service provisioning service establishes the virtual circuit having the bandwidth for the virtual circuit.

EXAMPLE 49

The method of any of examples 28-48, wherein the customer comprises one of a network services provider and an enterprise.

EXAMPLE 50

The method of any of examples 28-49, wherein each of the plurality of networks is publicly-addressable and has a different public network address space.

EXAMPLE 51

A cloud-based services exchange comprising: a plurality of interconnection assets configured to connect a customer of the cloud-based services exchange to one or more cloud service providers, the plurality of interconnection assets including a virtual circuit by which the customer accesses a cloud service from the one or more cloud service providers; and an orchestration engine configured to modify the plurality of interconnection assets.

EXAMPLE 52

The cloud-based services exchange of example 51, further comprising: at least one sub-system configured to execute a plurality of cloud exchange services, each cloud exchange service of the plurality of cloud exchange services configured to perform a virtual circuit provisioning task, wherein to modify the plurality of interconnection assets the orchestration engine is configured to orchestrate the plurality of cloud exchange services according to a workflow to satisfy the request.

EXAMPLE 53

The cloud-based services exchange of 52, wherein the orchestration engine is configured to generate the workflow by applying a workflow and rules engine to the request and to at least one of policies and cloud service profiles, and wherein the workflow comprises a series of requests for the plurality of cloud exchange services.

EXAMPLE 54

The cloud-based services exchange of any of examples 51-53, further comprising: an interconnection platform having a software interface configured to, in response to receiving a request issued by an application associated with the customer, access the plurality of interconnection assets to satisfy the request; an application programming interface gateway configured to invoke the orchestration engine based at least on the request, wherein to modify the plurality of interconnection assets the orchestration engine is configured to, in response to the application programming interface gateway invoking the orchestration, modify the plurality of interconnection assets.

EXAMPLE 55

A computer readable storage medium comprising instructions that when executed cause one or more processors to perform any of the methods of examples 28-50.

EXAMPLE 56

A network data center comprising means for performing any of the methods of examples 28-50.

EXAMPLE 57

A device configured to perform the method of any of examples 28-50.

EXAMPLE 58

A device comprising means for performing the method of any of examples 28-50.

Moreover, any of the specific features set forth in any of the examples described above may be combined into beneficial examples of the described techniques. That is, any of the specific features are generally applicable to all examples of the invention. Various examples of the invention have been described.

Various embodiments have been described. These and other embodiments are within the scope of the following examples.

What is claimed is:

1. A cloud-based services exchange comprising:
a network data center that includes respective ports of a switching fabric to which a plurality of networks connect, each of the networks having a different network address space and associated with a different one of a plurality of customers and cloud service providers, and wherein each network associated with a cloud service provider comprises customer computing resources, co-located within the network data center, that provide at least one cloud service to one or more of the networks associated with the plurality of customers;
a plurality of interconnection assets within the network data center and configured to connect, through the switching fabric of the network data center, each of the networks associated with the plurality of customers of the cloud-based services exchange to one or more of the networks associated with the cloud service providers, the plurality of interconnection assets including a respective set of one or more virtual circuits for each of the networks associated with the plurality of customers and providing network connectivity within the network data center to enable access by the networks associated with the plurality of customers to cloud services executing within the networks associated with the plurality of cloud service providers; and
an interconnection platform configured for execution by one or more management devices within the network data center and presenting a software interface configured to, in response to receiving a request from an application, access the plurality of interconnection assets to satisfy the request.

2. The cloud-based services exchange of claim 1, wherein the software interface comprises a discovery application programming interface comprising at least one method configured to, in response to the request from the application, return a description of the plurality of interconnection assets.

3. The cloud-based services exchange of claim 1, wherein the software interface comprises a transact application programming interface comprising at least one method configured to, in response to the request from the application, provision one of the virtual circuits, validate one of the virtual circuits, and confirm deletion of one of the virtual circuits.

4. The cloud-based services exchange of claim 1, wherein the software interface comprises a use application programming interface comprising at least one method configured to, in response to the request from the application, return one of recommended setup information for cloud services, customized analytics regarding competitor presence, cloud service presence, cloud service availability, customer presence, customer availability, and usage statistics for cloud services.

5. The cloud-based services exchange of claim 1,
wherein the request specifies a customer of the customers, and
wherein the software interface comprises a support application programming interface comprising at least one method configured to, in response to the request from the application, perform at least one of managing accounts, bill the customer, validate credit of the customer, configure a profile of an entity associated with the application, and configure a policy of an entity associated with the application.

6. The cloud-based services exchange of claim 1,
wherein the software interface comprises a Representational State Transfer (RESTful) interface, and
wherein the request comprises application data that specifies an interface method and a resource identifier for an interconnection asset of the plurality of interconnection assets.

7. The cloud-based services exchange of claim 1, wherein the plurality of the interconnection assets further include at least one of a port, a location, an order, a cloud service, a bandwidth of the virtual circuit, and the virtual circuit.

8. The cloud-based services exchange of claim 1, wherein the interconnection platform comprises:
an orchestration engine configured to execute at least one cloud exchange platform service for managing the interconnection assets;
an application programming interface gateway configured to:
execute the software interface to receive the request;
invoke the at least one cloud exchange platform service to access the plurality of interconnection assets to satisfy the request;
receive, from the cloud exchange platform service, a response; and
send, to the application, a representation of the response.

9. The cloud-based services exchange of claim 1, wherein the interconnection platform comprises:
a plurality of microservices configured to execute cloud exchange services; and
an orchestration engine configured to orchestrate the plurality of microservices to execute the cloud exchange services according to a workflow to satisfy the request.

10. The cloud-based services exchange of claim 9,
wherein the orchestration engine is configured to identify the workflow by applying a at least one of policies and cloud service profiles to a customer identifier included in the request,
wherein the workflow comprises a series of requests for the plurality of cloud exchange services.

11. The cloud-based services exchange of claim 1, wherein to access the plurality of interconnection assets to satisfy the request, the interconnection platform is configured to provision one of the virtual circuits.

12. The cloud-based services exchange of claim 1, wherein the interconnection platform comprises:
a cloud service query service;
an orchestration engine;
an application programming interface gateway configured to, in response to receiving the request, invoke the orchestration engine to obtain a description of a cloud service,
wherein the orchestration engine generates and executes a workflow to invoke the cloud service query service,
wherein the cloud service query service returns the description of the cloud service to the orchestration engine,
wherein the orchestration engine returns the description of the cloud service to the application programming interface gateway, and
wherein, responsive to the request, the application programming interface gateway returns the description of the cloud service to the application.

13. The cloud-based services exchange of claim 1, wherein the interconnection platform further comprises:
a virtual circuit query service;
an orchestration engine;
an application programming interface gateway configured to, in response to receiving the request, invoke the orchestration engine to obtain a description of a virtual circuit,
wherein the orchestration engine generates and executes a workflow to invoke the virtual circuit query service,
wherein the virtual circuit query service returns the description of the virtual circuit to the orchestration engine,
wherein the orchestration engine returns the description of the virtual circuit to the application programming interface gateway, and
wherein, responsive to the request, the application programming interface gateway returns the description of the virtual circuit to the application.

14. The cloud-based services exchange of claim 1, wherein the request comprises a request to provision a virtual circuit to provide a customer with access to a cloud service provider network,
wherein the interconnection platform further comprises:
a network service provisioning service;
an orchestration engine;
an application programming interface gateway configured to, in response to receiving the request, invoke the orchestration engine to provision the virtual circuit,
wherein the orchestration engine generates and executes a workflow to invoke the network service provisioning service,
wherein the network service provisioning service establishes the virtual circuit according to parameters of the request.

15. The cloud-based services exchange of claim 14, wherein the interconnection platform further comprises:
a cloud service provider integration service,
wherein the orchestration engine generates and executes the workflow to invoke the cloud service provider integration service to request confirmation of the virtual circuit by a cloud service provider of the one or more cloud service providers for the cloud service provider network, and wherein the orchestration engine generates and executes a workflow to invoke the network service provisioning service responsive to receiving confirmation of the virtual circuit by the cloud service provider.

16. The cloud-based services exchange of claim 1, wherein the customer comprises one of a network services provider and an enterprise.

17. The cloud-based services exchange of claim 1, further comprising
a layer three (L3) autonomous system located within a data center,
wherein the L3 autonomous system is configured to receive, from each of a plurality of cloud service provider networks of the plurality of networks, cloud service traffic for at least one cloud service and for distribution to one or more customer networks of the plurality of networks;
a plurality of attachment circuits configured to connect, within the data center, the respective plurality of cloud service provider networks to the L3 autonomous system; and
one or more attachment circuits configured to connect, within the data center, the respective one or more customer networks to the L3 autonomous system,
wherein the L3 autonomous system is configured to interconnect the plurality of cloud service provider networks and the one or more customer networks by establishing end-to-end L3 paths for the virtual circuits between the plurality of cloud service provider networks and the one or more customer networks, each end-to-end L3 path including one of the plurality of attachment circuits connecting the respective plurality of cloud service provider networks to the L3 autonomous system and also including one of the one or more attachment circuits connecting the respective one or more customer networks to the L3 autonomous system,
wherein the L3 autonomous system is configured to forward cloud service traffic, received on the plurality of attachment circuits connecting the respective plurality of cloud service provider networks along the end-to-end L3 paths, to the one or more attachment circuits connecting the respective one or more customer networks to the L3 autonomous system.

18. The cloud-based services exchange of claim 17, wherein the L3 routes do not specify L3 reachability to networks other than the plurality of cloud service provider networks and the one or more customer networks.

19. The cloud-based services exchange of claim 18, wherein autonomous system border routers of the L3 autonomous system include BGP routing tables configured with the L3 routes,
wherein the L3 routes comprise BGP routes, and
wherein the BGP routing tables are not full BGP tables and do not offer connectivity to the Internet.

20. A cloud-based services exchange comprising:
a plurality of interconnection assets configured to connect, through a switching fabric of the cloud-based services exchange, a customer network coupled to the switching fabric to one or more cloud service provider networks coupled to the switching fabric and co-located in a data center that includes the cloud-based service exchange, the plurality of interconnection assets including a virtual circuit by which the customer network receives traffic originated by a cloud service executing on customer computing resources of the one or more cloud service provider networks; and an orchestration engine configured to modify the plurality of interconnection assets.

21. The cloud-based services exchange of claim 20, further comprising:
a plurality of microservices configured to execute cloud exchange services,
wherein to modify the plurality of interconnection assets the orchestration engine is configured to orchestrate the plurality of cloud exchange services according to a workflow.

22. The cloud-based services exchange of 20, further comprising:
an interconnection platform having a software interface configured to, in response to receiving a request issued by an application, access the plurality of interconnection assets to satisfy the request;
an application programming interface gateway configured to invoke the orchestration engine based at least on the request,
wherein to modify the plurality of interconnection assets the orchestration engine is configured to, in response to the application programming interface gateway invoking the orchestration engine, modify the plurality of interconnection assets.

23. A method comprising:
executing, by a cloud-based services exchange using one or more management devices within a network data center, an interconnection platform to present a software interface reachable by networks associated with a plurality of customers; and
by the interconnection platform in response to receiving a request from an application, accessing a plurality of interconnection assets of the network data center to satisfy the request,
wherein the network data center includes respective ports of a switching fabric to which a plurality of networks connect, each of the networks having a different network address space and associated with a different one of a plurality of customers and cloud service providers, and
wherein a plurality of interconnection assets within the network data center connect, through the switching fabric of the network data center, each of the networks associated with the plurality of customers of the cloud-based services exchange to one or more of the networks associated with the cloud service providers and wherein each network associated with a cloud service provider comprises customer computing resources, co-located within the network data center, that provide at least one cloud service to one or more of the networks associated with the plurality of customers, the plurality of interconnection assets including a respective set of one or more virtual circuits for each of the networks associated with the plurality of customers and providing network connectivity within the network data center to enable access by the networks associated with the plurality of customers to cloud services executing within the networks associated with the plurality of cloud service providers.

* * * * *